US012425137B2

(12) United States Patent
Lee et al.

(10) Patent No.: US 12,425,137 B2
(45) Date of Patent: Sep. 23, 2025

(54) METHOD AND DEVICE FOR PERFORMING LOW-LATENCY AND HIGH-SPEED TRANSMISSION IN WIRELESS COMMUNICATION SYSTEM

(71) Applicant: LG ELECTRONICS INC., Seoul (KR)

(72) Inventors: Jongku Lee, Seoul (KR); Kijun Kim, Seoul (KR); Dongsun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 18/189,501

(22) Filed: Mar. 24, 2023

(65) Prior Publication Data

US 2024/0072941 A1 Feb. 29, 2024

(30) Foreign Application Priority Data

Aug. 26, 2022 (KR) .................. 10-2022-0107427

(51) Int. Cl.
*H04L 1/1812* (2023.01)
*H04L 1/20* (2006.01)
(Continued)

(52) U.S. Cl.
CPC ............ *H04L 1/1819* (2013.01); *H04L 1/203* (2013.01); *H04W 28/04* (2013.01); *H04W 28/06* (2013.01);
(Continued)

(58) Field of Classification Search
CPC ... H04L 1/00; H04L 1/20; H04L 1/203; H04L 1/0061; H04L 1/0063; H04L 1/0073;
(Continued)

(56) References Cited

U.S. PATENT DOCUMENTS

2008/0225965 A1* 9/2008 Pi ........................ H04B 7/068
714/800
2010/0262886 A1* 10/2010 Ren ..................... H04L 1/1819
714/751

(Continued)

FOREIGN PATENT DOCUMENTS

WO      2020166230         8/2020

OTHER PUBLICATIONS

European Patent Office Application Serial No. 23162542.7, Search Report dated Jan. 30, 2024, 11 pages.

(Continued)

*Primary Examiner* — Warner Wong
(74) *Attorney, Agent, or Firm* — LEE, HONG, DEGERMAN, KANG & WAIMEY

(57) ABSTRACT

The present disclosure provides a method and device for performing low-latency and high-speed transmission in a wireless communication system. The present disclosure also provides a method and device for performing efficient HARQ-ACK (Hybrid Automatic Repeat reQuest-Acknowledgement) feedback and retransmission for recovering a transmission error occurring in a wireless communication system. The present disclosure also provides a method and device for reducing transmission latency by reducing HARQ retransmission probability using an erasure code, and for reducing radio resources and the number of HARQ-ACK feedback bits and DCI bits required for retransmission when retransmission is unavoidably necessary.

20 Claims, 37 Drawing Sheets

(51) Int. Cl.
*H04W 28/04* (2009.01)
*H04W 28/06* (2009.01)
*H04W 72/23* (2023.01)
*H04L 1/00* (2006.01)
*H04L 5/00* (2006.01)
*H04L 43/0823* (2022.01)
*H04L 49/55* (2022.01)

(52) U.S. Cl.
CPC .......... *H04W 72/23* (2023.01); *H04L 1/0078* (2013.01); *H04L 5/0055* (2013.01); *H04L 43/0823* (2013.01); *H04L 49/55* (2013.01)

(58) Field of Classification Search
CPC ... H04L 1/0075; H04L 1/0081; H04L 1/0082; H04L 1/1816; H04L 2012/6467; H04L 43/00; H04L 43/08; H04L 43/0823; H04L 43/0847; H04L 49/55; H04L 49/555; H04L 49/557; H04L 5/0055; H04L 12/1863; H04W 28/00; H04W 28/02; H04W 28/04; H04W 28/06; H04W 72/23
See application file for complete search history.

(56) References Cited

U.S. PATENT DOCUMENTS

| | | | |
|---|---|---|---|
| 2011/0099446 A1* | 4/2011 | Murakami | H04L 1/0071 714/E11.131 |
| 2012/0057545 A1* | 3/2012 | Hariharan | H04L 1/1685 370/329 |
| 2016/0285589 A1* | 9/2016 | Mukkavilli | H04L 1/0045 |
| 2018/0234880 A1* | 8/2018 | Jiang | H04W 28/04 |
| 2019/0288797 A1* | 9/2019 | Guan | H04L 1/1835 |
| 2020/0259600 A1* | 8/2020 | Cao | H04L 1/0057 |
| 2021/0226732 A1* | 7/2021 | Yeo | H04L 1/18 |
| 2023/0118018 A1* | 4/2023 | Guo | H04L 1/0075 370/328 |
| 2023/0361922 A1* | 11/2023 | Chen | H04L 1/0026 |

OTHER PUBLICATIONS

Huawei et al., "Code block segmentation for BG2," R1-1715503, 3GPP TSG RAN WG1 Meeting NR#3, Sep. 2017, 4 pages.
Japan Patent Office Application No. 2023-079230, Office Action dated Jul. 16, 2024, 5 pages.

* cited by examiner (control plane)

(user plane)

CB without error(CRC OK)    CB with error(CRC NOK)

METHOD AND DEVICE FOR PERFORMING LOW-LATENCY AND HIGH-SPEED TRANSMISSION IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2022-0107427, filed on Aug. 26, 2022, the contents of which are all hereby incorporated by reference herein in their entireties.

TECHNICAL FIELD

The present disclosure relates to a wireless communication system. More specifically, the present disclosure relates to a method and device for performing low-latency and high-speed transmission in a wireless communication system.

BACKGROUND

Wireless communication systems have been widely deployed to provide various types of communication services such as voice or data. In general, the wireless communication system is a multiple access system capable of supporting communication with multiple users by sharing available system resources (bandwidth, transmission power, etc.). Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In particular, as many communication devices require large communication capacity, more enhanced mobile broadband (eMBB) communication technology than the existing radio access technology (RAT) is proposed. Not only massive machine type communications (mMTC) which provide various services anytime and anywhere by connecting a large number of devices and objects, but also a communication system considering service/user equipment (UE) sensitive to reliability and latency are proposed. Various technical configurations for this are proposed.

SUMMARY

In order to solve the above-described problem, the present disclosure provides a method and device for performing low-latency and high-speed transmission in a wireless communication system.

The present disclosure also provides a method and device for performing efficient HARQ-ACK (Hybrid Automatic Repeat reQuest-Acknowledgement) feedback and retransmission for recovering a transmission error occurring in a wireless communication system.

The present disclosure also provides a method and device for reducing transmission latency by reducing HARQ retransmission probability using an erasure code, and for reducing radio resources and the number of HARQ-ACK feedback bits and DCI bits required for retransmission when retransmission is unavoidably necessary.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

According to various embodiments of the present disclosure, a method performed by a user equipment (UE) in a wireless communication system is provided. The method comprises receiving, from a base station (BS), a radio resource control (RRC) message including first information for a first target block error rate (BLER) of a plurality of code blocks (CBs) and a second target BLER of a plurality of transport blocks (TBs), receiving, from the base station, first downlink control information (DCI) including second information related to a number of the plurality of CBs, determining a number of a plurality of data code blocks (DCBs) and a number of one or more parity code blocks (PCBs) based on the first information and the second information, receiving, from the base station, first data including the plurality of DCBs and the one or more PCBs, the plurality of CBs including the plurality of DCBs and the one or more PCBs, based on an error occurring in receiving the first data, determining a retransmission scheme based on the number of the plurality of DCBs and the number of the one or more PCBs, transmitting, to the base station, a retransmission request message including the retransmission scheme, receiving second DCI from the base station in response to the retransmission request message, and receiving second data from the base station based on the second DCI.

According to various embodiments of the present disclosure, a method performed by a base station (BS) in a wireless communication system is provided. The method comprises transmitting, to a user equipment (UE), a radio resource control (RRC) message including first information for a first target block error rate (BLER) of a plurality of code blocks (CBs) and a second target BLER of a plurality of transport blocks (TBs), transmitting, to the UE, first downlink control information (DCI) including second information related to a number of the plurality of CBs, transmitting, to the UE, first data including a plurality of data code blocks (DCBs) and one or more parity code blocks (PCBs), the plurality of CBs including the plurality of DCBs and the one or more PCBs, receiving, from the UE, a retransmission request message including a retransmission scheme, transmitting second DCI to the UE in response to the retransmission request message, and transmitting second data to the UE based on the second DCI, wherein a number of the plurality of DCBs and a number of the one or more PCBs are determined based on the first information and the second information, and wherein based on an error occurring in transmitting the first data, the retransmission scheme is determined based on the number of the plurality of DCBs and the number of the one or more PCBs.

According to various embodiments of the present disclosure, a user equipment (UE) in a wireless communication system is provided. The UE comprises a transceiver and at least one processor. The at least one processor is configured to receive, from a base station (BS), a radio resource control (RRC) message including first information for a first target block error rate (BLER) of a plurality of code blocks (CBs) and a second target BLER of a plurality of transport blocks (TBs), receive, from the base station, first downlink control information (DCI) including second information related to a number of the plurality of CBs, determine a number of a plurality of data code blocks (DCBs) and a number of one or more parity code blocks (PCBs) based on the first information and the second information, receive, from the base station, first data including the plurality of DCBs and the one or more PCBs, the plurality of CBs including the plurality of DCBs and the one or more PCBs, based on an error occurring in receiving the first data, determine a retransmission scheme based on the number of the plurality of DCBs and the number of the one or more PCBs, transmit, to the base station, a retransmission request message including the retransmission scheme, receive second DCI from the base station in response to the retransmission request message, and receive second data from the base station based on the second DCI.

According to various embodiments of the present disclosure, a base station (BS) in a wireless communication system is provided. The base station comprises a transceiver and at least one processor. The at least one processor is configured to transmit, to a user equipment (UE), a radio resource control (RRC) message including first information for a first target block error rate (BLER) of a plurality of code blocks (CBs) and a second target BLER of a plurality of transport blocks (TBs), transmit, to the UE, first downlink control information (DCI) including second information related to a number of the plurality of CBs, transmit, to the UE, first data including a plurality of data code blocks (DCBs) and one or more parity code blocks (PCBs), the plurality of CBs including the plurality of DCBs and the one or more PCBs, receive, from the UE, a retransmission request message including a retransmission scheme, transmit second DCI to the UE in response to the retransmission request message, and transmit second data to the UE based on the second DCI, wherein a number of the plurality of DCBs and a number of the one or more PCBs are determined based on the first information and the second information, and wherein based on an error occurring in transmitting the first data, the retransmission scheme is determined based on the number of the plurality of DCBs and the number of the one or more PCBs.

According to various embodiments of the present disclosure, one or more non-transitory computer readable mediums storing one or more instructions are provided. The one or more instructions perform operations based on being executed by one or more processors. The operations comprise receiving, from a base station (BS), a radio resource control (RRC) message including first information for a first target block error rate (BLER) of a plurality of code blocks (CBs) and a second target BLER of a plurality of transport blocks (TBs), receiving, from the base station, first downlink control information (DCI) including second information related to a number of the plurality of CBs, determining a number of a plurality of data code blocks (DCBs) and a number of one or more parity code blocks (PCBs) based on the first information and the second information, receiving, from the base station, first data including the plurality of DCBs and the one or more PCBs, the plurality of CBs including the plurality of DCBs and the one or more PCBs, based on an error occurring in receiving the first data, determining a retransmission scheme based on the number of the plurality of DCBs and the number of the one or more PCBs, transmitting, to the base station, a retransmission request message including the retransmission scheme, receiving second DCI from the base station in response to the retransmission request message, and receiving second data from the base station based on the second DCI.

According to various embodiments of the present disclosure, one or more non-transitory computer readable mediums storing one or more instructions are provided. The one or more instructions perform operations based on being executed by one or more processors. The operations comprise transmitting, to a user equipment (UE), a radio resource control (RRC) message including first information for a first target block error rate (BLER) of a plurality of code blocks (CBs) and a second target BLER of a plurality of transport blocks (TBs), transmitting, to the UE, first downlink control information (DCI) including second information related to a number of the plurality of CBs, transmitting, to the UE, first data including a plurality of data code blocks (DCBs) and one or more parity code blocks (PCBs), the plurality of CBs including the plurality of DCBs and the one or more PCBs, receiving, from the UE, a retransmission request message including a retransmission scheme, transmitting second DCI to the UE in response to the retransmission request message, and transmitting second data to the UE based on the second DCI, wherein a number of the plurality of DCBs and a number of the one or more PCBs are determined based on the first information and the second information, and wherein based on an error occurring in transmitting the first data, the retransmission scheme is determined based on the number of the plurality of DCBs and the number of the one or more PCBs.

The present disclosure can provide a method and device for performing low-latency and high-speed transmission in a wireless communication system.

The present disclosure can also provide a method and device for performing efficient HARQ-ACK (Hybrid Automatic Repeat reQuest-Acknowledgement) feedback and retransmission for recovering a transmission error occurring in a wireless communication system.

The present disclosure can also provide a method and device for reducing transmission latency by reducing HARQ retransmission probability using an erasure code, and for reducing radio resources and the number of HARQ-ACK feedback bits and DCI bits required for retransmission when retransmission is unavoidably necessary.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description. Technical features of the present disclosure are not limited to specific drawings, and features disclosed in each drawing can be combined with each other to form a new embodiment. Reference numerals in each drawing may indicate structural elements.

DETAILED DESCRIPTION

Figure 1:
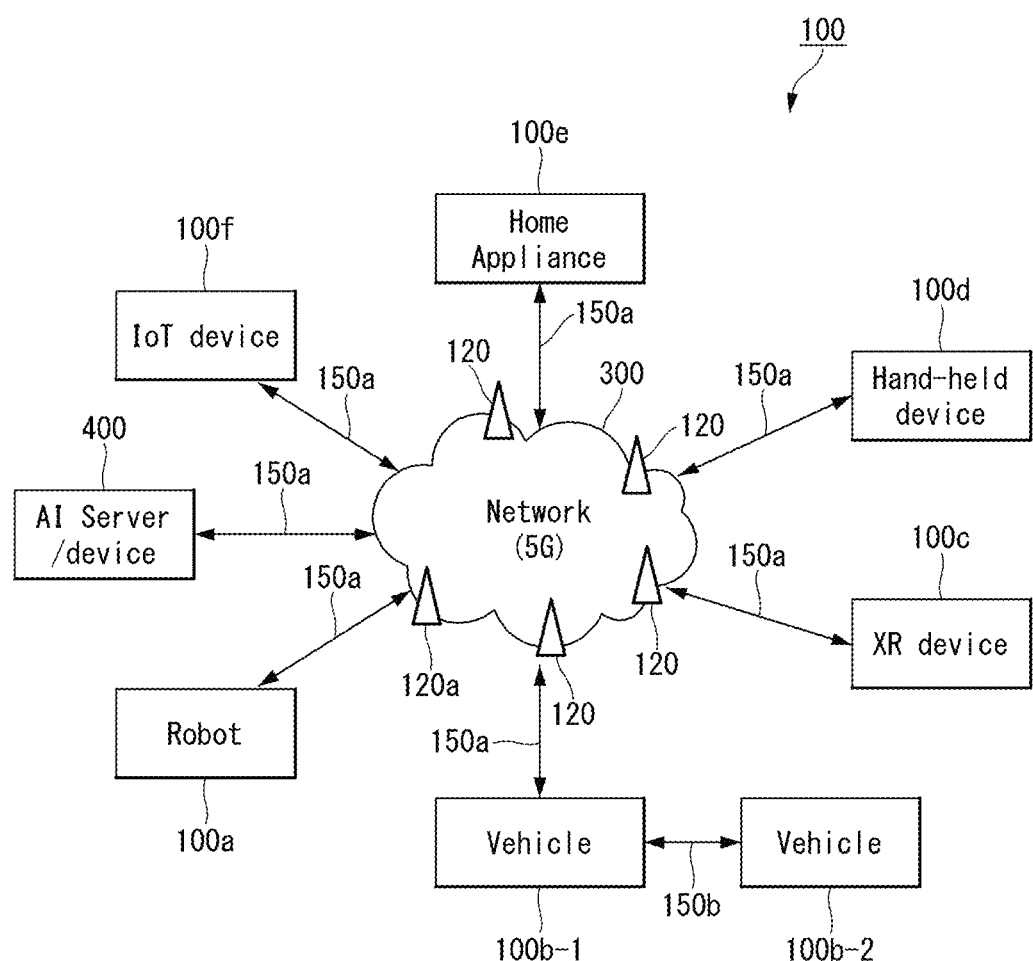
FIG. 1 illustrates a communication system applied to the present disclosure.

The following embodiments are implemented by combining components and features of the present disclosure in predetermined forms. Each component or feature can be considered selectively unless specified separately. Each component or feature can be implemented without being combined with another component or feature. Furthermore, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment.

In the description of the drawings, a procedure or a step, etc. that may obscure the subject matter of the present disclosure have not been described, and a procedure or a step, etc. that can be understood by a person skilled in the art have also not been described.

Throughout the present disclosure, when a part is said to "comprising or including" a certain component, this means that it does not exclude other components but may further include other components unless otherwise stated. Further, terms such as "... unit", "... part", and "module" described in the present disclosure mean a unit that processes at least one function or operation, and this can be implemented in hardware or software or a combination of hardware and software. In addition, "a or an", "one", "the" and similar related words can be used in a sense of including both the singular and the plural unless otherwise indicated in the present disclosure or clearly contradicted by context, in the context describing the present disclosure (in particular, in the context of the following claims).

Embodiments of the present disclosure are described focusing on a data transmission/reception relationship between a base station and a mobile station. Here, the base station means a terminal node of a network directly performing communication with the mobile station. In the present disclosure, specific operations described to be performed by the base station may be performed by an upper node of the base station in some cases.

That is, in a network consisting of multiple network nodes including the base station, various operations performed for communication with the mobile station may be performed by the base station or network nodes other than the base station. The 'base station (BS)' may be replaced with terms such as a fixed station, Node B, eNB (eNode B), gNB (gNode B), ng-eNB, an advanced base station (ABS), or an access point.

In embodiments of the present disclosure, the 'terminal' may be replaced with terms such as a user equipment (UE), a mobile station (MS), a subscriber station (SS), a mobile subscriber station (MSS), a mobile terminal, or an advanced mobile station (AMS).

In addition, a transmission end refers to a fixed and/or mobile node providing data service or voice service, and a reception end refers to a fixed and/or mobile node receiving data service or voice service. Thus, in uplink, the mobile station may be a transmission end, and the base station may be a reception end. In the same manner, in downlink, the mobile station may be a reception end, and the base station may be a transmission end.

Embodiments of the present disclosure can be supported by standard documents disclosed in at least one of IEEE 802.xx system, 3GPP (3rd Generation Partnership Project) system, 3GPP LTE (Long Term Evolution) system, 3GPP 5G (5th generation) NR(New Radio) system and 3GPP2 system that are wireless access systems. In particular, embodiments of the present disclosure can be supported by documents of 3GPP TS (technical specification) 38.211, 3GPP TS 38.212, 3GPP TS 38.213, 3GPP TS 38.321 and 3GPP TS 38.331.

Embodiments of the present disclosure can also be applied to other wireless access systems and are not limited to the above-described systems. For example, embodiments of the present disclosure can also be applied to systems applied after the 3GPP 5G NR system and are not limited to a specific system.

That is, obvious steps or parts not described in embodiments of the present disclosure can be described with reference to the above documents. Further, all terms disclosed in the present disclosure can be explained by the standard documents described above.

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure.

Specific terms used in embodiments of the present disclosure are provided to help the understanding of the present disclosure, and the use of the specific terms can be modified into other forms within the scope without departing from the technical spirit of the present disclosure.

The following technologies can be applied to various wireless access systems such as code division multiple access (CDMA), frequency division multiple access (FDMA), time division multiple access (TDMA), orthogonal frequency division multiple access (OFDMA), and single carrier-frequency division multiple access (SC-FDMA).

For clarity in the description, the following description will mostly focus on 3GPP communication system (e.g. LTE-A or 5G NR). However, technical features according to an embodiment of the present disclosure will not be limited only to this. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR/6G may be collectively referred to as the 3GPP system.

For background art, terms, abbreviations, etc. used in the present disclosure, reference can be made to items described in standard documents published prior to the present disclosure. For example, 36.xxx and 38.xxx standard documents may be used.

For terms and techniques not specifically described among terms and techniques used in the present disclosure, reference may be made to a wireless communication standard document published before the present disclosure is filed. For example, the following document may be referred to.

3GPP LTE
   3GPP TS 36.211: Physical channels and modulation
   3GPP TS 36.212: Multiplexing and channel coding
   3GPP TS 36.213: Physical layer procedures
   3GPP TS 36.214: Physical layer; Measurements
   3GPP TS 36.300: Overall description
   3GPP TS 36.304: User Equipment (UE) procedures in idle mode
   3GPP TS 36.314: Layer 2—Measurements
   3GPP TS 36.321: Medium Access Control (MAC) protocol
   3GPP TS 36.322: Radio Link Control (RLC) protocol
   3GPP TS 36.323: Packet Data Convergence Protocol (PDCP)
   3GPP TS 36.331: Radio Resource Control (RRC) protocol 3GPP NR (e.g. 5G)
   3GPP TS 38.211: Physical channels and modulation
   3GPP TS 38.212: Multiplexing and channel coding
   3GPP TS 38.213: Physical layer procedures for control
   3GPP TS 38.214: Physical layer procedures for data
   3GPP TS 38.215: Physical layer measurements
   3GPP TS 38.300: Overall description
   3GPP TS 38.304: User Equipment (UE) procedures in idle mode and in RRC inactive state
   3GPP TS 38.321: Medium Access Control (MAC) protocol
   3GPP TS 38.322: Radio Link Control (RLC) protocol
   3GPP TS 38.323: Packet Data Convergence Protocol (PDCP)
   3GPP TS 38.331: Radio Resource Control (RRC) protocol
   3GPP TS 37.324: Service Data Adaptation Protocol (SDAP)
   3GPP TS 37.340: Multi-connectivity; Overall description Symbols/abbreviations/terms used in the present disclosure are as follows.
   ARQ: Automatic Repeat reQuest
   BLER: Block Error Rate
   CB: Code Block
   CBG: Code Block Group
   CE: Control Element
   CQI: Channel Quality Indicator
   CR: Coding Rate
   CRC: Cyclic Redundancy Check
   CSI: Channel State Information
   DCB: Data Code Block
   DCI: Downlink Control Information
   DL: DownLink DL-SCH: Downlink Shared Channel
HARQ: Hybrid Automatic Repeat reQuest
HARQ-ACK: Hybrid Automatic Repeat request Acknowledgement
MAC: Medium Access Control
NR: New Radio
PCB: Parity Code Block
PDCCH: Physical Downlink Control Channel
PDSCH: Physical Downlink Shared Channel
PUCCH: Physical Uplink Control Channel
PUSCH: Physical Uplink Shared Channel
QoS: Quality of Service
RV: Redundancy Version
TB: Transport Block
TCBI: Transmitting Code Block Information
UL: UpLink
UL-SCH: Uplink Shared Channel
XR: eXtended Reality Example of Communication System to which the Present Disclosure is Applied The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 1 shows a communication system based on an embodiment of the present disclosure.

Referring to FIG. 1, a communication system 100 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 100g. For example, the vehicles may include a vehicle having a wireless communication function, an autonomous vehicle, and a vehicle capable of performing communication between vehicles. Herein, the vehicles 100b-1 and 100b-2 may include an Unmanned Aerial Vehicle (UAV) (e.g., a drone). The XR device 100c may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device 100d may include a smartphone, a smartpad, a wearable device (e.g., a smartwatch or a smartglasses), and a computer (e.g., a notebook). The home appliance 100e may include a TV, a refrigerator, and a washing machine. The IoT device 100f may include a sensor and a smartmeter. For example, the BSs and the network may be implemented as wireless devices and a specific wireless device 200a may operate as a BS/network node with respect to other wireless devices.

The wireless devices 100a to 100f may be connected to the network 130 via the BSs 120. An AI technology may be applied to the wireless devices 100a to 100f and the wireless devices 100a to 100f may be connected to the AI server 100g via the network 130. The network 130 may be configured using a 3G network, a 4G (e.g., LTE) network, or a 5G (e.g., NR) network. Although the wireless devices 100a to 100f may communicate with each other through the BSs 120/network 130, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 120, or BS 120/BS 120. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device to which the Present Disclosure is Applied

Figure 2:
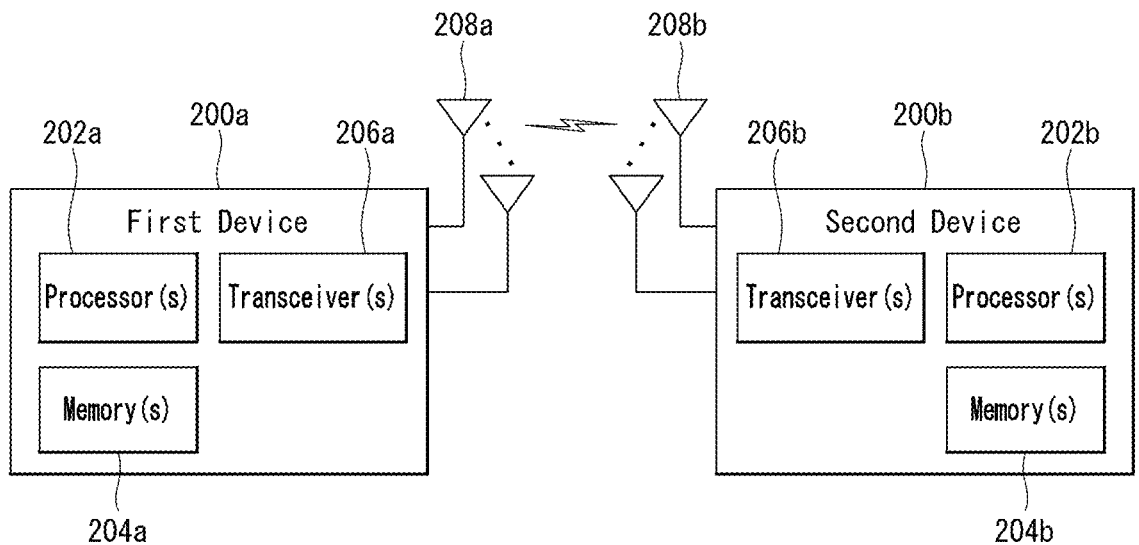
FIG. 2 illustrates a wireless device applicable to the present disclosure.

FIG. 2 shows wireless devices based on an embodiment of the present disclosure.

Referring to FIG. 2, a first wireless device 200a and a second wireless device 200b may transmit radio signals through a variety of RATs (e.g., LTE and NR). Herein, {the first wireless device 200a and the second wireless device 200b} may correspond to {the wireless device 100x and the BS 1200} and/or {the wireless device 100x and the wireless device 100x} of FIG. 1.

The first wireless device 200a may include one or more processors 202a and one or more memories 204a and additionally further include one or more transceivers 206a and/or one or more antennas 208a. The processor(s) 202a may control the memory(s) 204a and/or the transceiver(s) 206a and may be configured to implement the descriptions, functions, procedures, proposals, methods, and/or operational flowcharts disclosed in this document. For example, the processor(s) 202a may process information within the memory(s) 204a to generate first information/signals and then transmit radio signals including the first information/signals through the transceiver(s) 206a. The processor(s) 202a may receive radio signals including second information/signals through the transceiver 206a and then store information obtained by processing the second information/signals in the memory(s) 204a. The memory(s) 204a may be connected to the processor(s) 202a and may store a variety of information related to operations of the processor(s) 202a. For example, the memory(s) 204a may store software code including commands for performing a part or the entirety of processes controlled by the processor(s) 202a or for performing the descriptions, functions, procedures, proposals, methods, and/or operational flowcharts disclosed in this document. Herein, the processor(s) 202a and the memory(s) 204a may be a part of a communication modem/circuit/chip designed to implement RAT (e.g., LTE or NR). The transceiver(s) 206a may be connected to the processor(s) 202a and transmit and/or receive radio signals through one or more antennas 208a. Each of the transceiver(s) 206a may include a transmitter and/or a receiver. The transceiver(s) 206a may be interchangeably used with Radio Frequency (RF) unit(s). In the present disclosure, the wireless device may represent a communication modem/circuit/chip.

The second wireless device 200b may include one or more processors 202b and one or more memories 204b and additionally further include one or more transceivers 206b and/or one or more antennas 208b. The processor(s) 202b may control the memory(s) 204b and/or the transceiver(s) 206b and may be configured to implement the descriptions, functions, procedures, proposals, methods, and/or operational flowcharts disclosed in this document. For example, the processor(s) 202b may process information within the memory(s) 204b to generate third information/signals and then transmit radio signals including the third information/signals through the transceiver(s) 206b. The processor(s) 202b may receive radio signals including fourth information/signals through the transceiver(s) 206a and then store information obtained by processing the fourth information/signals in the memory(s) 204b. The memory(s) 204b may be connected to the processor(s) 202b and may store a variety of information related to operations of the processor(s) 202b. For example, the memory(s) 204b may store software code including commands for performing a part or the entirety of processes controlled by the processor(s) 202b or for performing the descriptions, functions, procedures, proposals, methods, and/or operational flowcharts disclosed in this document. Herein, the processor(s) 202b and the memory(s) 204b may be a part of a communication modem/circuit/chip designed to implement RAT (e.g., LTE or NR). The transceiver(s) 206 may be connected to the processor(s) 202b and transmit and/or receive radio signals through one or more antennas 208b. Each of the transceiver(s) 206b may include a transmitter and/or a receiver. The transceiver(s) 206b may be interchangeably used with RF unit(s). In the present disclosure, the wireless device may represent a communication modem/circuit/chip.

Hereinafter, hardware elements of the wireless devices 200a and 200b will be described more specifically. One or more protocol layers may be implemented by, without being limited to, one or more processors 202a and 202b. For example, the one or more processors 202a and 202b may implement one or more layers (e.g., functional layers such as PHY, MAC, RLC, PDCP, RRC, and SDAP). The one or more processors 202a and 202b may generate one or more Protocol Data Units (PDUs) and/or one or more Service Data Unit (SDUs) based on the descriptions, functions, procedures, proposals, methods, and/or operational flowcharts disclosed in this document. The one or more processors 202a and 202b may generate messages, control information, data, or information based on the descriptions, functions, procedures, proposals, methods, and/or operational flowcharts disclosed in this document. The one or more processors 202a and 202b may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 206a and 206b. The one or more processors 202a and 202b may receive the signals (e.g., baseband signals) from the one or more transceivers 206a and 206b and acquire the PDUs, SDUs, messages, control information, data, or information based on the descriptions, functions, procedures, proposals, methods, and/or operational flowcharts disclosed in this document.

The one or more processors 202a and 202b may be referred to as controllers, microcontrollers, microprocessors, or microcomputers. The one or more processors 202a and 202b may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 202a and 202b. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 202a and 202b or stored in the one or more memories 204a and 204b so as to be driven by the one or more processors 202a and 202b. The descriptions, functions, procedures, proposals, methods, and/or operational flowcharts disclosed in this document may be implemented using firmware or software in the form of code, commands, and/or a set of commands.

The one or more memories 204a and 204b may be connected to the one or more processors 202a and 202b and store various types of data, signals, messages, information, programs, code, instructions, and/or commands. The one or more memories 204a and 204b may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 204a and 204b may be located at the interior and/or exterior of the one or more processors 202a and 202b. The one or more memories 204a and 204b may be connected to the one or more processors 202a and 202b through various technologies such as wired or wireless connection.

The one or more transceivers 206a and 206b may transmit user data, control information, and/or radio signals/channels, mentioned in the methods and/or operational flowcharts of this document, to one or more other devices. The one or more transceivers 206a and 206b may receive user data, control information, and/or radio signals/channels, mentioned in the descriptions, functions, procedures, proposals, methods, and/or operational flowcharts disclosed in this document, from one or more other devices. For example, the one or more transceivers 206a and 206b may be connected to the one or more processors 202a and 202b and transmit and receive radio signals. For example, the one or more processors 202a and 202b may perform control so that the one or more transceivers 206a and 206b may transmit user data, control information, or radio signals to one or more other devices. The one or more processors 202a and 202b may perform control so that the one or more transceivers 206a and 206b may receive user data, control information, or radio signals from one or more other devices. The one or more transceivers 206a and 206b may be connected to the one or more antennas 208a and 208b and the one or more transceivers 206a and 206b may be configured to transmit and receive user data, control information, and/or radio signals/channels, mentioned in the descriptions, functions, procedures, proposals, methods, and/or operational flowcharts disclosed in this document, through the one or more antennas 208a and 208b. In this document, the one or more antennas may be a plurality of physical antennas or a plurality of logical antennas (e.g., antenna ports). The one or more transceivers 206a and 206b may convert received radio signals/channels etc. from RF band signals into baseband signals in order to process received user data, control information, radio signals/channels, etc. using the one or more processors 202a and 202b. The one or more transceivers 206a and 206b may convert the user data, control information, radio signals/channels, etc. processed using the one or more processors 202a and 202b from the base band signals into the RF band signals. To this end, the one or more transceivers 206a and 206b may include (analog) oscillators and/or filters.

Wireless Device to which the Present Disclosure is Applied

Figure 3:
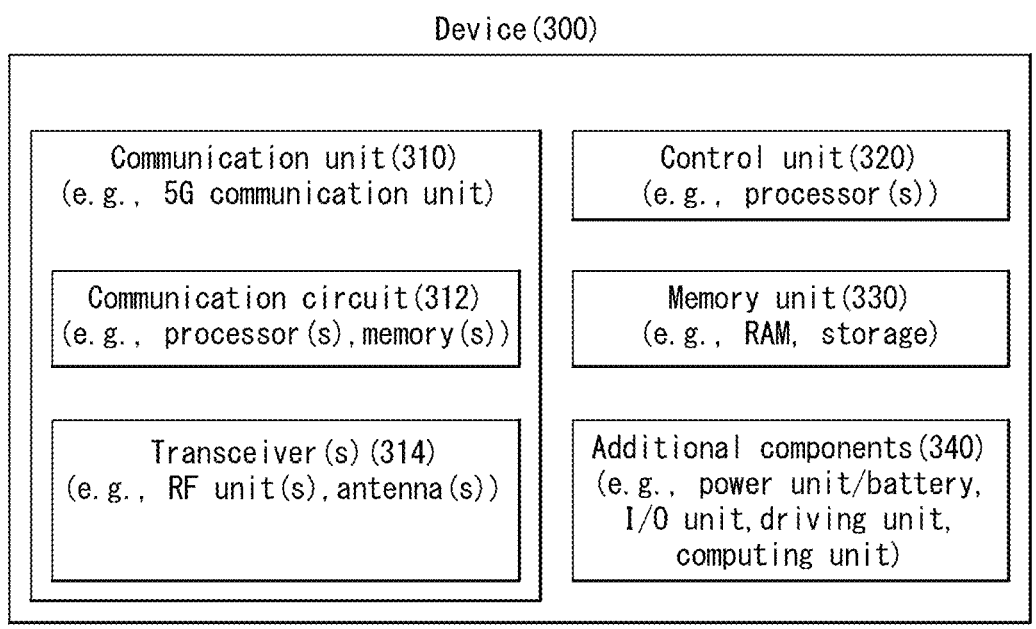
FIG. 3 illustrates another example of a wireless device applied to the present disclosure.

FIG. 3 shows another example of a wireless device based on an embodiment of the present disclosure.

Referring to FIG. 3, wireless device 300 may corresponds to the wireless devices 200a and 200b of FIG. 2 and may be configured by various elements, components, units/portions, and/or modules. For example, the wireless device 300 may include a communication unit 310, a control unit 320, a memory unit 330, and additional components 340. The communication unit may include a communication circuit 312 and transceiver(s) 314. For example, the communication circuit 312 may include the one or more processors 202a and 202b and/or the one or more memories 204a and 204b of FIG. 2. For example, the transceiver(s) 314 may include the one or more transceivers 206a and 206b and/or the one or more antennas 208a and 208b of FIG. 2. The control unit 320 is electrically connected to the communication unit 310, the memory 330, and the additional components 340 and controls overall operation of the wireless devices. For example, the control unit 320 may control an electric/mechanical operation of the wireless device based on programs/code/commands/information stored in the memory unit 330. The control unit 320 may transmit the information stored in the memory unit 330 to the exterior (e.g., other communication devices) via the communication unit 310 through a wireless/wired interface or store, in the memory unit 330, information received through the wireless/wired interface from the exterior (e.g., other communication devices) via the communication unit 310.

The additional components 340 may be variously configured based on types of wireless devices. For example, the additional components 340 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a fintech device (or a finance device), a security device, a climate/environment device, the AI server/device (140 of FIG. 1), the BSs (120 of FIG. 1), a network node, etc. The wireless device may be used in a mobile or fixed place based on a use—example/service.

In FIG. 3, the entirety of the various elements, components, units/portions, and/or modules in the wireless device 300 may be connected to each other through a wired interface or at least a part thereof may be wirelessly connected through the communication unit 310. For example, in each of the wireless device 300, the control unit 320 and the communication unit 310 may be connected by wire and the control unit 320 and first units (e.g., 330 and 340) may be wirelessly connected through the communication unit 310. Each element, component, unit/portion, and/or module within the wireless device 300 may further include one or more elements. For example, the control unit 320 may be configured by a set of one or more processors. As an example, the control unit 320 may be configured by a set of a communication control processor, an application processor, an Electronic Control Unit (ECU), a graphical processing unit, and a memory control processor. As another example, the memory 330 may be configured by a Random Access Memory (RAM), a Dynamic RAM (DRAM), a Read Only Memory (ROM)), a flash memory, a volatile memory, a non-volatile memory, and/or a combination thereof.

Hand-Held Device to which the Present Disclosure is Applied

Figure 4:
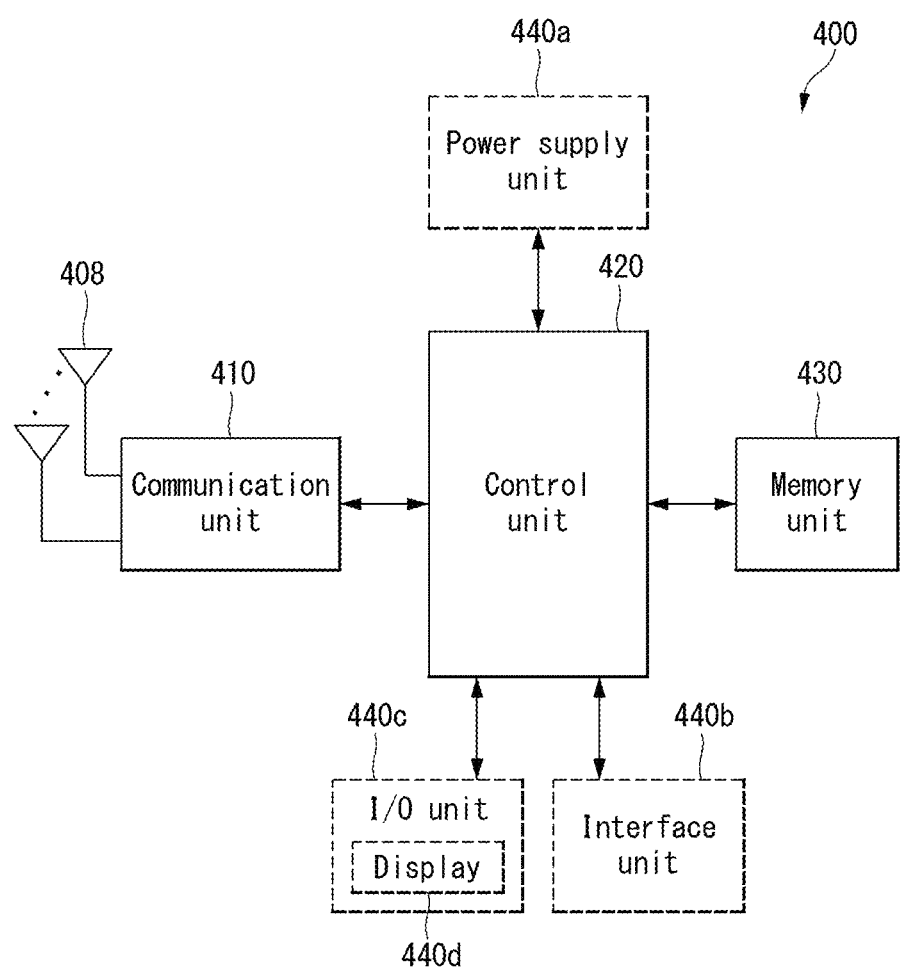
FIG. 4 illustrates a hand-held device applied to the present disclosure.

FIG. 4 shows a hand-held device based on an embodiment of the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 4, a hand-held device 400 may include an antenna unit 408, a communication unit 410, a control unit 420, a memory unit 430, a power supply unit 440a, an interface unit 440b, and an I/O unit 440c. The antenna unit 108 may be configured as a part of the communication unit 410. Blocks 410 to 430/440a to 440c correspond to the blocks 310 to 330/340 of FIG. 3, respectively.

The communication unit 410 may transmit and receive signals (e.g., data and control signals) to and from other wireless devices or BSs. The control unit 420 may perform various operations by controlling constituent elements of the hand-held device 400. The control unit 420 may include an Application Processor (AP). The memory unit 430 may store data/parameters/programs/code/commands needed to drive the hand-held device 400. The memory unit 430 may store input/output data/information. The power supply unit 440a may supply power to the hand-held device 400 and include a wired/wireless charging circuit, a battery, etc. The interface unit 440b may support connection of the hand-held device 400 to other external devices. The interface unit 440b may include various ports (e.g., an audio I/O port and a video I/O port) for connection with external devices. The I/O unit 440c may input or output video information/signals, audio information/signals, data, and/or information input by a user. The I/O unit 440c may include a camera, a microphone, a user input unit, a display unit 1400d, a speaker, and/or a haptic module.

As an example, in the case of data communication, the I/O unit 440c may acquire information/signals (e.g., touch, text, voice, images, or video) input by a user and the acquired information/signals may be stored in the memory unit 430. The communication unit 410 may convert the information/signals stored in the memory into radio signals and transmit the converted radio signals to other wireless devices directly or to a BS. The communication unit 410 may receive radio signals from other wireless devices or the BS and then restore the received radio signals into original information/ signals. The restored information/signals may be stored in the memory unit 430 and may be output as various types (e.g., text, voice, images, video, or haptic) through the I/O unit 440c.

Wireless Device to which the Present Disclosure is Applied

Figure 5:
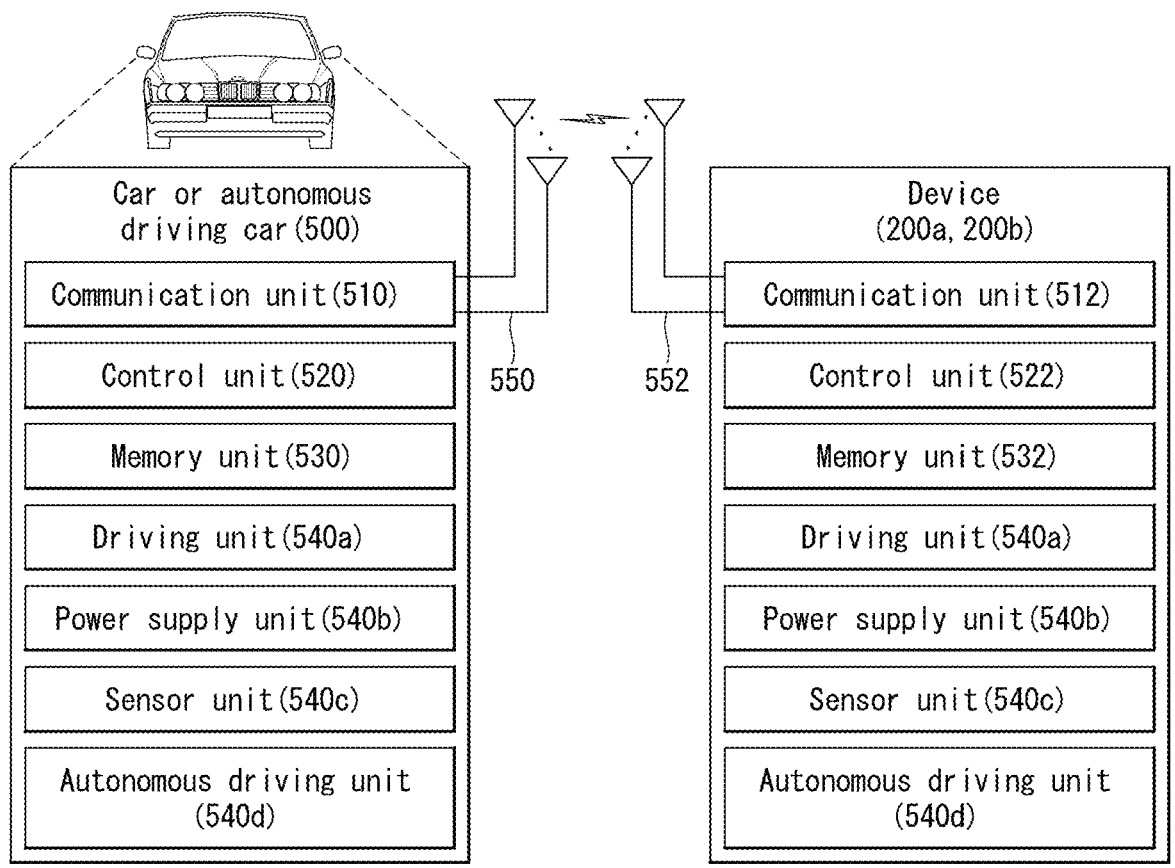
FIG. 5 illustrates a vehicle or an autonomous vehicle applied to the present disclosure.

FIG. 5 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 5, a vehicle or autonomous vehicle 500 may include an antenna unit 508, a communication unit 510, a control unit 520, a driving unit 540a, a power supply unit 540b, a sensor unit 540c, and an autonomous driving unit 540d. The antenna unit 508 may be configured as a part of the communication unit 510. The blocks 510/530/540a to 540d correspond to the blocks 410/430/440 of FIG. 4, respectively.

The communication unit 510 may transmit and receive signals (e.g., data and control signals) to and from external devices such as other vehicles, BSs (e.g., gNBs and road side units), and servers. The control unit 520 may perform various operations by controlling elements of the vehicle or the autonomous vehicle 500. The control unit 520 may include an Electronic Control Unit (ECU). The driving unit 540a may cause the vehicle or the autonomous vehicle 500 to drive on a road. The driving unit 540a may include an engine, a motor, a powertrain, a wheel, a brake, a steering device, etc. The power supply unit 540b may supply power to the vehicle or the autonomous vehicle 500 and include a wired/wireless charging circuit, a battery, etc. The sensor unit 540c may acquire a vehicle state, ambient environment information, user information, etc. The sensor unit 540c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 540d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 510 may receive map data, traffic information data, etc. from an external server. The autonomous driving unit 540d may generate an autonomous driving path and a driving plan from the obtained data. The control unit 520 may control the driving unit 540a such that the vehicle or the autonomous vehicle 500 may move along the autonomous driving path based on the driving plan (e.g., speed/direction control). In the middle of autonomous driving, the communication unit 510 may aperiodically/periodically acquire recent traffic information data from the external server and acquire surrounding traffic information data from neighboring vehicles. In the middle of autonomous driving, the sensor unit 540c may obtain a vehicle state and/or surrounding environment information. The autonomous driving unit 540d may update the autonomous driving path and the driving plan based on the newly obtained data/information. The communication unit 510 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 6:
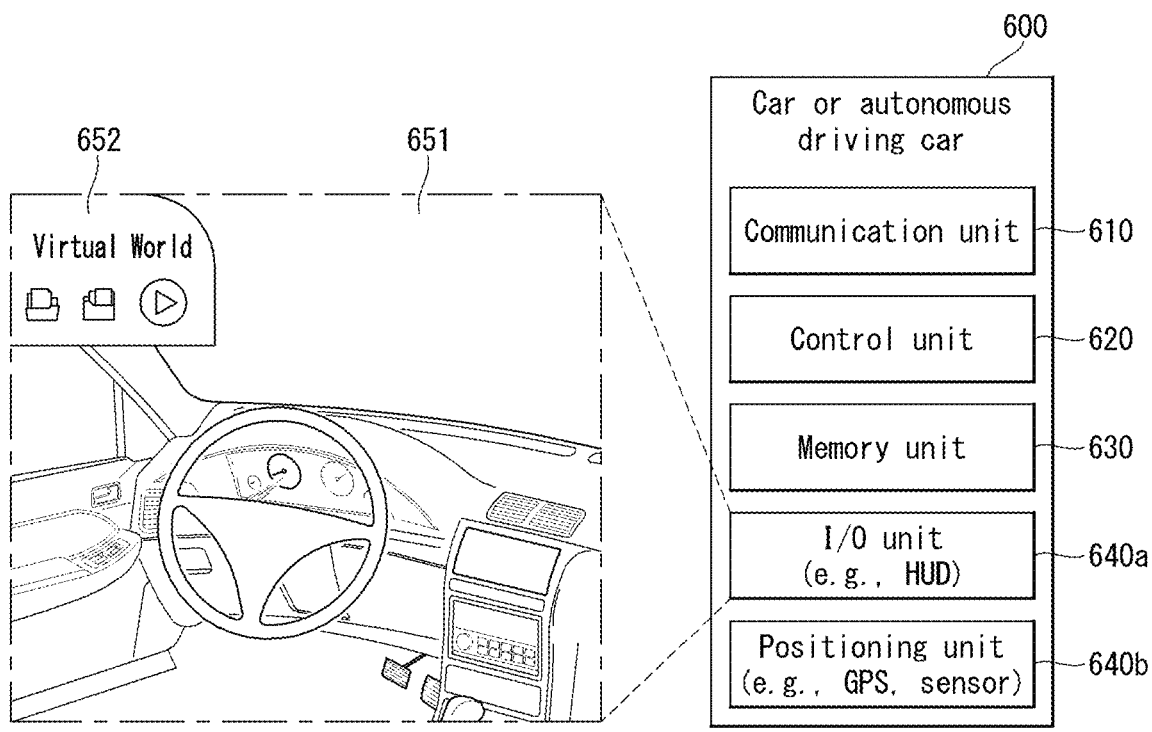
FIG. 6 illustrates a vehicle applied to the present disclosure.

FIG. 6 shows a vehicle based on an embodiment of the present disclosure. The vehicle may be implemented as a transport means, an aerial vehicle, a ship, etc.

Referring to FIG. 6, a vehicle 600 may include a communication unit 610, a control unit 620, a memory unit 630, an I/O unit 640a, and a positioning unit 640b. Herein, the blocks 610 to 630/640a and 640b correspond to blocks 610 to 330/340 of FIG. 3.

The communication unit 610 may transmit and receive signals (e.g., data and control signals) to and from external devices such as other vehicles or BSs. The control unit 620 may perform various operations by controlling constituent elements of the vehicle 600. The memory unit 630 may store data/parameters/programs/code/commands for supporting various functions of the vehicle 600. The I/O unit 140a may output an AR/VR object based on information within the memory unit 630. The I/O unit 140a may include an HUD. The positioning unit 640b may acquire information about the position of the vehicle 600. The position information may include information about an absolute position of the vehicle 600, information about the position of the vehicle 600 within a traveling lane, acceleration information, and information about the position of the vehicle 600 from a neighboring vehicle. The positioning unit 640b may include a GPS and various sensors.

As an example, the communication unit 610 of the vehicle 600 may receive map information and traffic information from an external server and store the received information in the memory unit 630. The positioning unit 640b may obtain the vehicle position information through the GPS and various sensors and store the obtained information in the memory unit 630. The control unit 620 may generate a virtual object based on the map information, traffic information, and vehicle position information and the I/O unit 640a may display the generated virtual object in a window in the vehicle (600). The control unit 620 may determine whether the vehicle 600 normally drives within a traveling lane, based on the vehicle position information. If the vehicle 600 abnormally exits from the traveling lane, the control unit 620 may display a warning on the window in the vehicle through the I/O unit 640a. In addition, the control unit 620 may broadcast a warning message regarding driving abnormity to neighboring vehicles through the communication unit 610. Based on situation, the control unit 620 may transmit the vehicle position information and the information about driving/vehicle abnormality to related organizations.

Figure 7:
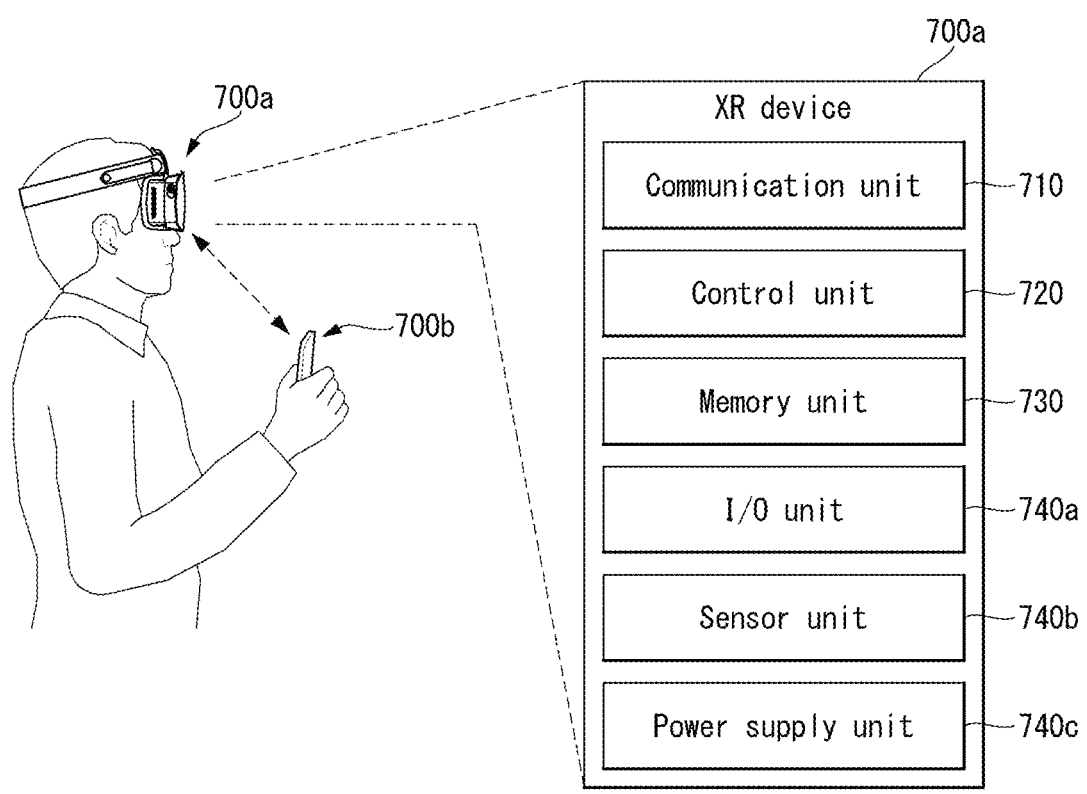
FIG. 7 illustrates an XR device applied to the present disclosure.

FIG. 7 shows an XR device based on an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 7, an XR device 700a may include a communication unit 710, a control unit 720, a memory unit 730, an I/O unit 740a, a sensor unit 740b, and a power supply unit 740c. Herein, the blocks 710 to 730/740a to 740c correspond to the blocks 310 to 330/340 of FIG. 3, respectively.

The communication unit 710 may transmit and receive signals (e.g., media data and control signals) to and from external devices such as other wireless devices, hand-held devices, or media servers. The media data may include video, images, and sound. The control unit 720 may perform various operations by controlling constituent elements of the XR device 700a. For example, the control unit 720 may be configured to control and/or perform procedures such as video/image acquisition, (video/image) encoding, and metadata generation and processing. The memory unit 730 may store data/parameters/programs/code/commands needed to drive the XR device 700a/generate XR object. The I/O unit 740a may obtain control information and data from the exterior and output the generated XR object. The I/O unit 740a may include a camera, a microphone, a user input unit, a display unit, a speaker, and/or a haptic module. The sensor unit 740b may obtain an XR device state, surrounding environment information, user information, etc. The sensor unit 740b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 740c may supply power to the XR device 700a and include a wired/wireless charging circuit, a battery, etc.

For example, the memory unit 730 of the XR device 700a may include information (e.g., data) needed to generate the XR object (e.g., an AR/VR/MR object). The I/O unit 740a may receive a command for manipulating the XR device 700a from a user and the control unit 720 may drive the XR device 700a based on a driving command of a user. For example, when a user desires to watch a film or news through the XR device 700a, the control unit 720 transmits content request information to another device (e.g., a hand-held device 700b) or a media server through the communication unit 730. The communication unit 730 may download/stream content such as films or news from another device (e.g., the hand-held device 700b) or the media server to the memory unit 730. The control unit 720 may control and/or perform procedures such as video/image acquisition, (video/image) encoding, and metadata generation/processing with respect to the content and generate/output the XR object based on information about a surrounding space or a real object obtained through the I/O unit 740a/sensor unit 740b.

The XR device 700a may be wirelessly connected to the hand-held device 700b through the communication unit 710 and the operation of the XR device 700a may be controlled by the hand-held device 1000b. For example, the hand-held device 1000b may operate as a controller of the XR device 700a. To this end, the XR device 700a may obtain information about a 3D position of the hand-held device 1000b and generate and output an XR object corresponding to the hand-held device 1000b.

Figure 8:
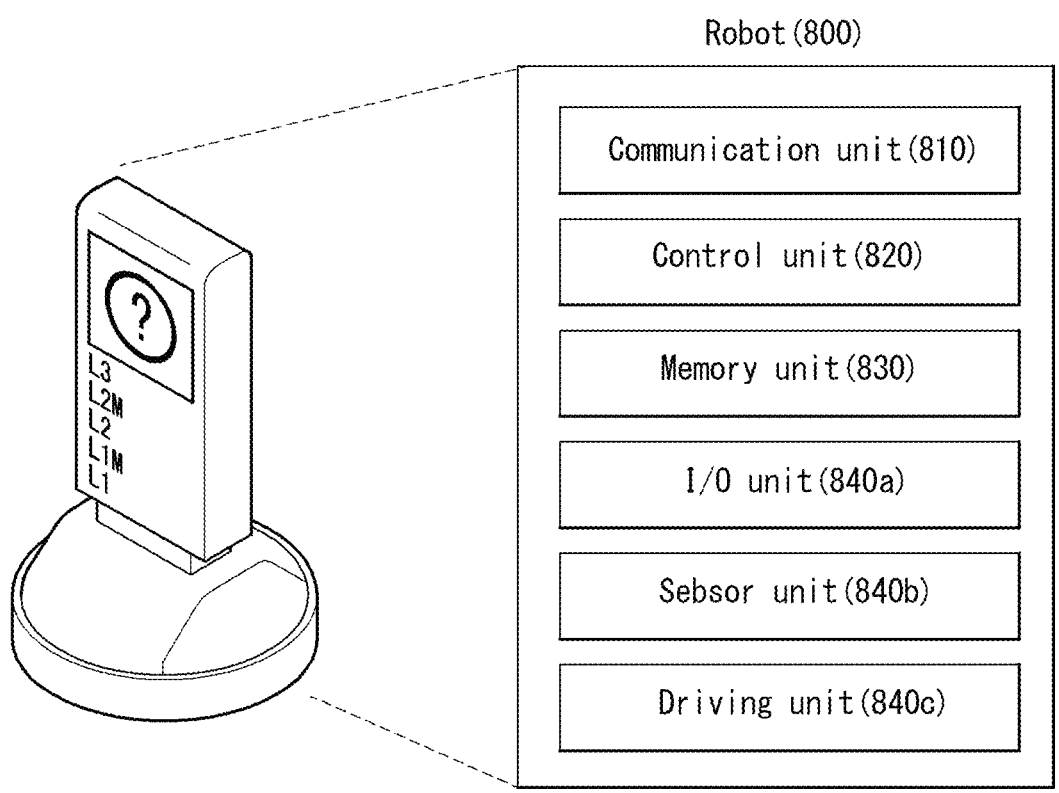
FIG. 8 illustrates a robot applied to the present disclosure.

FIG. 8 shows a robot based on an embodiment of the present disclosure. The robot may be categorized into an industrial robot, a medical robot, a household robot, a military robot, etc., based on a used purpose or field.

Referring to FIG. 8, a robot 800 may include a communication unit 810, a control unit 820, a memory unit 830, an I/O unit 840a, a sensor unit 840b, and a driving unit 840c. Herein, the blocks 810 to 830/840a to 840c correspond to the blocks 310 to 330/340 of FIG. 3, respectively.

The communication unit 810 may transmit and receive signals (e.g., driving information and control signals) to and from external devices such as other wireless devices, other robots, or control servers. The control unit 820 may perform various operations by controlling constituent elements of the robot 800. The memory unit 830 may store data/parameters/programs/code/commands for supporting various functions of the robot 800. The I/O unit 140a may obtain information from the exterior of the robot 800 and output information to the exterior of the robot 800. The I/O unit 140a may include a camera, a microphone, a user input unit, a display unit, a speaker, and/or a haptic module. The sensor unit 840b may obtain internal information of the robot 800, surrounding environment information, user information, etc. The sensor unit 840b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 840c may perform various physical operations such as movement of robot joints. In addition, the driving unit 840c may cause the robot 800 to travel on the road or to fly. The driving unit 840c may include an actuator, a motor, a wheel, a brake, a propeller, etc.

Figure 9:
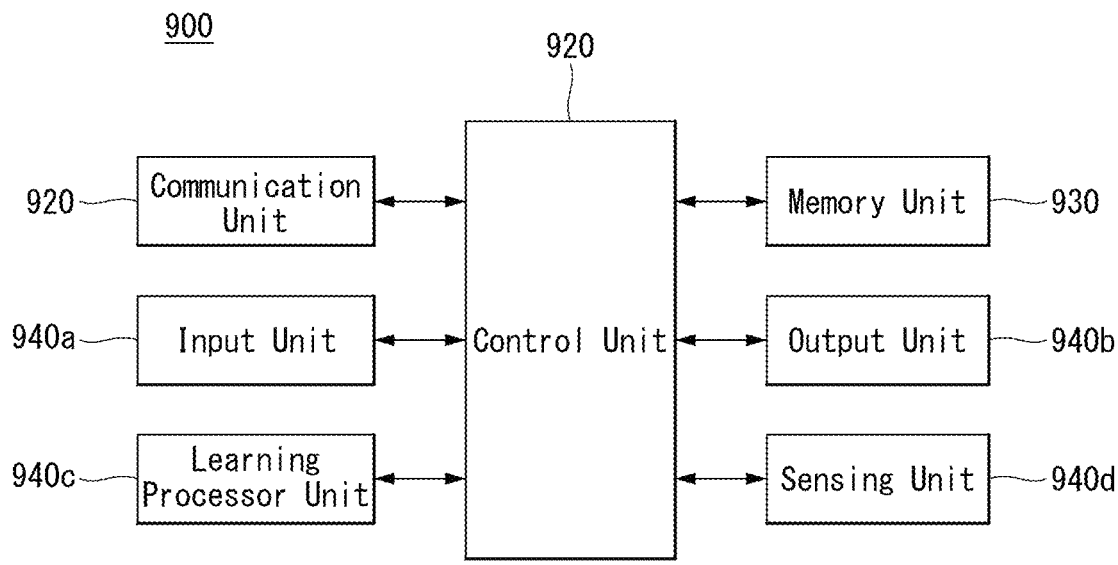
FIG. 9 illustrates an artificial intelligence (AI) device applied to the present disclosure.

FIG. 9 shows an AI device based on an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 9, an AI device 900 may include a communication unit 910, a control unit 920, a memory unit 930, an I/O unit 940a/940b, a learning processor unit 940c, and a sensor unit 940d. The blocks 910 to 930/940a to 940d correspond to blocks 310 to 330/340 of FIG. 3, respectively.

The communication unit 910 may transmit and receive wired/radio signals (e.g., sensor information, user input, learning models, or control signals) to and from external devices such as other AI devices (e.g., 100x, 120, or 140 of FIG. 1) or an AI server (e.g., 140 of FIG. 1) using wired/wireless communication technology. To this end, the communication unit 910 may transmit information within the memory unit 930 to an external device and transmit a signal received from the external device to the memory unit 930.

The control unit 920 may determine at least one feasible operation of the AI device 900, based on information which is determined or generated using a data analysis algorithm or a machine learning algorithm. The control unit 920 may perform an operation determined by controlling constituent elements of the AI device 900. For example, the control unit 920 may request, search, receive, or use data of the learning processor unit 940c or the memory unit 930 and control the constituent elements of the AI device 900 to perform a predicted operation or an operation determined to be preferred among at least one feasible operation. The control unit 920 may collect history information including the operation contents of the AI device 900 and operation feedback by a user and store the collected information in the memory unit 930 or the learning processor unit 940c or transmit the collected information to an external device such as an AI server (140 of FIG. 1). The collected history information may be used to update a learning model.

The memory unit 930 may store data for supporting various functions of the AI device 900. For example, the memory unit 930 may store data obtained from the input unit 940a, data obtained from the communication unit 910, output data of the learning processor unit 940c, and data obtained from the sensor unit 940. The memory unit 930 may store control information and/or software code needed to operate/drive the control unit 920.

The input unit 940a may acquire various types of data from the exterior of the AI device 900. For example, the input unit 940a may acquire learning data for model learning, and input data to which the learning model is to be applied. The input unit 940a may include a camera, a microphone, and/or a user input unit. The output unit 940b may generate output related to a visual, auditory, or tactile sense. The output unit 940b may include a display unit, a speaker, and/or a haptic module. The sensing unit 940 may obtain at least one of internal information of the AI device 900, surrounding environment information of the AI device 900, and user information, using various sensors. The sensor unit 940 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 940c may learn a model consisting of artificial neural networks, using learning data. The learning processor unit 940c may perform AI processing together with the learning processor unit of the AI server (140 of FIG. 1). The learning processor unit 940c may process information received from an external device through the communication unit 910 and/or information stored in the memory unit 930. In addition, an output value of the learning processor unit 940c may be transmitted to the external device through the communication unit 910 and may be stored in the memory unit 930.

Physical Channels and General Signal Transmission

In a wireless access system, a UE may receive information from a base station via downlink (DL) and transmit information to the base station via uplink (UL). Information transmitted and received between the base station and the UE includes general data information and various control information, and there are various physical channels based on a type/use of the information transmitted and received by them.

Figure 10:
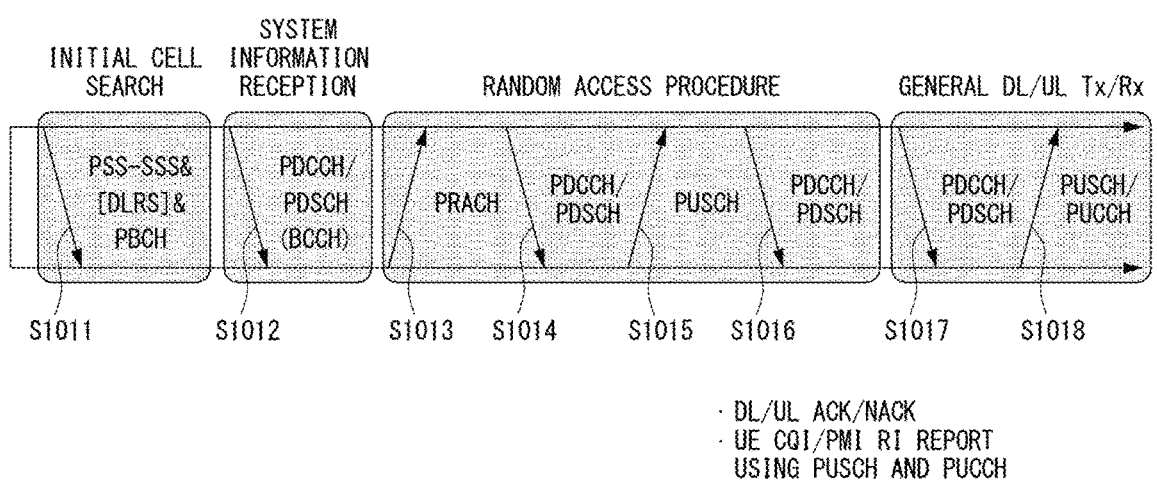
FIG. 10 illustrates physical channels applied to the present disclosure and a signal transmission method using the physical channels.

FIG. 10 illustrates physical channels applied to the present disclosure and a signal transmission method using the physical channels.

When the UE is powered on or newly enters a cell, the UE performs an initial cell search operation such as synchronizing with the base station (S1011). To this end, the UE may receive a Primary Synchronization Channel (P-SCH) and a (Secondary Synchronization Channel (S-SCH) from the base station and synchronize with the base station and acquire information such as a cell ID or the like.

Thereafter, the UE may receive a Physical Broadcast Channel (PBCH) from the base station and acquire in-cell broadcast information. Meanwhile, the UE receives a Downlink Reference Signal (DL RS) in an initial cell search step to check a downlink channel status. A UE that completes the initial cell search receives a Physical Downlink Control Channel (PDCCH) and a Physical Downlink Control Channel (PDSCH) according to information loaded on the PDCCH to acquire more specific system information (S1012).

When there is no radio resource first accessing the eNB or for signal transmission, the UE may perform a Random Access Procedure (RACH) to the eNB (S1013 to S1016). To this end, the UE may transmit a specific sequence to a preamble through a Physical Random Access Channel (PRACH) (S1013) and receive a response message (Random Access Response (RAR) message) for the preamble through the PDCCH and a corresponding PDSCH (S1014). The UE transmits a physical uplink shared channel (PUSCH) using the scheduling information in the RAR (S1015). The UE may perform a contention resolution procedure such as receiving a physical downlink control channel signal and a physical downlink shared channel signal corresponding thereto (S1016).

The UE that performs the above procedure may then perform PDCCH/PDSCH reception (S1017) and Physical Uplink Shared Channel (PUSCH)/Physical Uplink Control Channel (PUCCH) transmission (S1018) as a general uplink/downlink signal transmission procedure.

Control information transmitted by the UE to the base station is collectively referred to as uplink control information (UCI). The UCI includes HARQ-ACK/NACK (hybrid automatic repeat and request-acknowledgement/negative-ACK), scheduling request (SR), channel quality indication (CQI), precoding matrix indication (PMI), rank indication (RI), beam indication (BI) information, etc. In this instance, the UCI is generally transmitted periodically via PUCCH, but may be transmitted via PUSCH based on an embodiment (e.g., when control information and traffic data are to be simultaneously transmitted). The UE may aperiodically transmit the UCI via the PUSCH based on a request/indication of the network.

Figure 11:
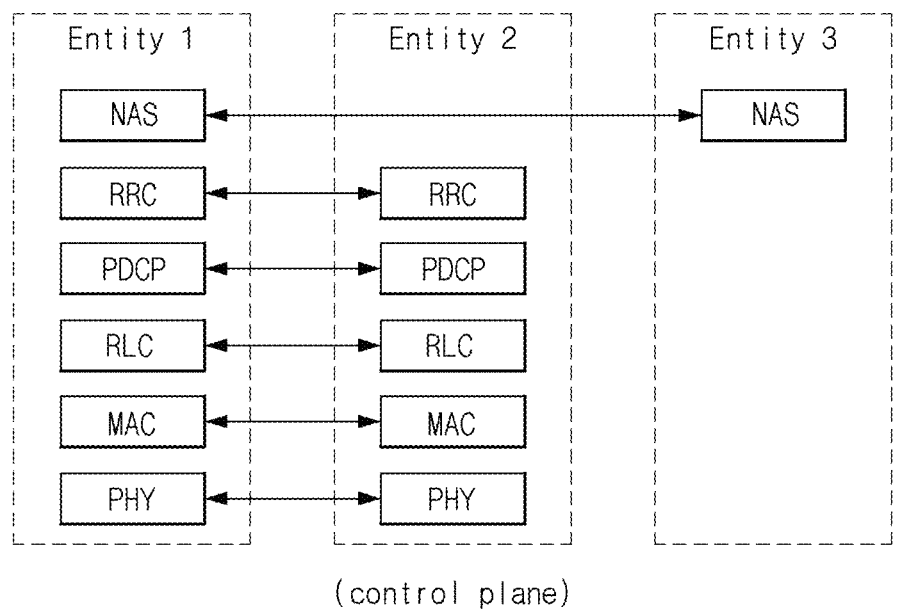
FIG. 11 illustrates structure of a control plane and a user plane of a radio interface protocol applied to the present disclosure.
Figure 11:
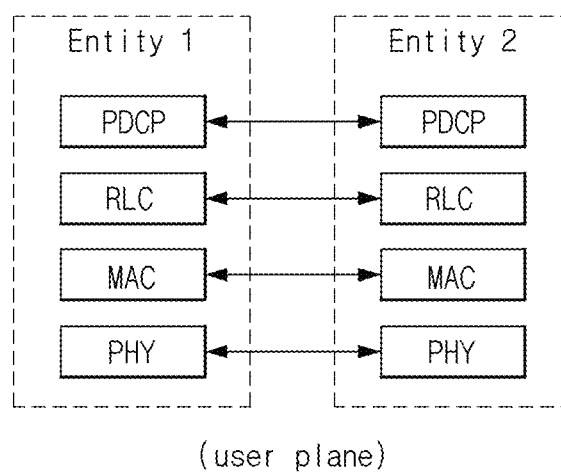

FIG. 11 illustrates structure of a control plane and a user plane of a radio interface protocol applied to the present disclosure.

Referring to FIG. 11, Entity 1 may be a user equipment (UE). In this instance, the UE may be at least one of a wireless device, a hand-held device, a vehicle, a mobile device, an XR device, a robot, and an AI applied to the present disclosure described above with reference to FIGS. 1 to 9. The UE also refers to a device to which the present disclosure can be applied, and may not be limited to a specific device or equipment.

Entity 2 may be a base station. In this instance, the base station may be at least one of eNB, gNB and ng-eNB. The base station may also refer to a device transmitting a downlink signal to the UE and may not be limited to a specific type or device. That is, the base station may be implemented in various forms or types and may not be limited to a specific form.

Entity 3 may be a network device or a device performing a network function. In this instance, the network device may be a core network node (e.g., mobility management entity (MME), access and mobility management function (AMF), etc.) that manages mobility. The network function may refer to a function implemented to perform a network function, and the Entity 3 may be a device to which the function is applied. That is, the Entity 3 may refer to a function or device that performs a network function, and is not limited to a specific type of device.

A control plane may mean a path through which control messages used for a UE and a network to manage calls are sent. A user plane may mean a path through which data generated in an application layer, for example, voice data or Internet packet data, etc. are transmitted. In this instance, a physical layer that is a first layer may provide information transfer service to an upper layer using a physical channel. The physical layer is connected to a medium access control layer located at the upper via a transport channel. Data may move between the medium access control layer and the physical layer via the transport channel. Data may move between a physical layer at a transmission side and a physical layer at a reception side via the physical channel. In this instance, the physical channel utilizes time and frequency as radio resources.

A medium access control (MAC) layer of a second layer provides service to a radio link control (RLC) layer that is the upper layer via a logical channel. The RLC layer of the second layer may support reliable transmission of data. Functions of the RLC layer may be implemented as a functional block inside the MAC layer. A packet data convergence protocol (PDCP) layer of a second layer may perform a header compression function of reducing unnecessary control information, in order to efficiently transmit IP packet such as IPv4 or IPv6 in a radio interface with a narrow bandwidth. A radio resource control (RRC) layer located at a lowest part of a third layer is defined only in the control plane. The RRC layer may take charge of the control of logical channels, transport channels, and physical channels in relation to configuration, re-configuration, and release of radio bearers (RBs). The RB may refer to service provided by the second layer for the purpose of data transfer between the UE and the network. To this end, the UE and the RRC layer of the network may exchange an RRC message between them. A non-access stratum (NAS) layer located at the upper of the RRC layer may perform functions of session management, mobility management, and so on. One cell constituting a base station may be configured with one of various bandwidths to provide downlink or uplink transmission services to several UEs. The different cells may be configured to provide different bandwidths. Examples of a downlink transport channel for transmitting data from the network to the UE include a broadcast channel (BCH) which transmits system information, a paging channel (PCH) which sends a paging message, a downlink shared channel (SCH) which sends a user traffic or a control message, and the like. Traffic or a control message of downlink multicast or broadcast service may be transmitted via the downlink SCH or transmitted via a separate downlink multicast channel (MCH). Examples of an uplink transport channel for transmitting data from the UE to the network include a random access channel (RACH) which sends an initial control message, and an uplink shared channel (SCH) which sends a user traffic or a control message. Examples of a logical channel that is located at the upper of a transport channel and is mapped to the transport channel include a broadcast control channel (BCCH), a paging control channel (PCCH), a common control channel (CCCH), a multicast control channel (MCCH), a multicast traffic channel (MTCH), and the like.

Figure 12:
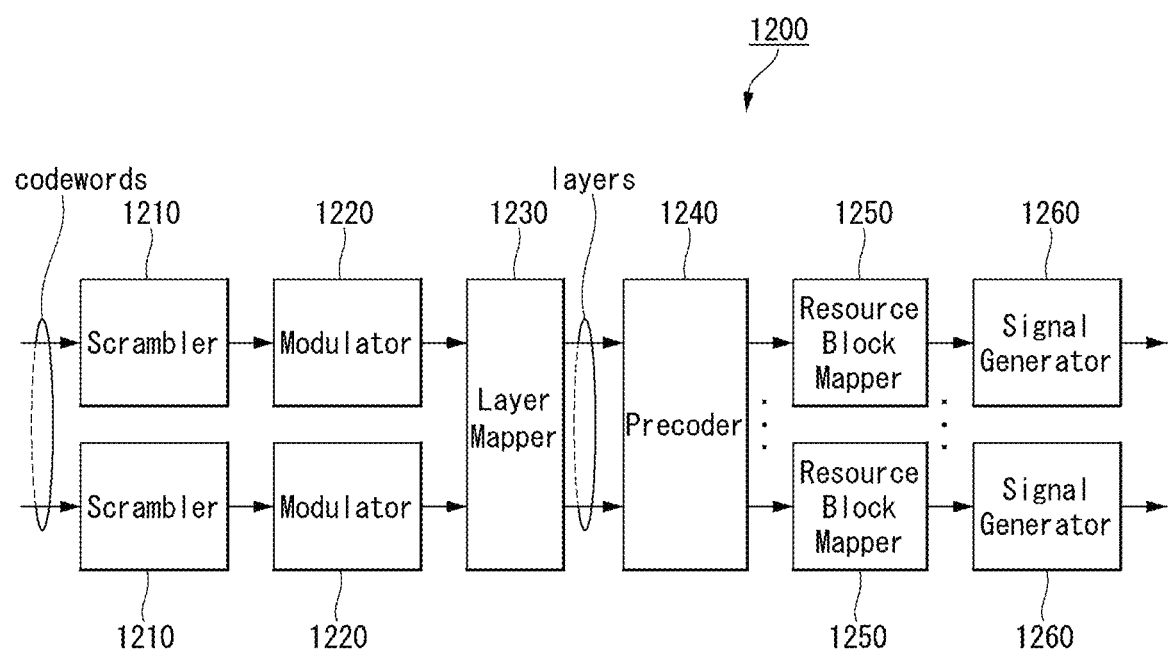
FIG. 12 illustrates a method of processing a transmission signal applied to the present disclosure.

FIG. 12 illustrates a method of processing a transmission signal applied to the present disclosure. For example, a transmission signal may be processed by a signal processing circuit. A signal processing circuit 1200 may include a scrambler 1210, a modulator 1220, a layer mapper 1230, a precoder 1240, a resource mapper 1250, and a signal generator 1260. For example, operations/functions of FIG. 12 may be performed by the processors 202a and 202b and/or the transceivers 206a and 206b of FIG. 2. For example, hardware elements of FIG. 12 may be implemented in the processors 202a and 202b and/or the transceivers 206a and 206b of FIG. 2. For example, blocks 1010 to 1060 may be implemented in the processors 202a and 202b of FIG. 2. Further, blocks 1210 to 1250 may be implemented in the processors 202a and 202b of FIG. 2, and a block 1260 may be implemented in the transceivers 206a and 206b of FIG. 2. Theses blocks are not limited to the above described embodiments.

A codeword may be transformed into a radio signal via the signal processing circuit 1200 of FIG. 12. The codeword is an encoded bit sequence of an information block. The information block may include transport blocks (e.g., a UL-SCH transport block, a DL-SCH transport block, etc.). The radio signal may be transmitted via various physical channels (e.g., PUSCH, PDSCH, etc) of FIG. 10. Specifically, the codeword may be transformed into a bit sequence scrambled by the scrambler 1210. A scramble sequence used for scrambling may be generated based on an initialization value, and the initialization value may include ID information, etc. of a wireless device. The scrambled bit sequence may be modulated into a modulated symbol sequence by the modulator 1220. A modulation scheme may include pi/2-binary phase shift keying (BPSK), m-phase shift keying (PSK), m-quadrature amplitude modulation (QAM), etc.

A complex modulated symbol sequence may be mapped to one or more transport layers by the layer mapper 1230. Modulated symbols of each transport layer may be mapped to corresponding antenna port(s) by the precoder 1240 (precoding). An output z of the precoder 1240 may be obtained by multiplying an output y of the layer mapper 1230 by a precoding matrix W of N×M, where N is the number of antenna ports, and M is the number of transport layers. The precoder 1240 may perform precoding after performing transform precoding (e.g., discrete Fourier transform (DFT) transform) on complex modulated symbols. The precoder 1240 may also perform the precoding without performing the transform precoding.

The resource mapper 1250 may map the modulated symbols of each antenna port to time-frequency resources. The time-frequency resources may include a plurality of symbols (e.g., CP-OFDMA symbol and DFT-s-OFDMA symbol) in a time domain and may include a plurality of subcarriers in a frequency domain. The signal generator 1260 may generate the radio signal from the mapped modulated symbols, and the generated radio signal may be transmitted to another device over each antenna. To this end, the signal generator 1260 may include an inverse fast Fourier transform (IFFT) module, a cyclic prefix (CP) insertor, a digital-to-analog converter (DAC), a frequency uplink converter, and the like.

A signal processing process for a received signal in the wireless device may be configured in the reverse of the signal processing processes 1210 to 1260 of FIG. 12. For example, the wireless device (e.g., 200a and 200b of FIG. 2) may receive the radio signal from the outside through the antenna port/transceiver. The received radio signal may be converted into a baseband signal through a signal reconstructor. To this end, the signal reconstructor may include a frequency downlink converter, an analog-to-digital converter (ADC), a CP remover, and a fast Fourier transform (FFT) module. Afterwards, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the received signal may include a signal reconstructer, a resource demapper, a postcoder, a demodulator, a descrambler, and a decoder.

Figure 13:
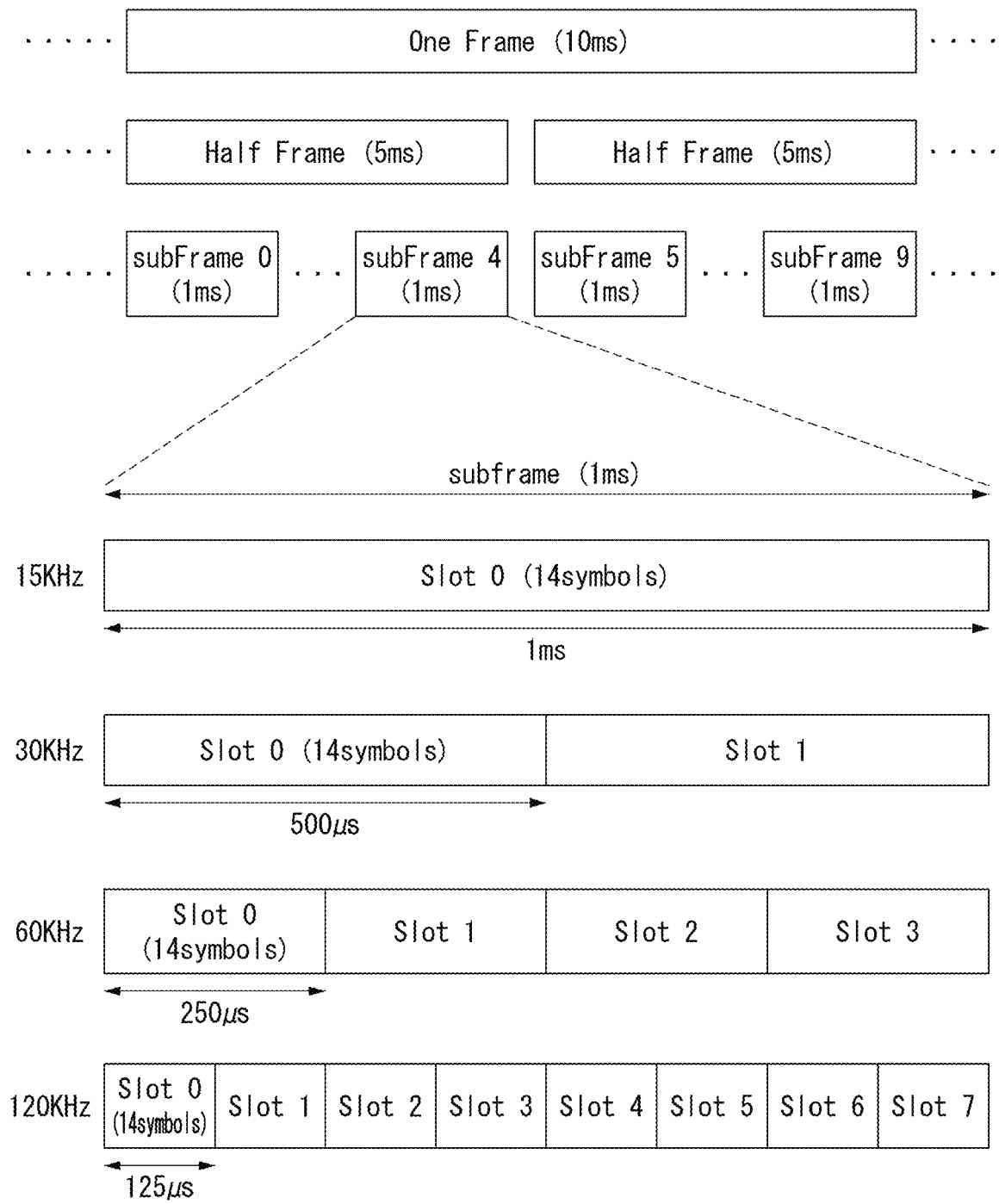
FIG. 13 illustrates a structure of a radio frame applicable to the present disclosure.

FIG. 13 illustrates a structure of a radio frame applicable to the present disclosure.

Uplink and downlink transmission based on the NR system may be based on a frame illustrated in FIG. 13. In this instance, one radio frame may have a length of 10 ms and may be defined as two 5 ms half-frames (HFs). One half-frame may be defined as five 1 ms subframes (SFs). One subframe may be split into one or more slits, and the number of slots in the subframe may depend on a subcarrier spacing (SCS). In this instance, each slot may include 12 or 14 OFDM(A) symbols depending on a cyclic prefix (CP). If a normal CP is used, each slot may include 14 symbols. If an extended CP is used, each slot may include 12 symbols. Here, the symbol may include an OFDM symbol (or CP-OFDM symbol) and an SC-FDMA symbol (or DFT-s-OFDM symbol).

Table 1 illustrates the number of symbols per slot ($N^{slot}_{symb}$), the number of slots per frame ($N^{frame,u}_{slot}$), and the number of slots per subframe ($N^{subframe,u}_{slot}$) depending on the SCS configuration (u) when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 illustrates the number of symbols per slot, the number of slots per frame, and the number of slots per subframe depending on the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In a system to which the present disclosure is applicable, OFDM(A) numerology (e.g., SCS, CP length, etc.) may be configured set between a plurality of cells merged into one UE. Hence, an (absolute time) duration of a time resource (e.g., SF, slot or TTI) (for convenience, collectively referred to as a time unit (TU)) consisting of the same number of symbols may be configured differently between the merged cells.

The NR may support multiple numerologies (or subcarrier spacing (SCS)) for supporting various 5G services. For example, when the SCS is 15 kHz, the NR may support a wide area in traditional cellular bands; when the SCS is 30 kHz/60 kHz, the NR may support dense-urban, lower latency, and wider carrier bandwidth; and when the SCS is 60 kHz or higher, the NR may support a bandwidth larger than 24.25 GHz to overcome a phase noise.

An NR frequency band is defined as frequency ranges of two types (FR1 and FR2). FR1 and FR2 may be configured as Table below. The FR2 may mean millimeter wave (mmW).

TABLE 3

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 14:
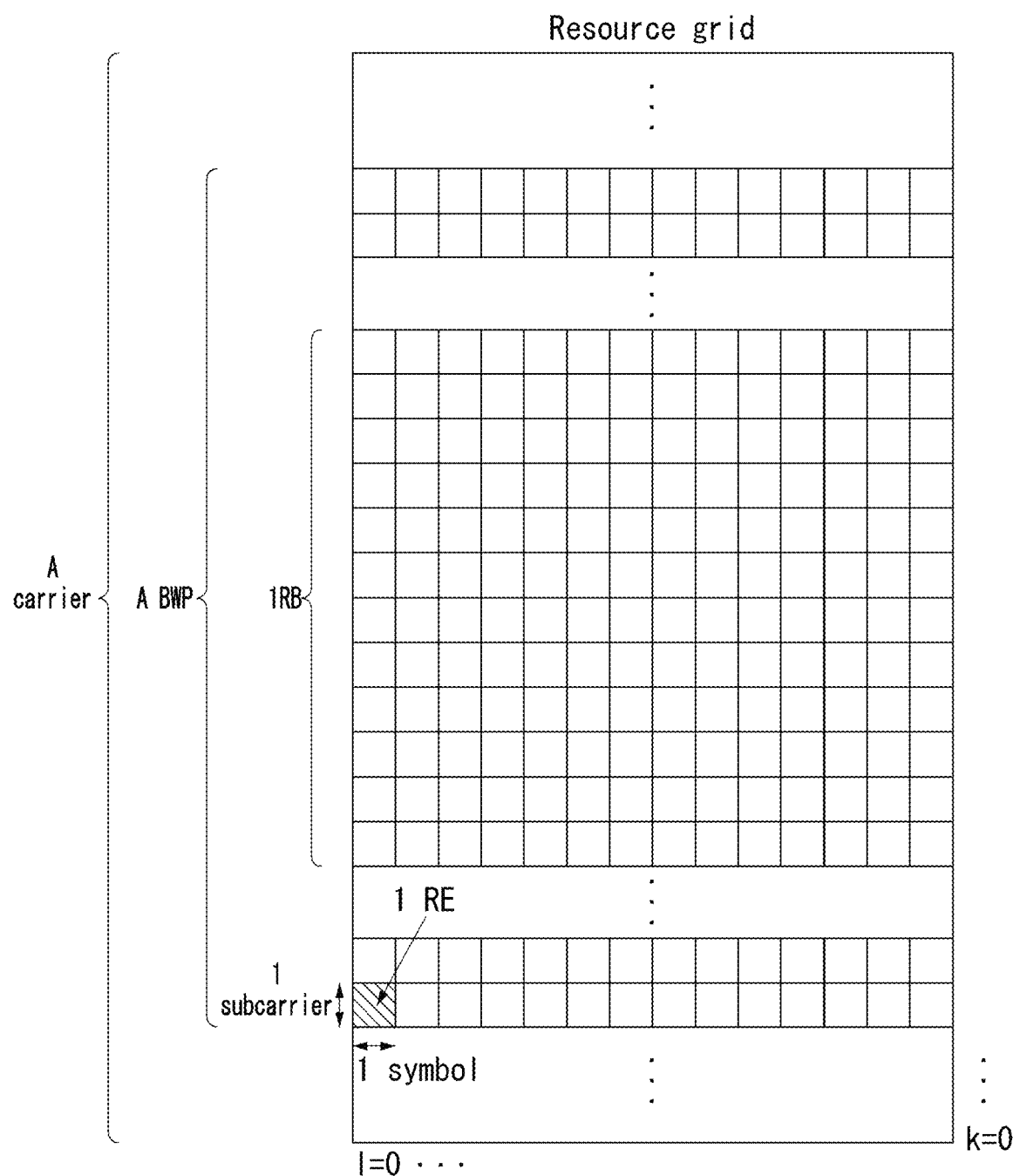
FIG. 14 illustrates a slot structure applicable to the present disclosure.

In addition, for example, in a communication system to which the present disclosure is applicable, the above-described numerology may be differently configured. For example, terahertz wave (THz) band may be used as a frequency band higher than the FR2. In the THz band, an SCS may be set to be larger than the SCS of the NR system, and the number of slots may be differently set. The present disclosure is not limited to the above-described embodiment. The THz band is described below FIG. 14 illustrates a slot structure applicable to the present disclosure.

One slot includes a plurality of symbols in a time domain. For example, one slot includes 7 symbols in the case of normal CP, while one slot may include 6 symbols in the case of extended CP. A carrier includes a plurality of subcarriers in a frequency domain. A resource block (RB) may be defined as a plurality of (e.g., 12) consecutive subcarriers in the frequency domain.

Further, a bandwidth part (BWP) may be defined as a plurality of consecutive (P)RBs in the frequency domain and may correspond to one numerology (e.g., SCS, CP length, etc.).

The carrier may include up to N (e.g., 5) BWPs. The data communication may be performed through an activated BWP, and only one BWP may be activated in one UE. In a resource grid, each element is referred to as a resource element (RE), and one complex symbol may be mapped to each RE.

6G System

A 6G (wireless communication) system has purposes such as (i) a very high data rate per device, (ii) a very large number of connected devices, (iii) global connectivity, (iv) a very low latency, (v) a reduction in energy consumption of battery-free IoT devices, (vi) ultra-reliable connectivity, and (vii) connected intelligence with machine learning capability. The vision of the 6G system may include four aspects such as intelligent connectivity, deep connectivity, holographic connectivity, and ubiquitous connectivity, and the 6G system may satisfy the requirements shown in Table 4 below. That is, Table 4 shows an example of the requirements of the 6G system.

TABLE 4

| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion, and enhanced data security.

Figure 15:
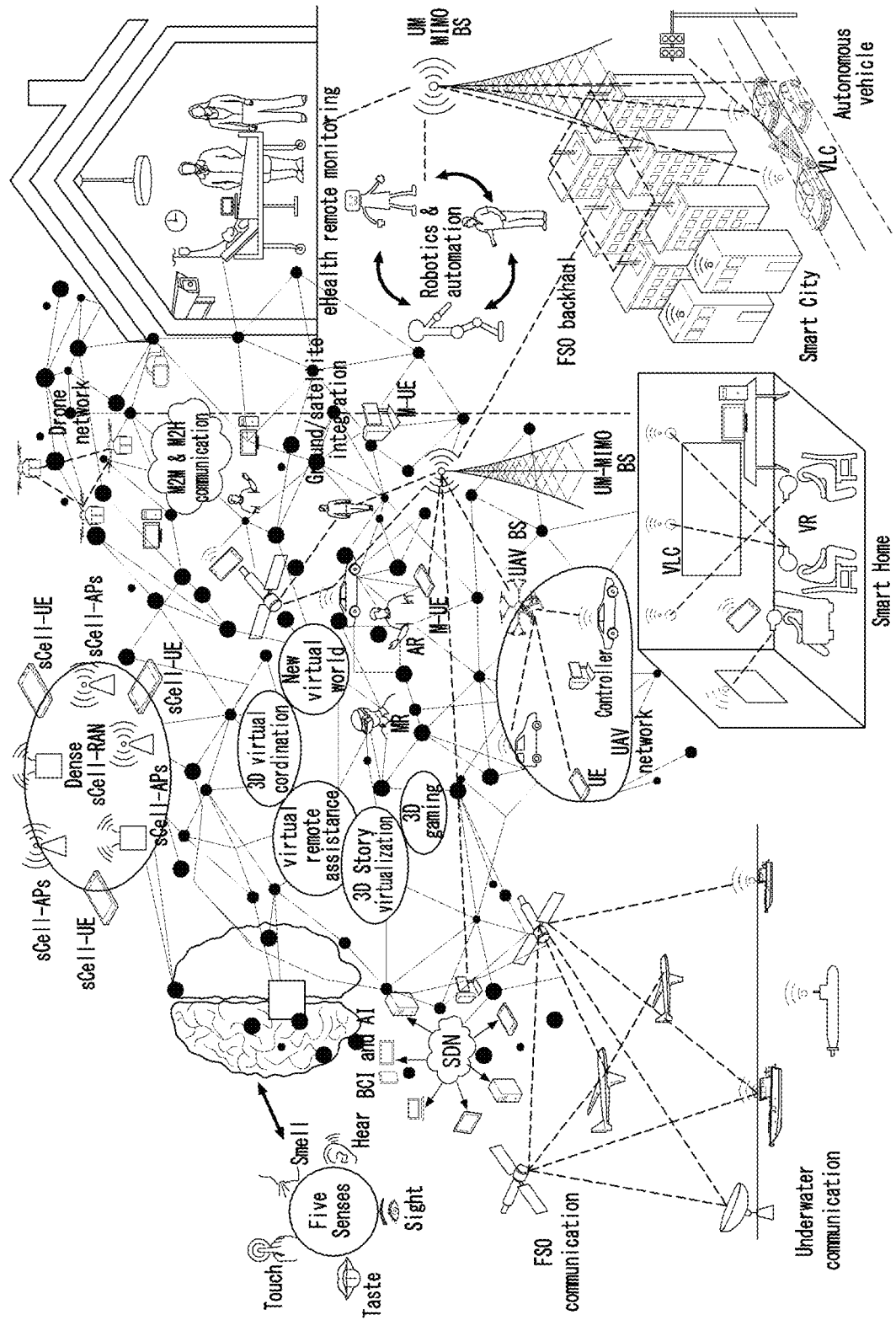
FIG. 15 illustrates an example of a communication structure providable to a 6G system applicable to the present disclosure.
Figure 16:
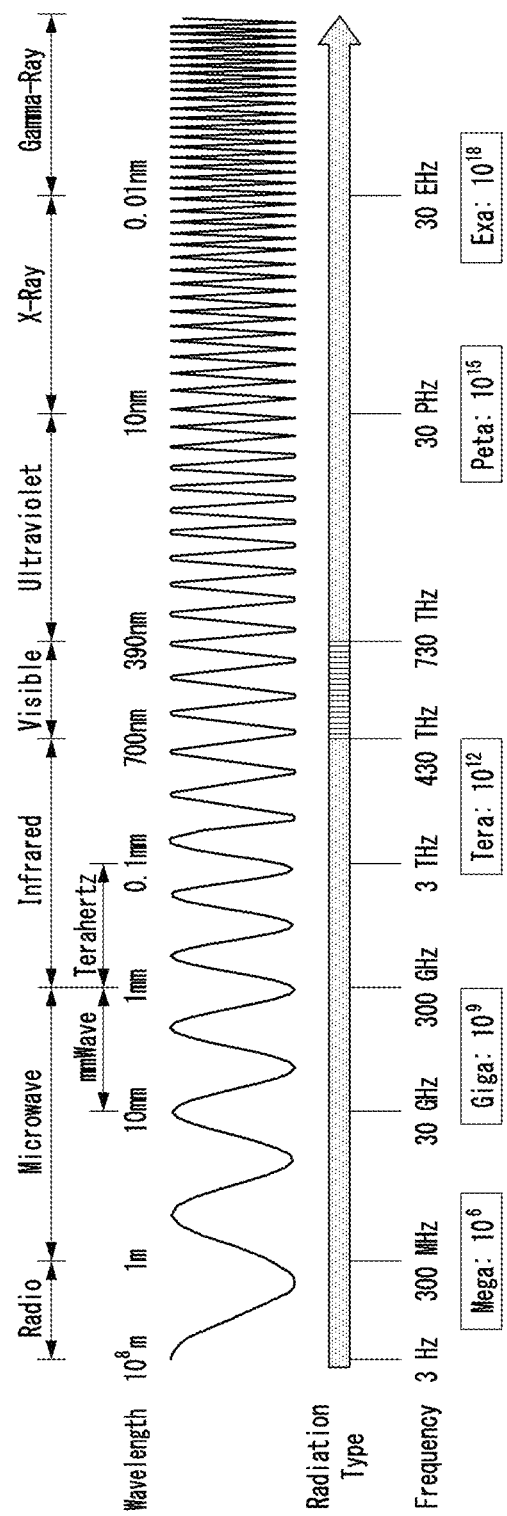
FIG. 16 illustrates an electromagnetic spectrum applicable to the present disclosure.

FIG. 15 illustrates an example of a communication structure providable in a 6G system.

The 6G system is expected to have 50 times greater simultaneous wireless communication connectivity than a 5G wireless communication system. URLLC, which is the key feature of 5G, will become more important technology by providing an end-to-end latency less than 1 ms in 6G communication. The 6G system may have much better volumetric spectrum efficiency unlike frequently used domain spectrum efficiency. The 6G system can provide advanced battery technology for energy harvesting and very long battery life, and thus mobile devices may not need to be separately charged in the 6G system. In 6G, new network characteristics may be as follows.

Satellites integrated network: To provide a global mobile group, 6G will be integrated with satellite. Integration of terrestrial, satellite and public networks into one wireless communication system is critical for 6G.

Connected intelligence: Unlike the wireless communication systems of previous generations, 6G is innovative and may update wireless evolution from "connected things" to "connected intelligence". AI may be applied in each step (or each signal processing procedure to be described later) of a communication procedure.

Seamless integration of wireless information and energy transfer: A 6G wireless network may transfer power to charge batteries of devices such as smartphones and sensors. Therefore, wireless information and energy transfer (WIET) will be integrated.

Ubiquitous super 3D connectivity: Access to networks and core network functions of drone and very low earth orbit satellite will establish super 3D connectivity in 6G ubiquitous.

In the new network characteristics of 6G described above, several general requirements may be as follows.

Small cell networks: The idea of a small cell network has been introduced to improve received signal quality as a result of throughput, energy efficiency, and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network consisting of heterogeneous networks improves overall QoS and reduces costs.

High-capacity backhaul: Backhaul connectivity is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability. Further, billions of devices can be shared on a shared physical infrastructure.

Core Implementation Technology of 6G System

Artificial Intelligence (AI)

Technology which is most important in the 6G system and will be newly introduced is AI. AI was not involved in the 4G system. The 5G system will support partial or very limited AI. However, the 6G system will support AI for full automation. Advance in machine learning will create a more intelligent network for real-time communication in 6G. When AI is introduced to communication, real-time data transmission can be simplified and improved. AI may determine a method of performing complicated target tasks using countless analysis. That is, AI can increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, and in particular, deep learning has been focused on the wireless resource management and allocation field. However, such studies have been gradually developed to the MAC layer and the physical layer, and in particular, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. The machine learning may also be used for antenna selection, power control, symbol detection, etc. in the MIMO system.

However, application of a deep neutral network (DNN) for transmission in the physical layer may have the following problems.

A deep learning based AI algorithm requires a lot of training data in order to optimize training parameters. However, due to limitations in acquiring data in a specific channel environment as the training data, a lot of training data is used offline. Static training for the training data in the specific channel environment may cause a contradiction between the diversity and dynamic characteristics of a radio channel.

Currently, the deep learning mainly targets real signals. However, signals of the physical layer of wireless communication are complex signals. For matching of the characteristics of a wireless communication signal, studies on a neural network for detecting a complex domain signal are further required.

Hereinafter, machine learning is described in more detail.

Machine learning refers to a series of operations to train a machine in order to create a machine capable of doing tasks that people cannot do or are difficult for people to do. Machine learning requires data and learning models. In the machine learning, a data learning method may be roughly divided into three methods, that is, supervised learning, unsupervised learning and reinforcement learning.

Neural network learning is to minimize an output error. The neural network learning refers to a process of repeatedly inputting training data to a neural network, calculating an error of an output and a target of the neural network for the training data, backpropagating the error of the neural network from an output layer to an input layer of the neural network for the purpose of reducing the error, and updating a weight of each node of the neural network.

The supervised learning may use training data labeled with a correct answer, and the unsupervised learning may use training data which is not labeled with a correct answer. That is, for example, in supervised learning for data classification, training data may be data in which each training data is labeled with a category. The labeled training data may be input to the neural network, and the error may be calculated by comparing the output (category) of the neural network with the label of the training data. The calculated error is backpropagated in the neural network in the reverse direction (i.e., from the output layer to the input layer), and a connection weight of respective nodes of each layer of the neural network may be updated based on the backpropagation. Change in the updated connection weight of each node may be determined depending on a learning rate. The calculation of the neural network for input data and the backpropagation of the error may construct a learning cycle (epoch). The learning rate may be differently applied based on the number of repetitions of the learning cycle of the neural network. For example, in the early stage of learning of the neural network, efficiency can be increased by allowing the neural network to rapidly ensure a certain level of performance using a high learning rate, and in the late of learning, accuracy can be increased using a low learning rate.

The learning method may vary depending on the feature of data. For example, in order for a reception end to accurately predict data transmitted from a transmission end on a communication system, it is preferable that learning is performed using the supervised learning rather than the unsupervised learning or the reinforcement learning.

The learning model corresponds to the human brain and may be regarded as the most basic linear model. However, a paradigm of machine learning using, as the learning model, a neural network structure with high complexity, such as artificial neural networks, is referred to as deep learning.

Neural network cores used as the learning method may roughly include a deep neural network (DNN) method, a convolutional deep neural network (CNN) method, and a recurrent Boltzmann machine (RNN) method.

Terahertz (THz) Communication

A data transfer rate can be increased by increasing the bandwidth. This can be performed by using sub-TH communication as a wide bandwidth and applying advanced massive MIMO technology. THz waves, which are known as sub-millimeter radiation, generally indicate a frequency band between 0.1 THz and 10 THz with the corresponding wavelengths in the range of 0.03 mm-3 mm. A band range of 100 GHz to 300 GHz (sub THz band) is regarded as a main part of the THz band for cellular communication. When the sub-THz band is added to the mmWave band, the 6G cellular communication capacity increases. 300 GHz-3 THz among the defined THz band is in a far infrared (IR) frequency band. Although the 300 GHz-3 THz band is part of the optical band, it is at the border of the optical band and is immediately after the RF band. Therefore, this 300 GHz-3 THz band shows similarity with RF. FIG. 10 illustrates an example of an electromagnetic spectrum.

The main characteristics of THz communication include (i) a bandwidth widely available to support a very high data transfer rate and (ii) a high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Through this, an advanced adaptive arrangement technology capable of overcoming a range limitation can be used.

Optical Wireless Technology

Optical wireless communication (OWC) technologies are envisioned for 6G communication in addition to RF based communications for all possible device-to-access networks. These networks access network-to-backhaul/fronthaul network connectivity. The OWC technologies have already been used since 4G communication systems, but will be used more widely to meet the demands of the 6G communication system. The OWC technologies, such as light fidelity, visible light communication, optical camera communication, and FSO communication based on the optical band, are already well-known technologies. Communications based on wireless optical technologies can provide very high data rates, low latencies, and secure communications. LiDAR, which is also based on the optical band, is a promising technology for very high-resolution 3D mapping in 6G communications.

FSO Backhaul Network

Characteristics of a transmitter and a receiver of the FSO system are similar to characteristics of an optical fiber network. Therefore, data transmission of the FSO system similar to that of the optical fiber system. Accordingly, FSO can be a good technology for providing backhaul connectivity in the 6G system along with the optical fiber network. If FSO is used, very long-distance communication is possible even at a distance of 10,000 km or more. FSO supports massive backhaul connectivity for remote and non-remote areas such as sea, space, underwater, and isolated islands. FSO also supports cellular BS connectivity.

Massive MIMO Technology

One of core technologies for improving spectral efficiency is to apply MIMO technology. When the MIMO technology is improved, the spectral efficiency is also improved. Therefore, massive MIMO technology will be important in the 6G system. Since the MIMO technology uses multiple paths, multiplexing technology and beam generation and management technology suitable for the THz band should be significantly considered so that data signals can be transmitted through one or more paths.

Block Chain

A block chain will be an important technology for managing large amounts of data in future communication systems. The block chain is a form of distributed ledger technology, and the distributed ledger is a database distributed across numerous nodes or computing devices. Each node duplicates and stores the same copy of the ledger. The block chain is managed by a P2P network. This may exist without being managed by a centralized institution or server. Block chain data is collected together and is organized into blocks. The blocks are connected to each other and protected using encryption. The block chain completely complements large-scale IoT through improved interoperability, security, privacy, stability, and scalability. Accordingly, the block chain technology provides several functions such as interoperability between devices, high-capacity data traceability, autonomous interaction of different IoT systems, and large-scale connection stability of 6G communication systems.

3D Networking

The 6G system integrates the ground and air networks to support communications for users in the vertical extension. The 3D BSs will be provided by low-orbit satellites and UAVs. The addition of new dimensions in terms of height and the associated degrees of freedom makes 3D connectivity significantly different from traditional 2D networks.

Quantum Communication

Unsupervised reinforcement learning in networks is promising in the context of 6G networks. Supervised learning approaches will not be practical for labeling large amounts of data generated in 6G. Unsupervised learning does not require labeling. Therefore, this technique can be used to create the representations of complex networks autonomously. By combining reinforcement learning and unsupervised learning, it is possible to operate the network truly autonomously.

Unmanned Aerial Vehicle

An unmanned aerial vehicle (UAV) or drone will be an important factor in 6G wireless communication. In most cases, a high-speed data wireless connection is provided using UAV technology. A BS entity is installed in the UAV to provide cellular connectivity. The UAVs have specific features, which are not found in fixed BS infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC, and mMTC. The UAV can also support a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and different communication technologies is very important in 6G systems. As a result, the user can move seamlessly from one network to another network without the need for making any manual configurations in the device. The best network is automatically selected from the available communication technology. This will break the limits of the concept of cells in wireless communications. Currently, the user's movement from one cell to another cell causes too many handovers in dense networks, and also causes handover failures, handover delays, data losses, and the ping-pong effect. The 6G cell-free communications will overcome all these and provide better QoS. Cell-free communication will be achieved through multi-connectivity and multi-tier hybrid techniques and by different and heterogeneous radios in the devices.

Integration of Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without battery will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connectivity such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the THz band signal, since the straightness is strong, there may be many shaded areas due to obstacles. By installing the LIS near these shaded areas, LIS technology, that expands a communication area, enhances communication stability, and enables additional optional services, becomes important. The LIS is an artificial surface made of electromagnetic materials, and can change propagation of incoming and outgoing radio waves. The LIS can be viewed as an extension of massive MIMO, but is different from the massive MIMO in an array structure and an operating mechanism. Further, the LIS has an advantage such as low power consumption, because this operates as a reconfigurable reflector with passive elements, that is, signals are only passively reflected without using active RF chains. In addition, since each of the passive reflectors of the LIS has to independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communication General

Figure 17:
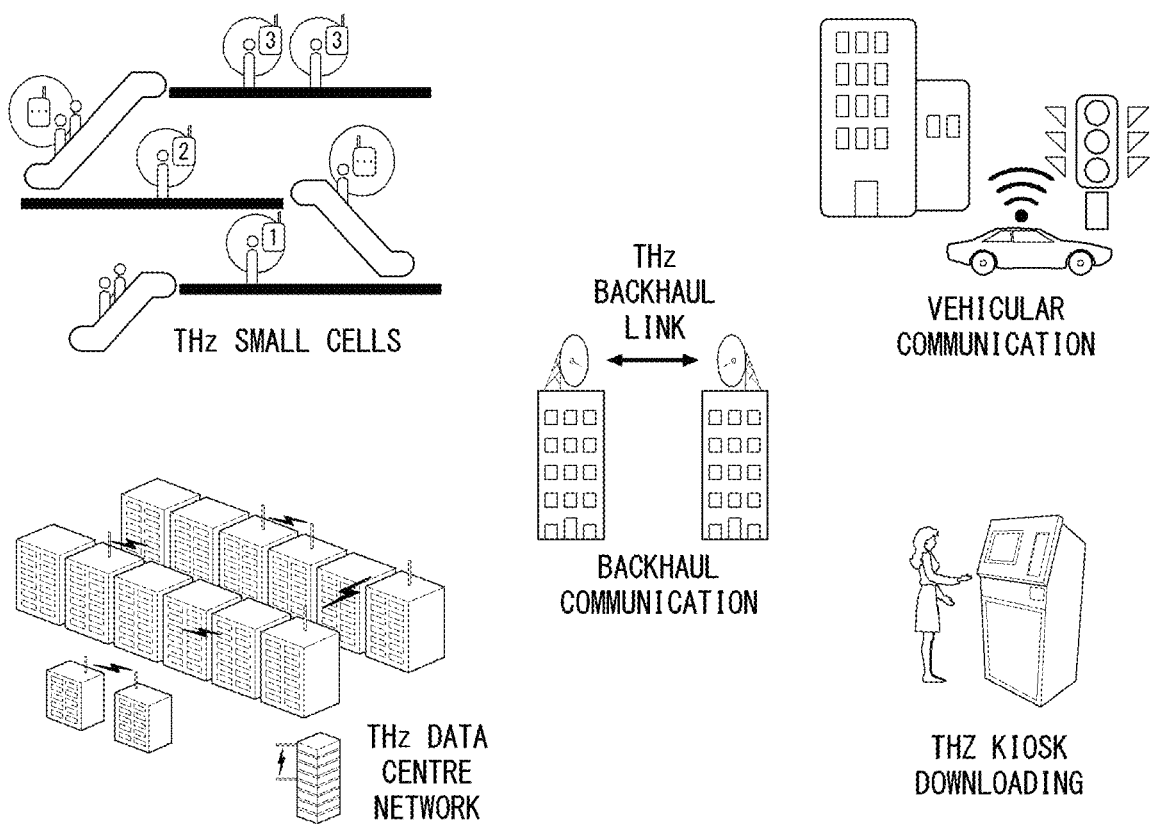
FIG. 17 illustrates a THz communication method applicable to the present disclosure.

FIG. 17 illustrates an example of a THz communication application.

THz wireless communication uses wireless communication using a THz wave having a frequency of approximately 0.1 to 10 THz (1 THz=1012 Hz) and may refer to THz band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays, has a shorter wavelength than the RF/millimeter wave to have high straightness, and is capable of beam convergence. In addition, the photon energy of the THz wave is only a few meV and thus is harmless to the human body. A frequency band which is expected to be used for THz wireless communication may be D-band (110 GHz to 170 GHz) or H-band (220 GHz to 325 GHz) band with a low propagation loss due to molecular absorption in air. Standardization discussion on THz wireless communication is being discussed mainly in IEEE 802.15 THz working group in addition to 3GPP, and standard documents issued by a task group of IEEE 802.15 (e.g., TG3d, TG3e) can specify and supplement the description of the present disclosure. The THz wireless communication may be applied to wireless cognition, sensing, imaging, wireless communication, THz navigation, etc.

As illustrated in FIG. 17, a THz wireless communication scenario may be classified into a macro network, a micro network, and a nanoscale network. In the macro network, THz wireless communication may be applied to vehicle-to-vehicle connectivity and backhaul/fronthaul connectivity. In the micro network, THz wireless communication may be applied to near-field communication such as indoor small cells, fixed point-to-point or multi-point connection such as wireless connection in a data center, and kiosk downloading.

Table 5 below shows an example of technology which can be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Fee space loss | High |
| Coverage | Low |
| Radio Measurements | 300 GHz indoor |
| Device size | Few micrometers |

Figure 18:
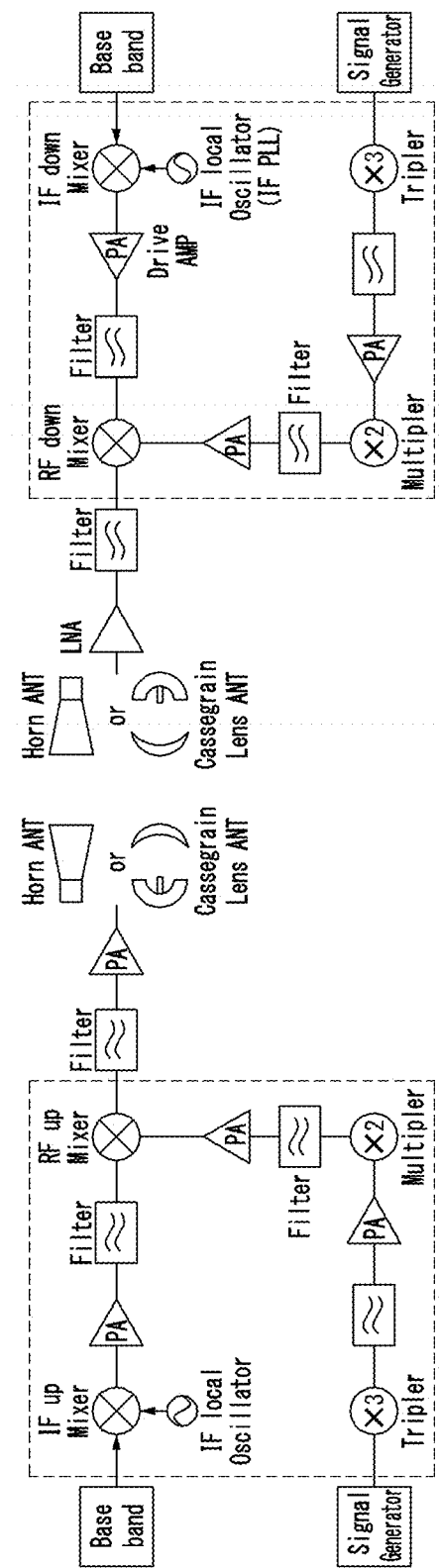
FIG. 18 illustrates a THz wireless communication transceiver applicable to the present disclosure.

FIG. 18 illustrates an example of an electronic device-based THz wireless communication transceiver.

THz wireless communication can be classified based on a method for generating and receiving THz. The method of generating THz can be classified as an optical device or an electronic device-based technology.

The method of generating THz using an electronic device includes a method using a semiconductor device such as a resonant tunneling diode (RTD), a method using a local oscillator and a multiplier, a monolithic microwave integrated circuit (MMIC) method using a compound semiconductor high electron mobility transistor (HEMT) based integrated circuit, a method using a Si-CMOS based integrated circuit, and the like. In FIG. 18, a multiplier (e.g., doubler, tripler) is applied to increase the frequency, and radiation is performed by an antenna via a subharmonic mixer. Since the THz band forms a high frequency, the multiplier is essential. Here, the multiplier is a circuit that allows the frequency to have an output frequency which is N times an input frequency, and the multiplier matches a desired harmonic frequency and filters out all the remaining frequencies. In addition, beamforming may be implemented by applying an array antenna or the like to the antenna of FIG. 18. In FIG. 18, IF denotes an intermediate frequency, a tripler and a multiplier denote a multiplier, PA denotes a power amplifier, LNA denotes a low noise amplifier, and PLL denotes a phase-locked loop.

Figure 19:
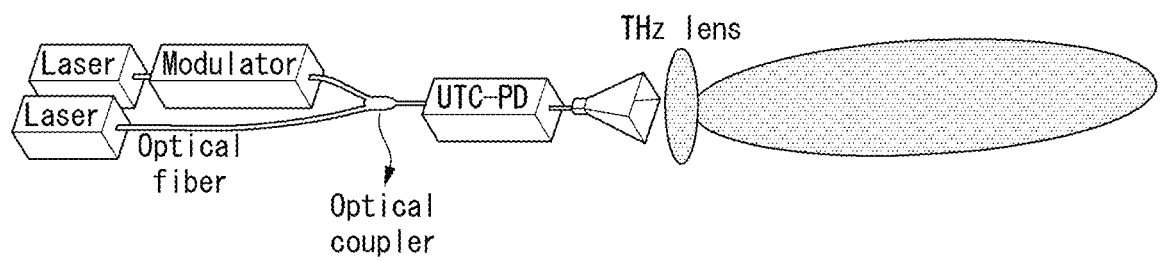
FIG. 19 illustrates a method of generating a THz signal applicable to the present disclosure.
Figure 20:
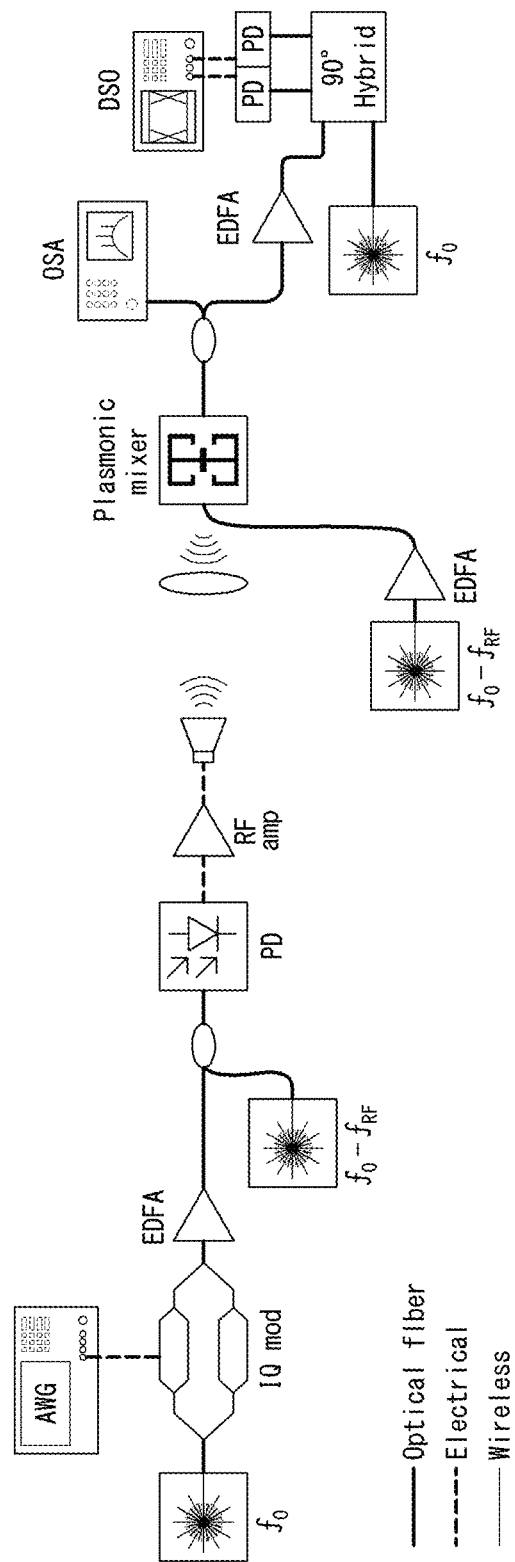
FIG. 20 illustrates a wireless communication transceiver applicable to the present disclosure.

FIG. 19 illustrates an example of a method of generating an optical device-based THz signal. FIG. 20 illustrates an example of an optical device-based THz wireless communication transceiver.

The optical device-based THz wireless communication technology refers to a method of generating and modulating a THz signal using an optical device. The optical device-based THz signal generation technology refers to a technology that generates an ultrahigh-speed optical signal using a laser and an optical modulator and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the optical device-based THz signal, as illustrated in FIG. 19, a laser diode, a broadband optical modulator, and an ultrahigh-speed photodetector are required. In FIG. 19, light signals of two lasers having different wavelengths are combined to generate a THz signal corresponding to a difference in a wavelength between the lasers. In FIG. 19, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) denotes an optical fiber amplifier to which erbium is added, a photo detector (PD) denotes a semiconductor device capable of converting an optical signal into an electrical signal, and OSA denotes an optical sub assembly in which various optical communication functions (e.g., photoelectric conversion, electrophotic conversion, etc.) are modularized as one component, and DSO denotes a digital storage oscilloscope.

Figure 21:
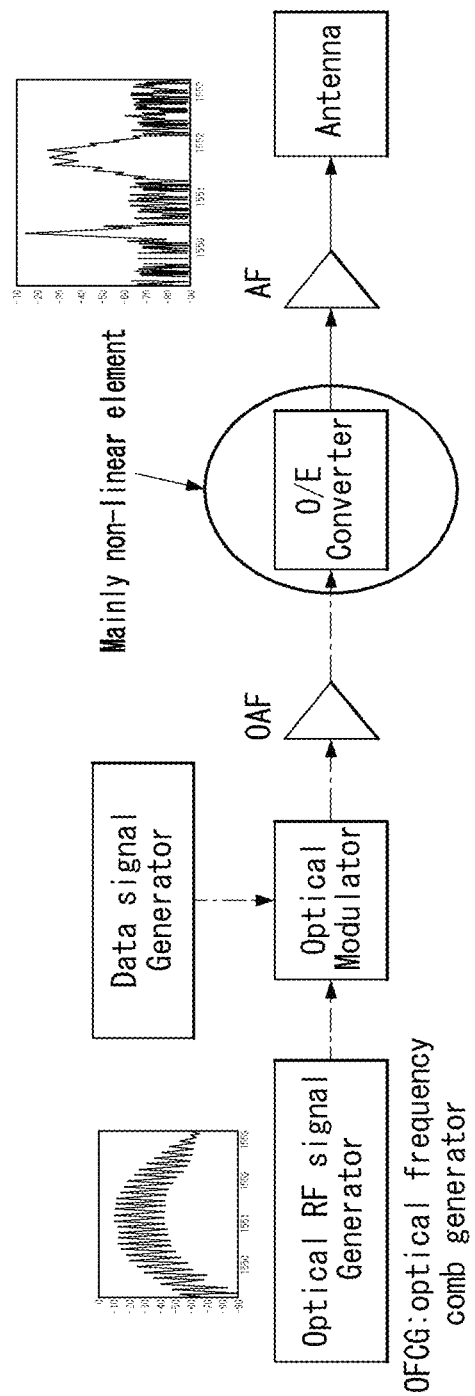
FIG. 21 illustrates a structure of a transceiver applicable to the present disclosure.
Figure 22:
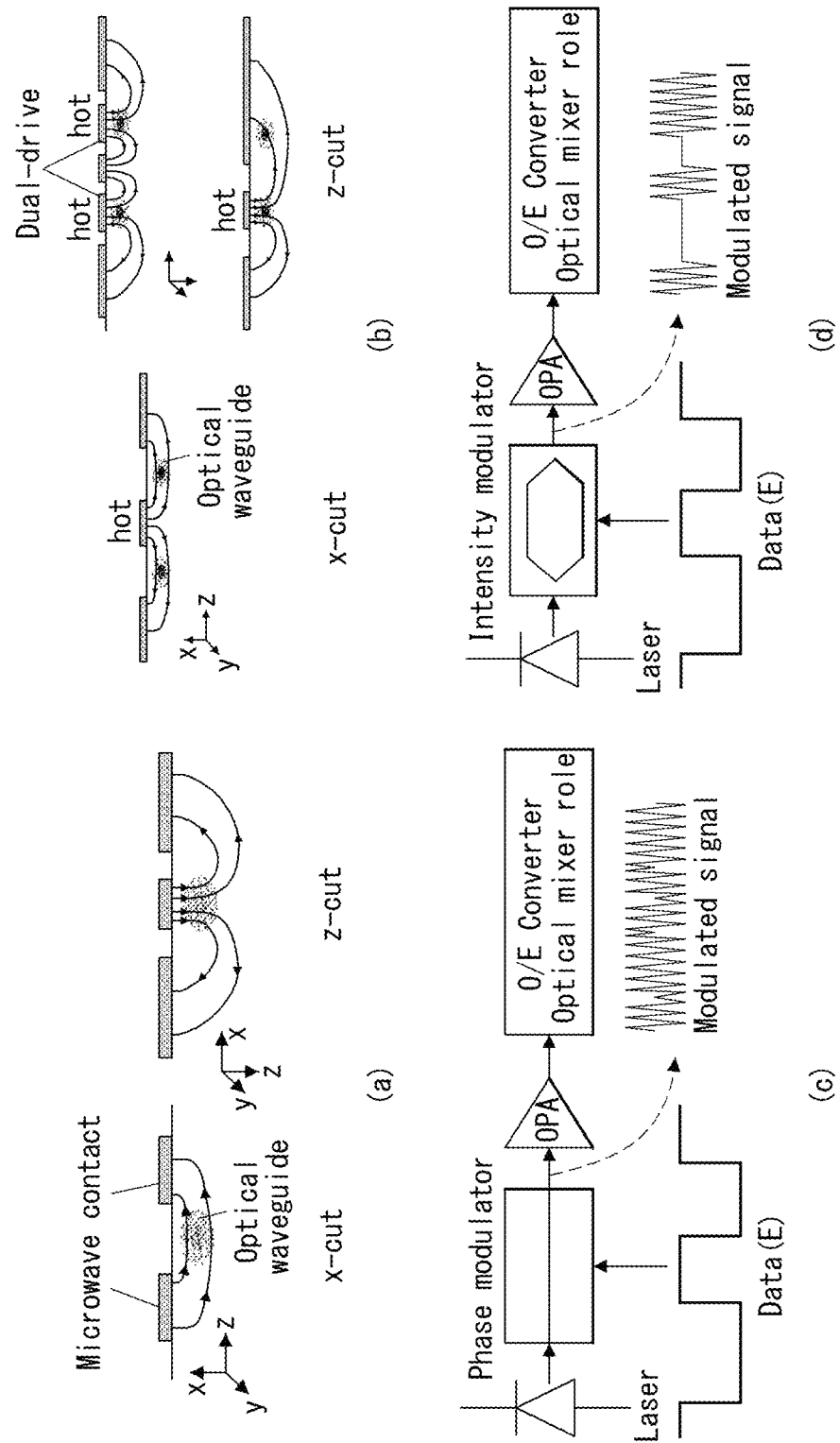
FIG. 22 illustrates a structure of a converter applicable to the present disclosure.

A structure of a photoelectric converter is described with reference to FIGS. 21 and 22. FIG. 21 illustrates a structure of a photonic source-based transmitter. FIG. 22 illustrates a structure of an optical modulator.

Generally, an optical source of a laser may change a phase of a signal by passing through an optical wave guide. In this instance, data is carried by changing electrical characteristics through a microwave contact, or the like. Thus, an optical modulator output is formed in the form of a modulated waveform. A photoelectric modulator (O/E converter) may generate THz pulses based on an optical rectification operation by a nonlinear crystal, a photoelectric conversion (O/E conversion) by a photoconductive antenna, and emission from a bunch of relativistic electrons. The THz pulse generated in the above manner may have a length of a unit from femto second to pico second. The photoelectric converter (O/E converter) performs down-conversion using non-linearity of the device.

Considering THz spectrum usage, multiple contiguous GHz bands are likely to be used as fixed or mobile service usage for the terahertz system. According to outdoor scenario criteria, an available bandwidth may be classified based on oxygen attenuation 10^2 dB/km in the spectrum of up to 1 THz. Hence, a framework in which the available bandwidth consists of several band chunks may be considered. As an example of the framework, if the length of the THz pulse for one carrier is set to 50 ps, the bandwidth (BW) is about 20 GHz.

The effective down-conversion from the infrared (IR) band to the THz band depends on how to utilize the nonlinearity of the photoelectric converter (O/E converter). That is, for down-conversion into a desired THz band, design of the photoelectric converter (O/E converter) having the most ideal non-linearity to move to the corresponding THz band is required. If a photoelectric converter (O/E converter) which is not suitable for a target frequency band is used, there is a high possibility that an error occurs with respect to an amplitude and a phase of the corresponding pulse.

In a single carrier system, a THz transmission/reception system may be implemented using one photoelectric converter. In a multi-carrier system, as many photoelectric converters as the number of carriers may be required, which may vary depending on the channel environment. Particularly, in a multi-carrier system using multiple broadbands according to the plan related to the above-described spectrum usage, the phenomenon will be prominent. In this regard, a frame structure for the multi-carrier system may be considered. A down-frequency-converted signal based on the photoelectric converter may be transmitted in a specific resource area (e.g., a specific frame). The frequency domain of the specific resource area may include a plurality of chunks. Each chunk may consist of at least one component carrier (CC).

Detailed Embodiment of the Present Disclosure

The present disclosure relates to a wireless transmission device, method, and procedure for transmitting with low-latency a large amount of data in a wireless communication system.

Background Technology

A Hybrid Automatic Repeat reQuest (HARQ) used to reduce a transmission error and increase reliability is a type in which forward error correction (FEC) and automatic repeat request (ARQ) are combined. A transmitter transmits data encoded with FEC codes. A receiver checks whether there is an error in a data transfer block by decoding a received signal, and requests retransmission from the transmitter if the error is detected. The transmitter retransmits data encoded with the FEC codes, and the receiver increases a coding gain by combining and decoding the previously received signal and a newly received signal to thereby reduce an error probability.

As a transmission rate of a communication system increases and the size of a transport block increases, a technique of dividing one transport block into a plurality of code blocks (CBs) and transmitting them has been developed to increase retransmission efficiency. The transmitter attaches a CRC to each code block as well as all the transfer blocks and transmits them, and the receiver checks the CRC for each code block and requests retransmission only for the code block in which an error occurs. Hence, the present disclosure can save radio resources required for retransmission and improve transmission efficiency. However, because it is necessary to transmit whether to perform retransmission for each code block from the receiver to the transmitter, there is a disadvantage in that radio resources required for this increase. In 5G NR, as the transmission rate increases, the size of the transport block increases, so the number of code blocks and an amount of retransmission request information further increased. Therefore, a technique has been introduced in which several code blocks are grouped together to form a code block group (CBG), and when the receiver requests retransmission in units of code block group, the transmitter retransmits only the requested code block group.

When there is no feedback channel to request retransmission or when retransmission is not easy, an erasure code may be used. The erasure code may be used alone, but may be used together with an LDPC code or a Turbo code, etc. to improve an error floor or reduce transmission latency due to an automatic repeat request (ARQ).

As the services supported by a wireless communication system diversify, quality of service (QoS) required for each service is diversified. In order to maintain appropriate QoS in a wireless communication environment, it is necessary to apply an appropriate code rate based on QoS and a channel environment. As the erasure code that can flexibly apply the code rate as needed, a raptor code, a sliding window random linear code (RLC), etc. may be used.

Technical Problem to be Solved

The present disclosure describes an efficient HARQ-ACK (Hybrid Automatic Repeat reQuest Acknowledgement) feedback and retransmission device, method and procedure for recovering a transmission error occurring in a wireless communication system.

HARQ is a transmission technology that can efficiently recover an error occurring during transmission using a HARQ-ACK feedback and retransmission according to this. As data transmission speed increases, a transport block (TB) become larger, and services requiring increasingly shorter transmission latency, such as XR (eXtended Reality), increase. Hence, the need for improvement is increasing.

In the wireless communication system, the transmission error may occur due to various factors, such as fading of a wireless channel, interference due to a contiguous cell signal, and preemption of URLLC data during eMBB data transmission, in addition to white noise (AWGN). Some of these factors require retransmission by generating a burst error that is difficult to recover by only channel decoding, such as the LDPC code and the Turbo code, which may lead to an increase in transmission latency. In addition, if all the transport blocks are retransmitted whenever there is an error, the size of the transport block increases, and thus radio resources required for retransmission increase. Hence, efficiency may decrease.

A physical layer interleaver may be used to reduce the generation of retransmission due to the unrecoverable burst error. The interleaver can reduce the probability of the transmission error by making the burst error into a random error and increasing the possibility that the error can be recovered by channel decoding. However, in order to increase a performance gain, a large interleaver buffer has to be used, which increases a processing time of a transceiver and may add another kind of transmission latency.

The problem in which efficiency is reduced due to retransmission of all the transport blocks whenever there is a transmission error can be partially improved by code block group-based retransmission. The code block group-based retransmission can reduce the required radio resources because only a code block group with a code block, in which the error occurs, is retransmitted. However, when the transmission error is distributed to a plurality of code block groups, the number of code block groups to be retransmitted increases and the efficiency may be reduced. Further, since each code block group requires an uplink HARQ-ACK feedback bit and an information (CBG transmission information (CBGTI)) bit notifying whether to retransmit based on downlink control information (DCI), there is a disadvantage in that the number of HARQ-ACK feedback bits and the number of DCI bits increase.

The present disclosure describes a wireless transmission device, method, and procedure capable of reducing transmission latency by reducing HARQ retransmission probability using an erasure code, and capable of reducing radio resources and the number of HARQ-ACK feedback bits and DCI bits required for retransmission when retransmission is unavoidably necessary.

Detailed Description of the Present Disclosure

Figure 23:
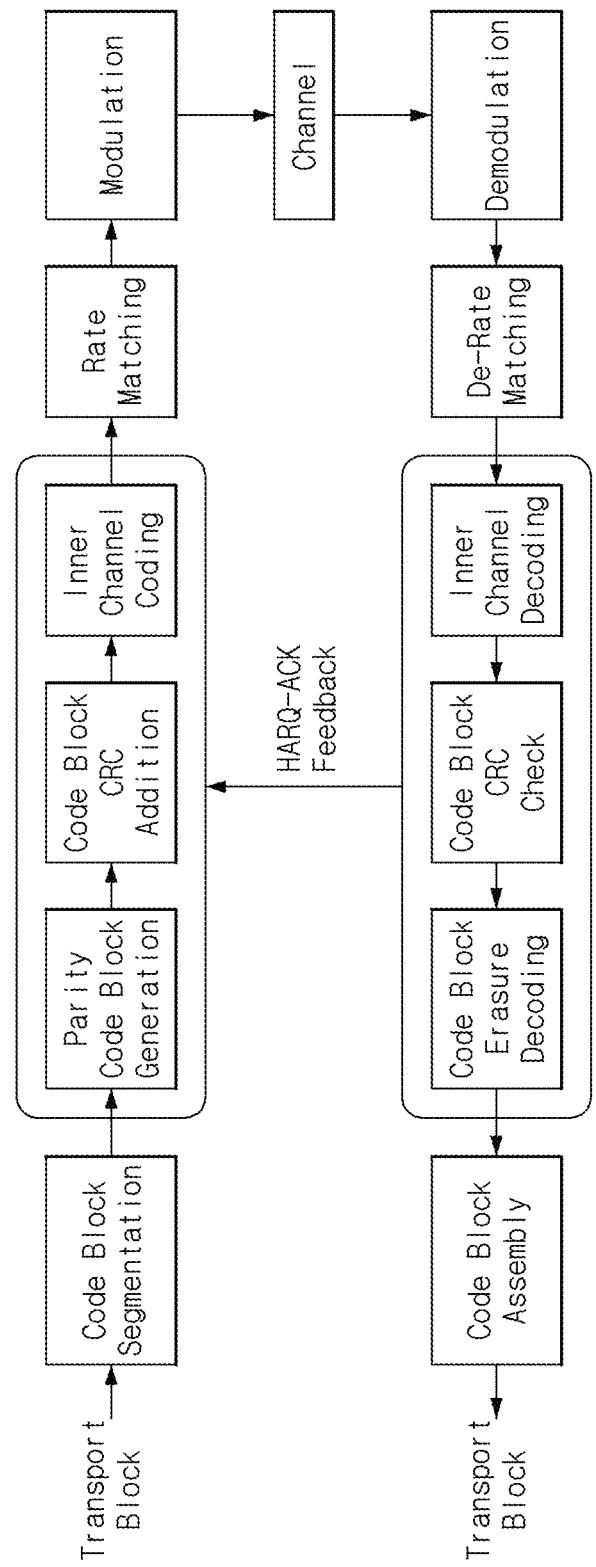
FIG. 23 illustrates an embodiment of a procedure of transmitting by applying an internal channel code after applying an erasure code to a plurality of code blocks in a system applicable to the present disclosure.

FIG. 23 illustrates an embodiment of a procedure of transmitting by applying an internal channel code after applying an erasure code to a plurality of code blocks in a system applicable to the present disclosure.

The present disclosure is described focusing on a systematic erasure code. However, the present disclosure is not limited only to the systematic erasure code and can be applied to a non-systematic erasure code. Further, the present disclosure is described focusing on an optimal erasure code that requires k error-free data and parity symbols in order to recover k data symbols including a symbol with error. However, the present disclosure can also be applied to a sub-optimal/near-optimal erasure code that requires k or slightly more error-free data and parity symbols such as Raptor code.

The present disclosure can lower a retransmission probability and reduce transmission latency using Reed-Solomon (RS) code, Raptor code, sliding window random linear code, etc. together with a channel code, such as an LDPC code or a turbo code, as an external erasure code. FIG. 23 is an example of a system transmitting by applying an internal channel code after applying an erasure code to a plurality of code blocks. As the internal channel code, the LDPC code, the turbo code, a polar code, and the like may be used. A transmitter may divide a transfer block into a plurality of data code blocks (DCB) and perform erasure encoding between the code blocks to generate one or more parity code blocks (PCBs). Each code block may be transmitted through internal channel coding after CRC is added, rate matching, modulation, etc. A receiver may check CRC for each code block after performing demodulation, de-rate matching, and internal channel coding on a received signal, and may check whether there is an error. If there is an error in at least one data code block, and a sufficient number of code blocks including both the data code blocks and the parity code blocks to perform erasure decoding are received without error, the receiver may perform erasure decoding between the code blocks to recover a residual transmission error. If there is a data code block with error even after the erasure decoding, the receiver may request retransmission.

Figure 24:
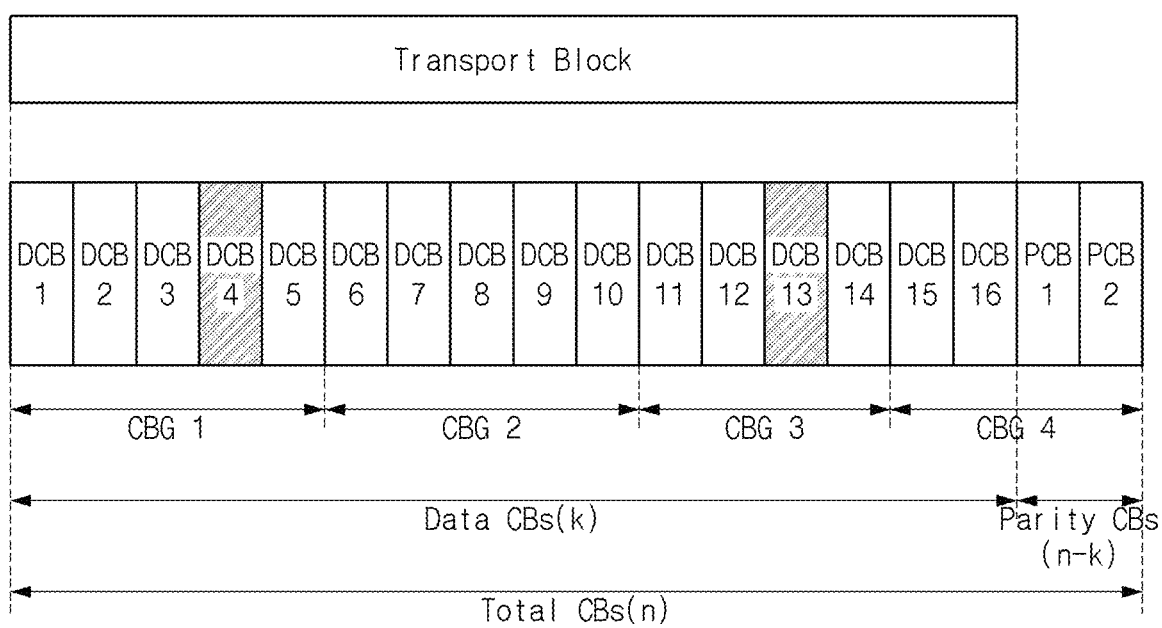
FIG. 24 illustrates an embodiment of a procedure of transmitting by dividing a transfer block into data code blocks and adding a parity code block in a system applicable to the present disclosure.
Figure 24:
Figure 24:

FIG. 24 illustrates an embodiment of a procedure of transmitting by dividing a transfer block into data code blocks and adding a parity code block in a system applicable to the present disclosure.

More specifically, FIG. 24 illustrates an example of transmitting a total of 18 code blocks by dividing one transfer block (TB) into 16 data code blocks (DCBs) and adding two parity code blocks (PCBs) in the system of FIG. 23. In FIG. 24, when an error occurs in two data code blocks 4 and 13 during transmission and these errors are not recovered through internal channel decoding, these errors can be recovered by external erasure decoding using 16 error-free code blocks including two parity code blocks 1 and 2. Because the data code blocks that are not recovered by the internal channel decoding can be recovered without retransmission, transmission latency can be reduced.

If the number of data code blocks is k, the total number of data code blocks and parity code blocks is n, and a BLER of each code block is p, $BLER_{TB}$ of the transfer block may be expressed by Equation 1 below.

$$BLER_{TB} = 1 - \sum_{i=1}^{n-k} \binom{n}{i} p^i (1-p)^{n-1} \quad \text{[Equation 1]}$$

Figure 25:
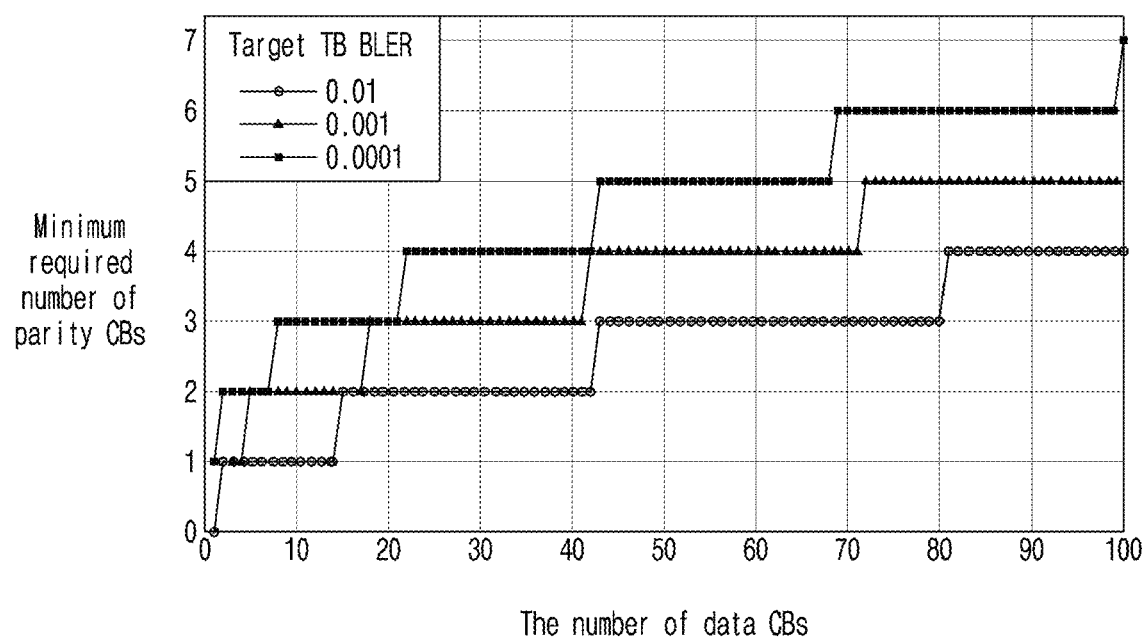
FIG. 25 illustrates an example of the minimum number of parity code blocks required for the number of data code blocks in a system applicable to the present disclosure.

FIG. 25 illustrates an example of the minimum number of parity code blocks required for the number of data code blocks in a system applicable to the present disclosure.

Figure 26:
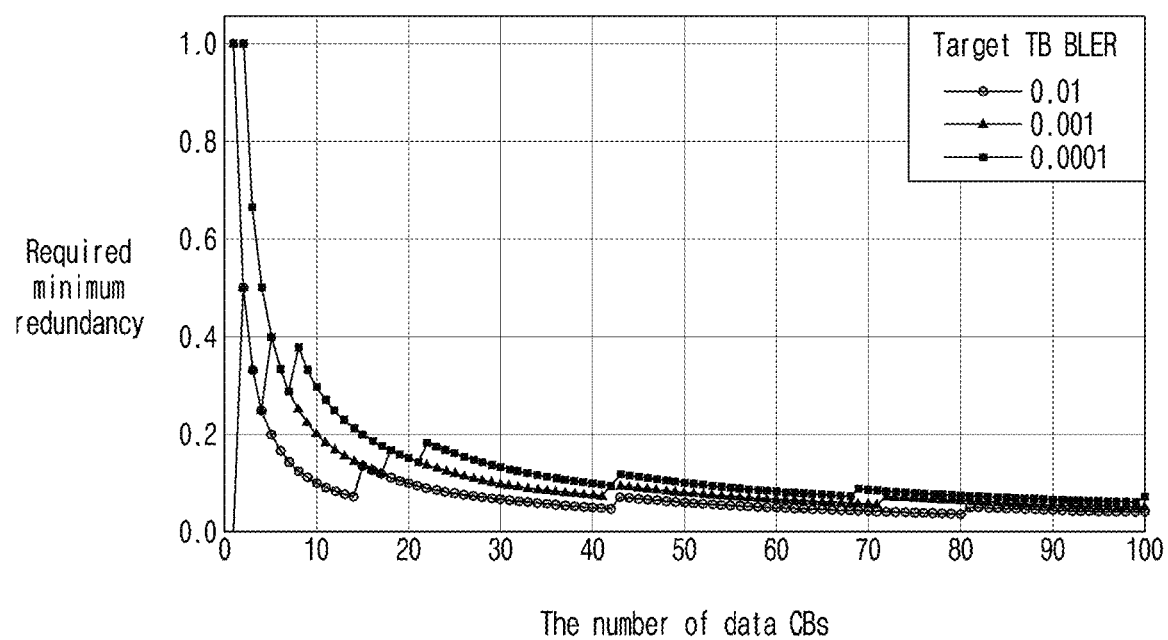
FIG. 26 illustrates an example of a redundancy rate required for the number of data code blocks in a system applicable to the present disclosure.

FIG. 26 illustrates an example of a redundancy rate required for the number of data code blocks in a system applicable to the present disclosure.

Figure 27:
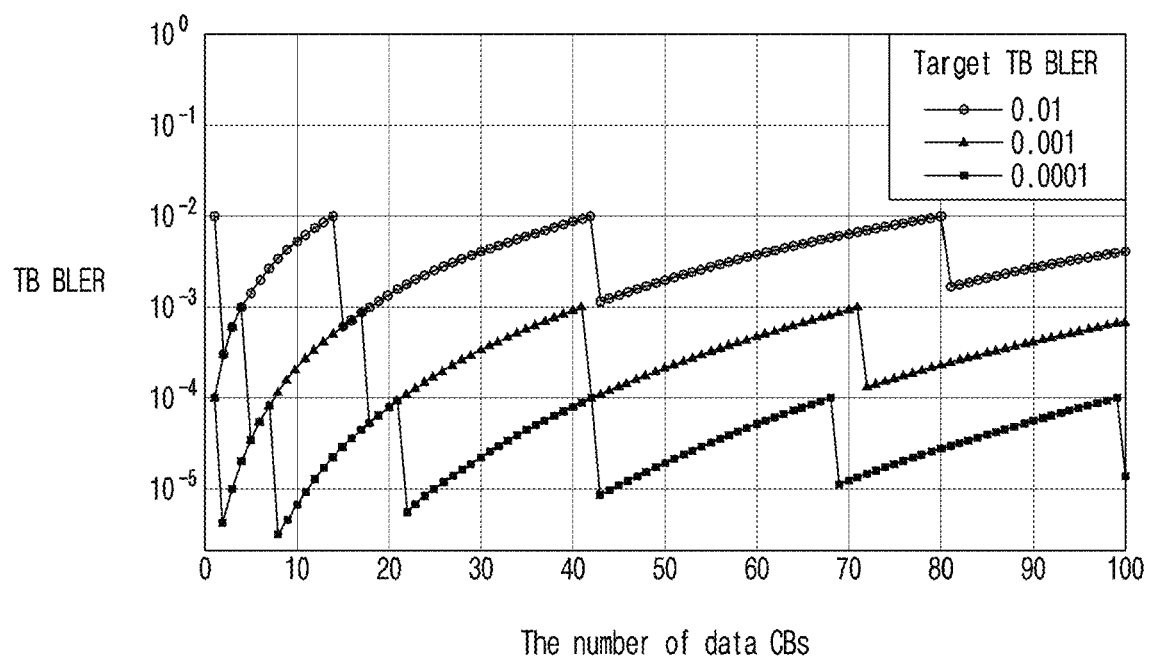
FIG. 27 illustrates an example of a transfer block BLER required for the number of data code blocks in a system applicable to the present disclosure.

FIG. 27 illustrates an example of a transfer block BLER required for the number of data code blocks in a system applicable to the present disclosure.

FIGS. 25, 26 and 27 illustrate the minimum number of parity code blocks required to achieve target TB BLER 0.01 or less, 0.001 or less, and 0.0001 or less with respect to the number of data code blocks, a redundancy ratio (the number of parity code blocks/the number of data code blocks), and an actual TB BLER, respectively, when BLER p of each code block is 0.01. It can be seen from FIGS. 25 and 26 that, even at the same target TB BLER, the required number of parity code blocks and the redundancy ratio to achieve the target TB BLER may vary depending on the number of data code blocks.

The number of data code blocks may vary depending on an amount of data to be transmitted, available radio resources, channel conditions, etc., and thus the number of parity code blocks required to achieve the target BLER may vary. Therefore, there is a need for a method in which the transmitter and the receiver or the base station and the UE can dynamically share the number of data code blocks and the number of parity code blocks.

Table 6 shows the maximum number of data code blocks ($k_{max}$) capable of achieving a target TB BLER per the number of parity code blocks (n-k) and the maximum number of all the code blocks ($n_{max}$) corresponding to this, when a BLER of the code block is constant at 0.01. The maximum number of all the code blocks equals to a sum of the maximum number of data code blocks and the number of parity code blocks. For example, in order to make a TB BLER to 0.001 or less by transmitting two parity code blocks together with data code blocks, the number of data code blocks shall be 17 or less, and the total number of code blocks shall be 19 or less by adding 17 and 2. Table 6 may be generated based on Equation 1 with respect to a given BLER of the code block and a target BLER of the transport block.

TABLE 6

| n-k | Target TB BLER = 0.01 | | Target TB BLER = 0.001 | | Target TB BLER = 0.0001 | |
| --- | --- | --- | --- | --- | --- | --- |
| | $n_{max}$ | $k_{max}$ | $n_{max}$ | $k_{max}$ | $n_{max}$ | $k_{max}$ |
| 1 | 15 | 14 | 5 | 4 | 2 | 1 |
| 2 | 44 | 42 | 19 | 17 | 9 | 7 |
| 3 | 83 | 80 | 44 | 41 | 24 | 21 |
| 4 | 129 | 125 | 75 | 71 | 46 | 42 |
| 5 | 180 | 175 | 112 | 107 | 73 | 68 |
| 6 | 234 | 228 | 154 | 148 | 105 | 99 |
| 7 | 292 | 285 | 199 | 192 | 141 | 134 |
| 8 | 353 | 345 | 248 | 240 | 180 | 172 |
| 9 | 415 | 406 | 299 | 290 | 223 | 214 |
| 10 | 479 | 469 | 352 | 342 | 268 | 258 |

It can be seen from FIG. 6 that the redundancy ratio increases as the number of code blocks to be transmitted decreases. This means that a relatively large number of radio resources need to be used to transmit the parity code block, and transmission efficiency may be reduced. Thus, when the number of code blocks is small, an external erasure code may not be used in the first transmission. For this reason, it is possible to define the minimum number of data code blocks $K_{OC}$ capable of transmitting the parity code block using the external erasure code in the first transmission. That is, the transmitter can transmit the parity code block only when the number of data code blocks k in the first transmission is greater than or equal to $K_{OC}$, where $K_{OC}$ may be an integer greater than or equal to 1. When both $K_{OC}$ and k are 1, the parity code block may simply be a repetition of the data code block.

Figure 28:
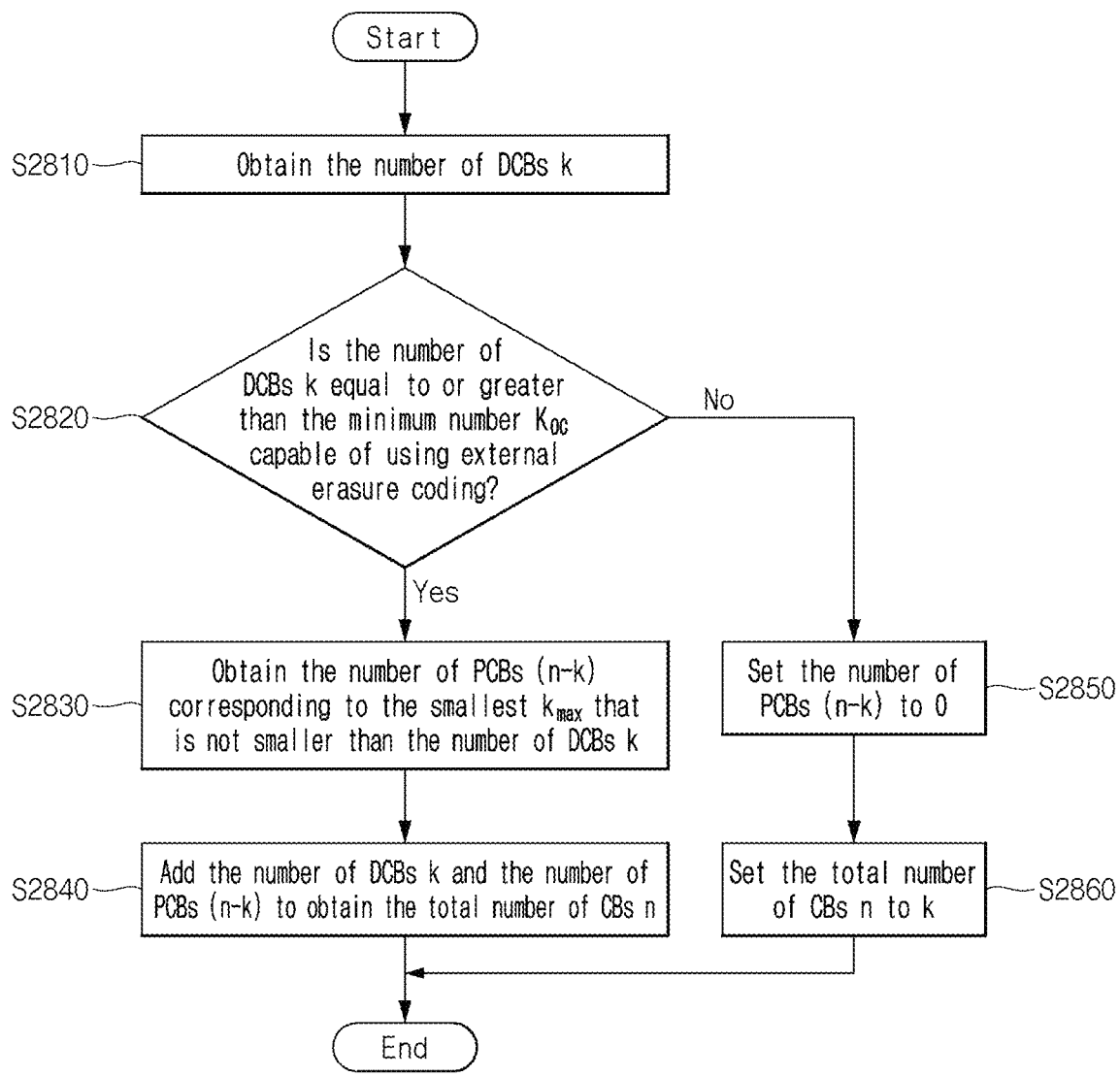
FIG. 28 illustrates an embodiment of a procedure in which a base station obtains the number of data transfer blocks and the number of parity transfer blocks based on the minimum number of data code blocks capable of transmitting a parity code block in a first transmission in a system applicable to the present disclosure.
Figure 29:
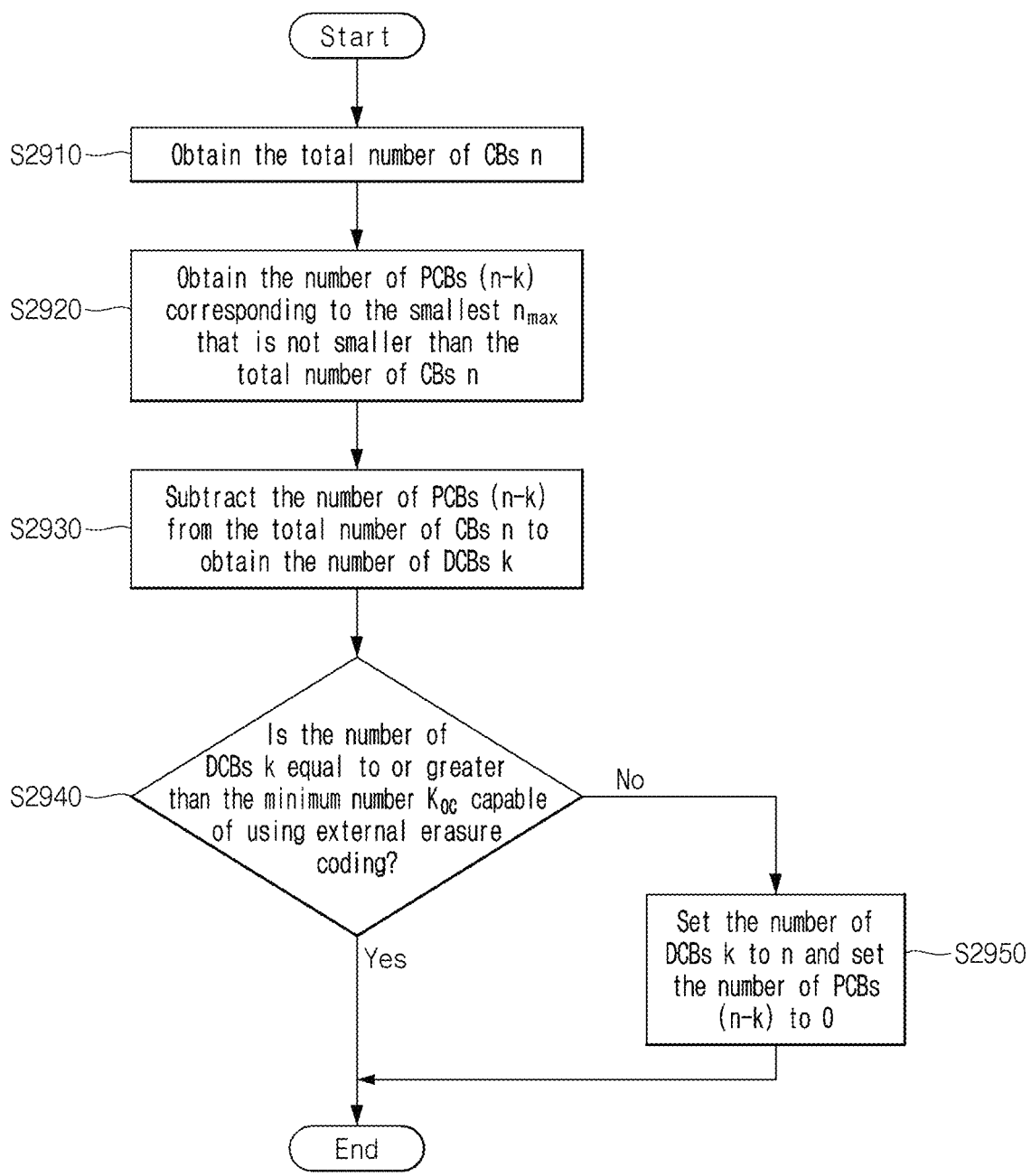
FIG. 29 illustrates an embodiment of a procedure in which a UE obtains the number of data transfer blocks and the number of parity transfer blocks based on the minimum number of data code blocks capable of transmitting a parity code block in a first transmission in a system applicable to the present disclosure.

FIGS. 28 and 29 illustrate examples of a procedure in which the base station and the UE obtain the number of data transport blocks and the number of parity transport blocks based on Table 6 and the minimum number of data code blocks $K_{OC}$ capable of transmitting the parity code block in the first transmission in a wireless communication network.

FIG. 28 illustrates an embodiment of a procedure in which a base station obtains the number of data transfer blocks and the number of parity transfer blocks based on the minimum number of data code blocks capable of transmitting a parity code block in the first transmission in a system applicable to the present disclosure.

Referring to FIG. 28, in step S2810, a base station determines the number of DCBs k.

In step S2820, the base station decides whether the number of DCBs k is equal to or greater than the minimum number $K_{OC}$ capable of using external erasure coding. If the number of DCBs k is equal to or greater than the minimum number $K_{OC}$ capable of using the external erasure coding, the base station performs step S2830. If the number of DCBs k is not equal to or greater than the minimum number $K_{OC}$ capable of using the external erasure coding, the base station performs step S2850.

In step S2830, the base station determines the number of PCBs (n−k) corresponding to the smallest $k_{max}$ that is not smaller than the number of DCBs k.

In step S2840, the base station adds the number of DCBs k and the number of PCBs (n−k) to determine the total number of CBs n.

In step S2850, the base station sets the number of PCBs (n−k) to 0.

In step S2860, the base station sets the total number of CBs n to k.

The base station may calculate the number of parity code blocks and the total number of code blocks from the number of data code blocks to be transmitted according to the procedure of FIG. 28 based on Table 6 and $K_{OC}$ for downlink transmission. The base station may obtain the number of data code blocks k due to the division of the transport block into the code blocks. The base station may not use the external erasure code if k is smaller than $K_{OC}$. In this case, the total number of code blocks is equal to the number of data code blocks, and the number of parity code blocks is 0. If k is equal to or greater than $K_{OC}$, the base station may obtain the number of parity code blocks (n−k) corresponding to the smallest $k_{max}$ that is not smaller than k in Table 1. The total number of code blocks n to be transmitted may be obtained by adding the number of data code blocks k and the number of parity code blocks (n−k).

FIG. 29 illustrates an embodiment of a procedure in which a UE obtains the number of data transfer blocks and the number of parity transfer blocks based on the minimum number of data code blocks capable of transmitting a parity code block in a first transmission in a system applicable to the present disclosure.

Referring to FIG. 29, in step S2910, a UE determines the total number of CBs n.

In step S2920, the UE determines the number of PCBs (n−k) corresponding to the smallest $n_{max}$ that is not smaller than the total number of CBs n.

In step S2930, the UE determines the number of DCBs k by subtracting the number of PCBs (n−k) from the total number of CBs n.

In step S2940, the UE decides whether the number of DCBs k is equal to or greater than the minimum number $K_{OC}$ capable of using external erasure coding. If the number of DCBs k is equal to or greater than the minimum number $K_{OC}$ capable of using the external erasure coding, the UE ends its operation. If the number of DCBs k is not equal to or greater than the minimum number $K_{OC}$ capable of using the external erasure coding, the UE performs step S2950.

In step S2950, the UE sets the number of DCBs k to n and sets the number of PCBs (n−k) to 0.

The UE may obtain the number of data code blocks and the number of parity code blocks from the total number of code blocks received in downlink or to be transmitted in uplink according to the procedure of FIG. 29 based on Table 6 and $K_{OC}$. The UE may obtain the total number of code blocks n based on assigned radio resources, modulation order, a code rate, and the like. For example, in 5G NR, the UE may calculate the total number of code blocks n based on the number of radio resource elements (REs) assigned for data transmission, a code rate, modulation order, the number of layers, and the like. The UE may receive information required to obtain the total number of code blocks n based on downlink control information (DCI), etc. The UE may obtain the number of parity code blocks (n−k) corresponding to the smallest $n_{max}$ that is not smaller than 'n' in Table 6. The number of data code blocks k may be obtained by subtracting the number of parity code blocks (n−k) from the total number of code blocks n. The UE may determine not to use an external erasure code if the calculated k is smaller than $K_{OC}$. In this case, the number of data code blocks is equal to the total number of code blocks, and the number of parity code blocks is 0.

Figure 30:
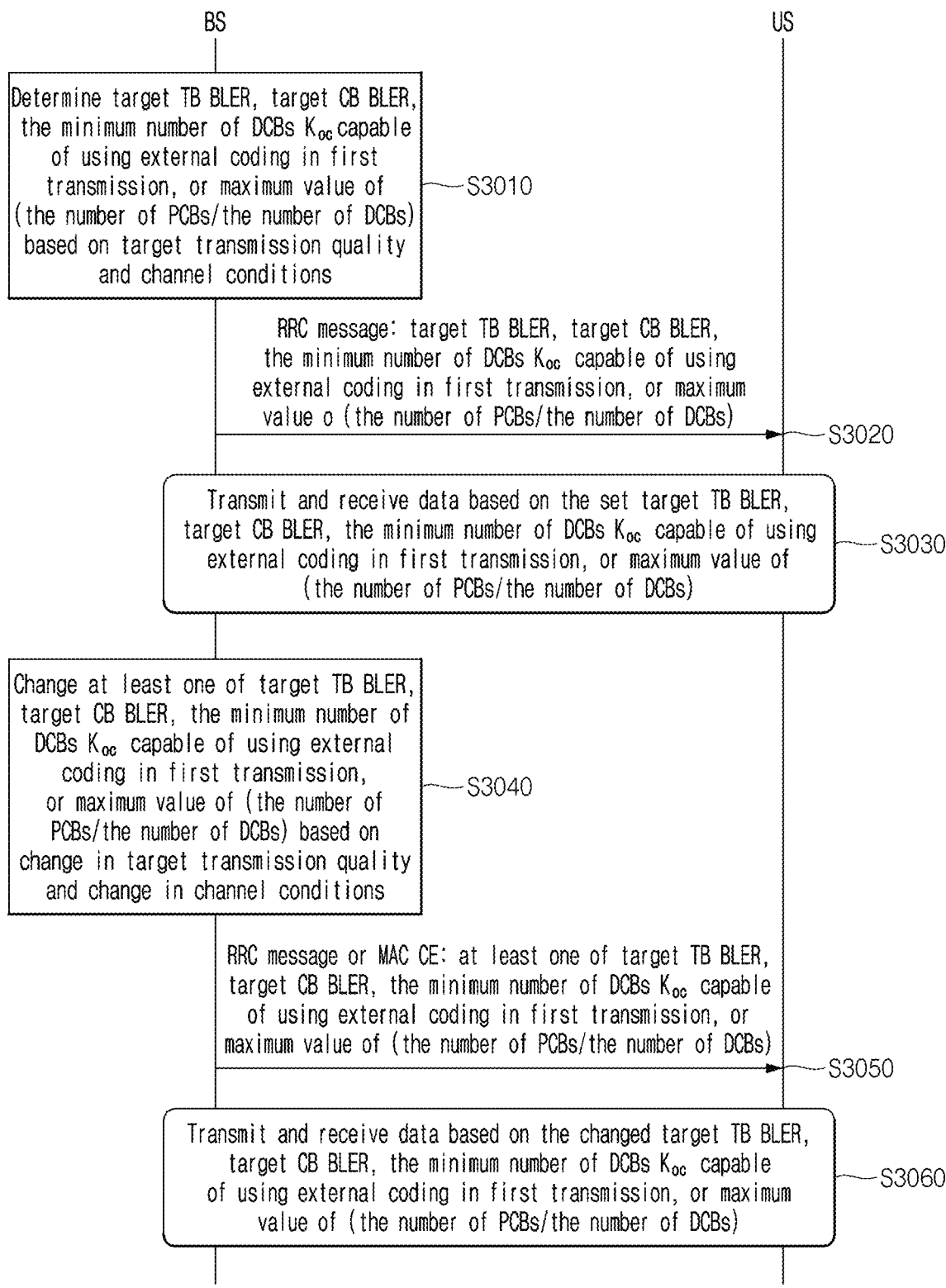
FIG. 30 illustrates an embodiment of a procedure in which a base station transmits information on a target transfer block BLER, a target code block BLER, and the minimum number of code blocks to a UE in a system applicable to the present disclosure.

FIG. 30 illustrates an embodiment of a procedure in which a base station transmits information on a target transfer block BLER, a target code block BLER, and the minimum number of code blocks to a UE in a system applicable to the present disclosure.

More specifically, FIG. 30 illustrates an example of a procedure in which a base station transmits a target transfer block BLER, a target code block BLER, and the minimum number of data code blocks $K_{OC}$ capable of using an external erasure code in a first transmission to a UE in a wireless communication network.

Referring to FIG. 30, in step S3010, a base station determines a target TB BLER, a target CB BLER, the minimum number of DCBs $K_{OC}$ capable of using external coding in the first transmission, or a maximum value of (the number of PCBs/the number of DCBs) based on target transmission quality and channel conditions, etc.

In step S3020, the base station sends an RRC message to the UE. The RRC message may include at least one of the following information: the target TB BLER, the target CB BLER, the minimum number of DCBs $K_{OC}$ capable of using external coding in the first transmission, or the maximum value of (the number of PCBs/the number of DCBs).

In step S3030, the base station and the UE may transmit and receive data based on information included in the RRC message of the step S3020.

In step S3040, the base station may change at least one of the following information based on change in the target transmission quality, change in the channel conditions, etc.: the target TB BLER, the target CB BLER, the minimum number of DCBs $K_{OC}$ capable of using external coding in the first transmission, or the maximum value of (the number of PCBs/the number of DCBs).

In step S3050, the base station transmits the RRC message including at least one of the following information changed in the step S3040 or MAC CE to the UE: the target TB BLER, the target CB BLER, the minimum number of DCBs $K_{OC}$ capable of using external coding in the first transmission, or the maximum value of (the number of PCBs/the number of DCBs).

In step S3060, the base station and the UE may transmit and receive data based on information included in the RRC message of the step S3050 or the MAC CE.

The base station may deliver the information to the UE via the RRC message or the MAC CE. $K_{OC}$ may be replaced by a maximum redundancy ratio capable of using the external erasure code in the first transmission. Hence, the base station and the UE may use the external erasure code only when a ratio (n−k)/k of the number of parity code blocks (n−k) to the number of data code blocks k in the first transmission is less than or equal to the maximum redundancy ratio capable of using the external erasure code in the first transmission.

If a Raptor code is used as the external erasure code, when the number of data code blocks is k, the number of all the data code blocks and parity code blocks is n, and a BLER of each code block is p, a BLER of the transport block $BLER_{TB}$ may be expressed as in Equation 2.

$$BLER_{TB} = 1 - \sum_{i=1}^{n-k} \binom{n}{i} p^i (1-p)^{n-1} \left(1 - 10^{-2(n-k-i+1)}\right) \quad \text{[Equation 2]}$$

TABLE 7

| n-k | Target TB BLER = 0.01 | | Target TB BLER = 0.001 | | Target TB BLER = 0.0001 | |
|---|---|---|---|---|---|---|
| | $n_{max}$ | $k_{max}$ | $n_{max}$ | $k_{max}$ | $n_{max}$ | $k_{max}$ |
| 1 | 14 | 13 | 3 | 2 | 1 | 0 |
| 2 | 43 | 41 | 18 | 16 | 8 | 6 |
| 3 | 82 | 79 | 43 | 40 | 23 | 20 |
| 4 | 128 | 124 | 74 | 70 | 45 | 41 |
| 5 | 179 | 174 | 111 | 106 | 72 | 67 |
| 6 | 233 | 227 | 153 | 147 | 104 | 98 |
| 7 | 291 | 284 | 198 | 191 | 140 | 133 |
| 8 | 351 | 343 | 246 | 238 | 179 | 171 |
| 9 | 414 | 405 | 298 | 289 | 222 | 213 |
| 10 | 478 | 468 | 351 | 341 | 266 | 256 |

Table 7 shows the maximum number of data code blocks ($k_{max}$) capable of achieving a target TB BLER per the number of parity code blocks (n–k) and the maximum number of all the code blocks ($n_{max}$) corresponding to this, when a BLER of the code block is constant at 0.01 if the Raptor code is used as the external erasure code. Table 7 may be generated based on Equation 2 with respect to a given BLER of the code block and a target BLER of the transport block. In Table 7, if the maximum number of data code blocks ($k_{max}$) is 0, it is invalid.

When the base station and the UE use the Raptor code as the external erasure code in the wireless communication network, the base station and the UE may obtain the number of data transport blocks and the number of parity transport blocks according to the procedures of FIGS. 28 and 29 based on Table 7 and the minimum number of data code blocks $K_{OC}$ capable of transmitting the parity code block in the first transmission.

TABLE 8

| n-k | $n_{max}$ |
|---|---|
| 0 | 22 |
| 3 | 43 |
| 4 | 74 |
| 5 | 111 |
| 6 | 153 |
| 7 | 198 |
| 8 | 246 |
| 9 | 298 |
| 10 | 351 |

In the wireless communication network, the base station may transmit, to the UE, a table indicating a correspondence between the number of parity code blocks (n–k) and the maximum number of all the code blocks ($n_{max}$) as shown in Table 8, instead of transmitting the target TB BLER, the target CB BLER, and the minimum number of code blocks $K_{OC}$ capable of transmitting the parity code block using the external erasure code in the first transmission to the UE via the RRC message or the MAC CE. The UE may obtain the number of data code blocks and the number of parity code blocks from the total number of code blocks received in downlink or to be transmitted in uplink according to the procedure of FIG. 29 based on Table 8. For example, if the total number of code blocks n is 23, the number of data code blocks k may be calculated as 20 and the number of parity code blocks (n–k) may be calculated as 3. Since (n–k) is 0 when n is 21 and 22, k is calculated as 21 and 22 and may be greater than value '20' of k when n is 23. The base station can prevent such a reversal phenomenon by performing scheduling so that n does not become 21 or 22.

In another embodiment, the base station may explicitly transmit, to the UE, a table indicating a correspondence between the number of parity code blocks (n–k) and the maximum number of all the code blocks ($n_{max}$) and the minimum number of code blocks $K_{OC}$ capable of transmitting the parity code block using the external erasure code in the first transmission, instead of the target TB BLER and the target CB BLER.

HARQ-ACK Feedback and Retransmission Scheme Accordingly

TABLE 9

| HARQ-ACK Type | Number of HARQ-ACK values | Meaning |
|---|---|---|
| NACK | 1 | There is an unrecovered error; retransmission request of all CBGs. |
| NACK-CBG | $N_{CBG}$ | There is an unrecovered error; CBG index information to be retransmitted. |
| NACK-PCB | $2^{N_{HARQ-ACK}} - (2 + N_{CBG})$ | There is an unrecovered error; retransmission request of the number of PCBs calculated in a pre-promised method, not included in the first transmission (the number of PCBs may be defined in relation to the number of CBGs and the number of CBs in the first transmission). |
| ACK | 1 | All TBs have been received without error or the error is recovered. |

If all the transmission errors are not recovered in the internal channel decoding and the external erasure decoding in the first transmission, retransmission may be required. The receiver may feedback HARQ-ACK values of Table 9 and deliver, to the transmitter, whether to retransmit or not and a retransmission scheme determined to be most efficient. In Table 9, $N_{CBG}$ is the maximum number of code block groups, and $N_{HARQ-ACK}$ is the number of HARQ-ACK feedback bits.

If all the errors of the data code blocks are recovered by the internal channel decoding and the external erasure decoding, the receiver may transmit ACK. Otherwise, the receiver may transmit NACK including a retransmission scheme determined to be most efficient as follows.

(1) When errors of all data code blocks can be recovered if all code blocks in one code block group are recovered, the receiver may feedback index information of the code block group as HARQ-ACK value.

(2) When errors of all data code blocks can be recovered if a predetermined number of additional parity code blocks are received without errors, the receiver may feedback HARQ-ACK value requesting retransmission of the smallest number of parity code blocks that are not smaller than the required number among the number of parity code blocks promised to the transmitter. The number of parity code blocks corresponding to the HARQ-ACK value may be defined in relation to the number of code block groups and the number of code blocks in the first transmission.

(3) If the above two cases are not applicable, the receiver may feedback HARQ-ACK value requesting retransmission of all the code block groups.

TABLE 10

| HARQ-ACK Type | HARQ-ACK value(s) | Meaning |
| --- | --- | --- |
| NACK | 0 | Request retransmission of all CBGs. |
| NACK-CBG | 1~4 | CBG index information to be retransmitted |
| NACK-PCB | 5 | Request transmission of PCB not included in the first transmission. The number of PCBs is equal to the number of CBGs in the first transmission (four in FIG. 2). |
| NACK-PCB | 6 | Request transmission of PCB not included in the first transmission. The number of PCBs is the minimum integer more than 1.5 times the number of CBGs in the first transmission (six in FIG. 2). |
| ACK | 7 | All TBs have been received without error or the error is recovered. |

Table 10 shows an example of encoding HARQ-ACK values of a system that can divide a plurality of code blocks into up to four code block groups and transmit them as illustrated in FIG. 24.

TABLE 11

| TCBI Type | Number of TCBI values | Meaning |
| --- | --- | --- |
| ALL | 1 | First transmission or retransmission of all CBGs |
| CBG | $N_{CBG}$ | CBG index information to be retransmitted |
| PCB | $2^{N_{HARQ-ACK}} - (2 + N_{CBG})$ | The number of PCBs calculated in a pre-promised method, not included in the first transmission (the number of PCBs may be defined in relation to the number of CBGs and the number of CBs in the first transmission) |
| RSVD | 1 | Reserved |

The transmitter may perform retransmission based on the HARQ-ACK feedback value of the receiver. However, the transmitter may use a different retransmission scheme from that fed back by the receiver. For example, even if the receiver requests retransmission of a specific code block group, the transmitter may retransmit all the code block groups to ensure higher reliability, or transmit more parity code blocks than the additional feedbacked parity code blocks.

The transmitter may transmit actually Transmitting Code Block Information (TCBI) to the receiver through a separate signaling method. For example, in the wireless communication network, the base station may transmit actually Transmitting Code Block Information (TCBI) to the UE as shown in Table 11 via downlink control information (DCI). In Table 11, $N_{CBG}$ is the maximum number of code block groups, and $N_{HARQ-ACK}$ is the number of HARQ-ACK feedback bits in the same manner as Table 9.

TABLE 12

| TCBI Type | TCBI value(s) | Meaning |
| --- | --- | --- |
| ALL | 0 | First transmission or retransmission of all CBGs |
| CBG | 1~4 | CBG index information to be retransmitted |

TABLE 12-continued

| TCBI Type | TCBI value(s) | Meaning |
| --- | --- | --- |
| PCB | 5 | Retransmission of PCB not included in the first transmission. The number of PCBs is equal to the number of CBGs in the first transmission (four in FIG. 2). |
| PCB | 6 | Retransmission of PCB not included in the first transmission. The number of PCBs is the minimum integer more than 1.5 times the number of CBGs in the first transmission (six in FIG. 2). |
| RSVD | 7 | Reserved |

Table 12 shows an example of encoding actually Transmitting Code Block Information (TCBI) values in a system that can divide a plurality of code blocks into up to four code block groups and transmit them as illustrated in FIG. 24.

Hereinafter, FIGS. 31, 32, 33, 34 and 35 illustrate an example of HARQ-ACK feedback and retransmission based on a pattern of unrecovered code blocks, when transmission is performed by dividing a plurality of code blocks into up to four code block groups in which one transport block is divided into 16 data code blocks and a parity code block is added if necessary as illustrated in FIG. 24. HARQ-ACK value and TCBI values follow Table 10 and Table 12.

Figure 31:
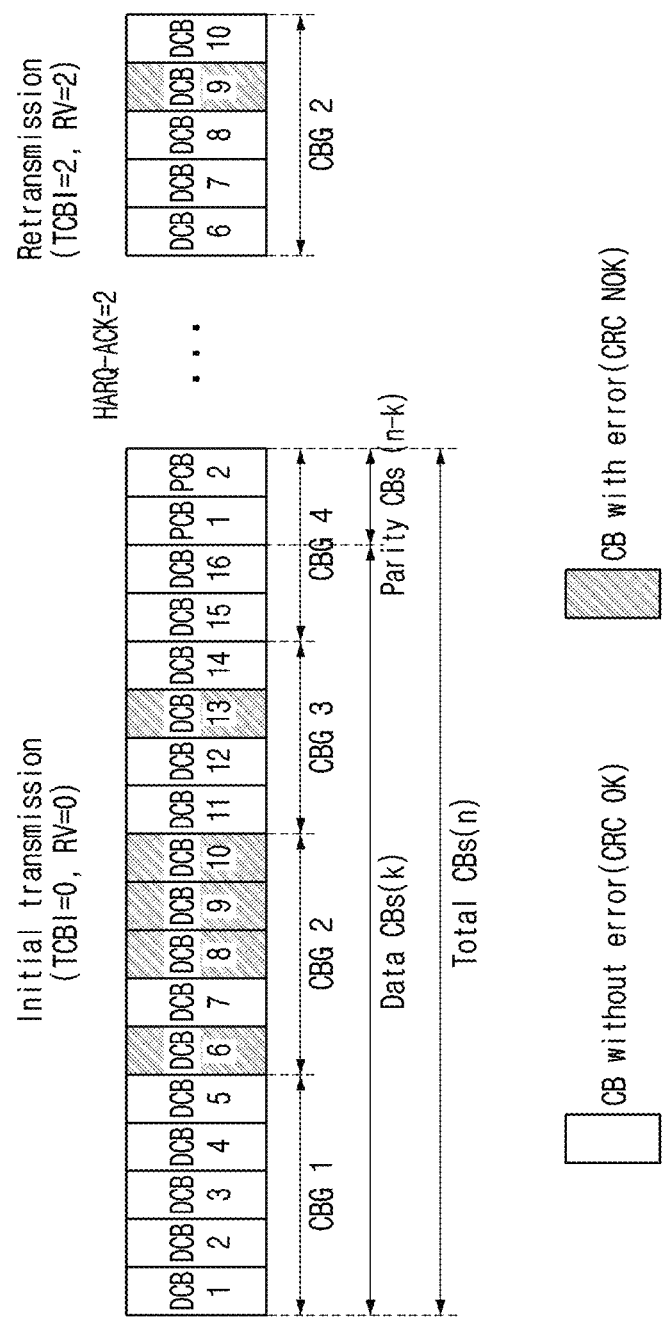
FIG. 31 illustrates an embodiment of a retransmission procedure for a recovery of a data code block in a system applicable to the present disclosure.

FIG. 31 illustrates an embodiment of a retransmission procedure for a recovery of a data code block in a system applicable to the present disclosure.

As illustrated in FIG. 31, if code blocks with a transmission error are concentrated in a small number of code block groups, the receiver may feedback, as HARQ-ACK value, index information of a code block group in which all data code blocks are most likely to be recovered by internal channel decoding and external erasure decoding in a subsequent retransmission. In the example of FIG. 31, if three or more code blocks among four code blocks with error in a code block group 2 are recovered by the internal channel coding in the retransmission, all the data code blocks including a data code block 13 may be recovered using an external erasure code. Hence, the receiver may feedback an index 2 of the code block group 2 as HARQ-ACK so as to request a retransmission of the code block group 2. The transmitter receiving '2' as HARQ-ACK may retransmit the code block group 2. The receiver may recover data code blocks 6, 8 and 10 among the data code blocks, in which an error occurs in the first transmission, by the internal channel decoding and recover remaining data code blocks 9 and 13 by the external erasure decoding.

Figure 32:
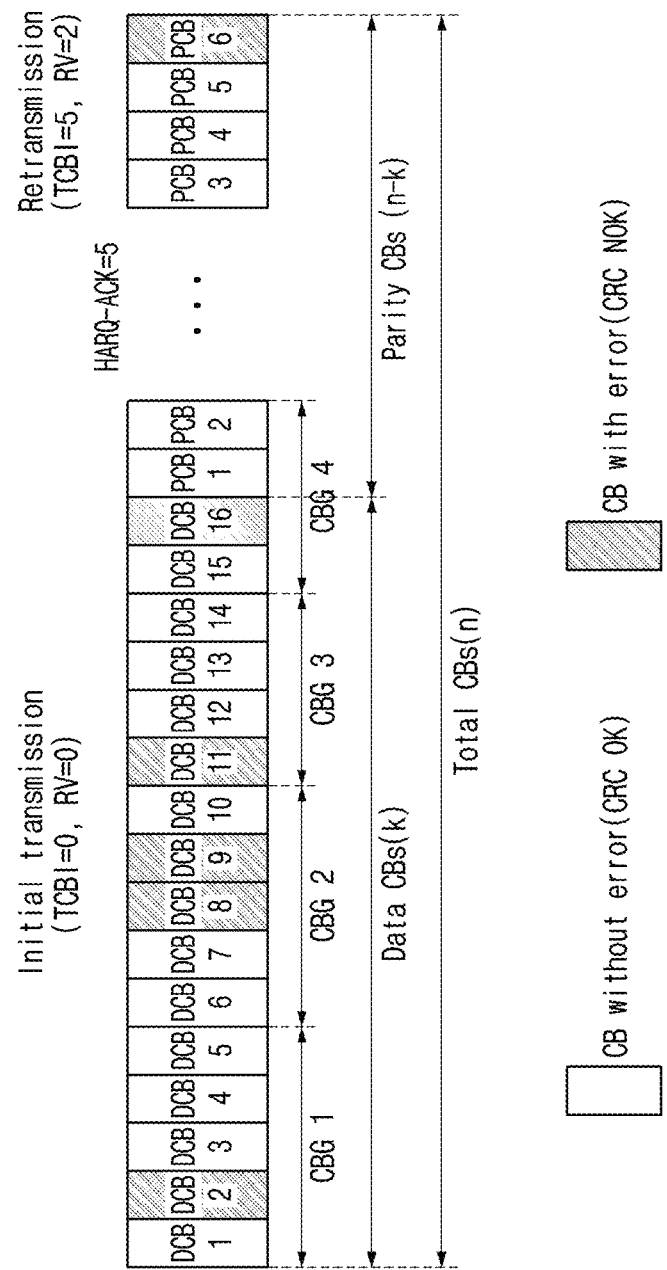
FIG. 32 illustrates an embodiment of a retransmission procedure for a recovery of a data code block in a system applicable to the present disclosure.

FIG. 32 illustrates an embodiment of a retransmission procedure for a recovery of a data code block in a system applicable to the present disclosure.

As illustrated in FIG. 32, if code blocks with a transmission error are distributed to a large number of code block groups, it may be difficult to recover all data code blocks by retransmitting only one code block group. In such a case, it may be efficient to recover all the data code blocks by additionally transmitting a sufficient number of parity code blocks to recover the error. In the example of FIG. 32, since three or more parity code blocks received without error are additionally required to recover five data code blocks with error, the receiver may feedback, as HARQ-ACK, '5' requesting transmission of four additional parity code blocks based on Table 10. Hence, the transmitter may transmit the four additional parity code blocks, and if the receiver receives three or more data code blocks without error by the internal channel coding, the receiver can recover all the data code blocks by the external erasure decoding.

Figure 33:
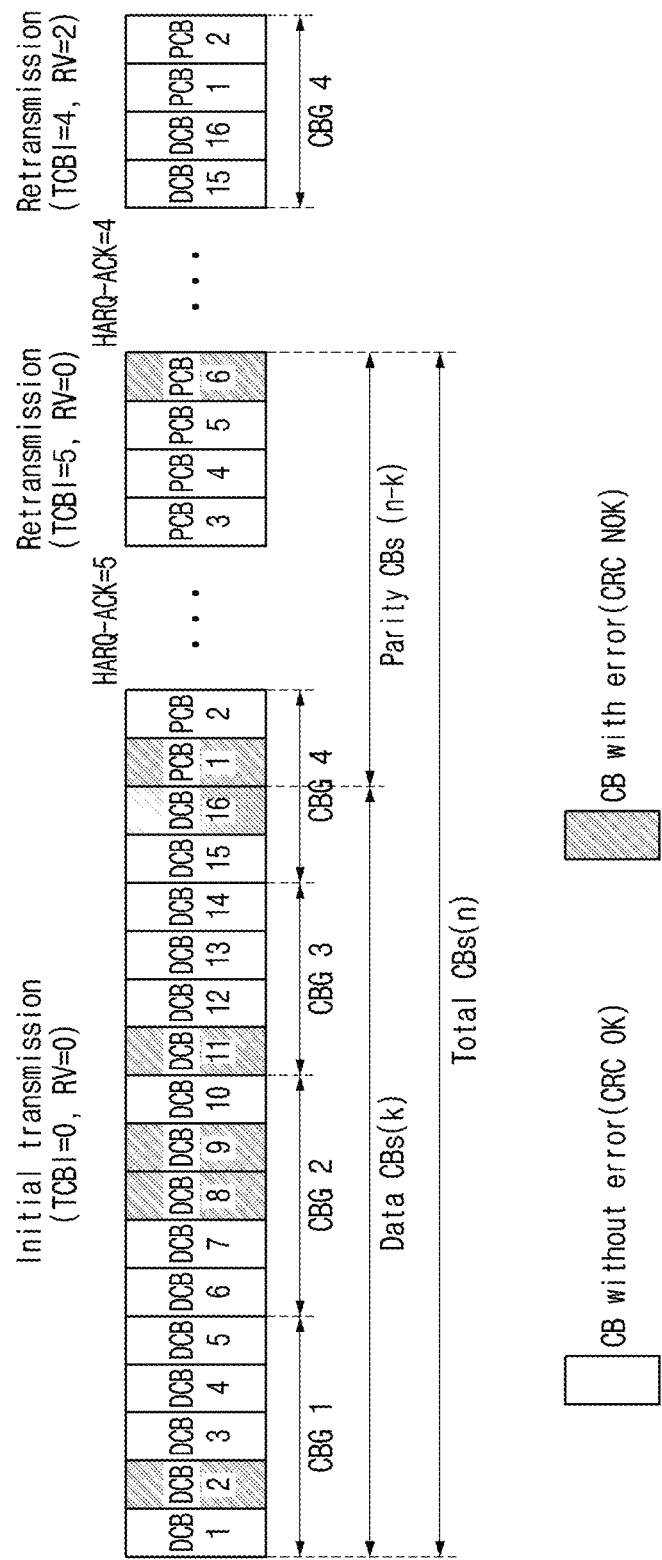
FIG. 33 illustrates an embodiment of a retransmission procedure for a recovery of a data code block in a system applicable to the present disclosure.
Figure 34:
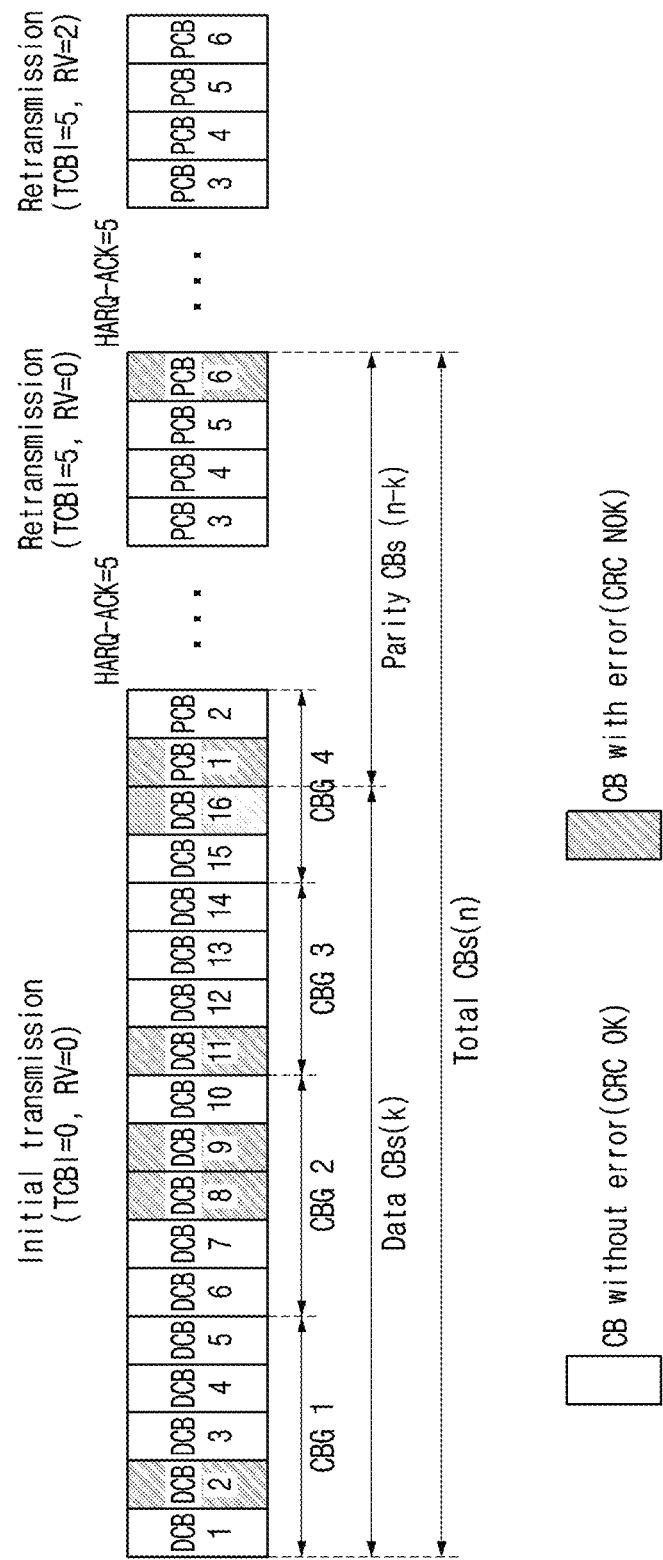
FIG. 34 illustrates an embodiment of a retransmission procedure for a recovery of a data code block in a system applicable to the present disclosure.
Figure 35:
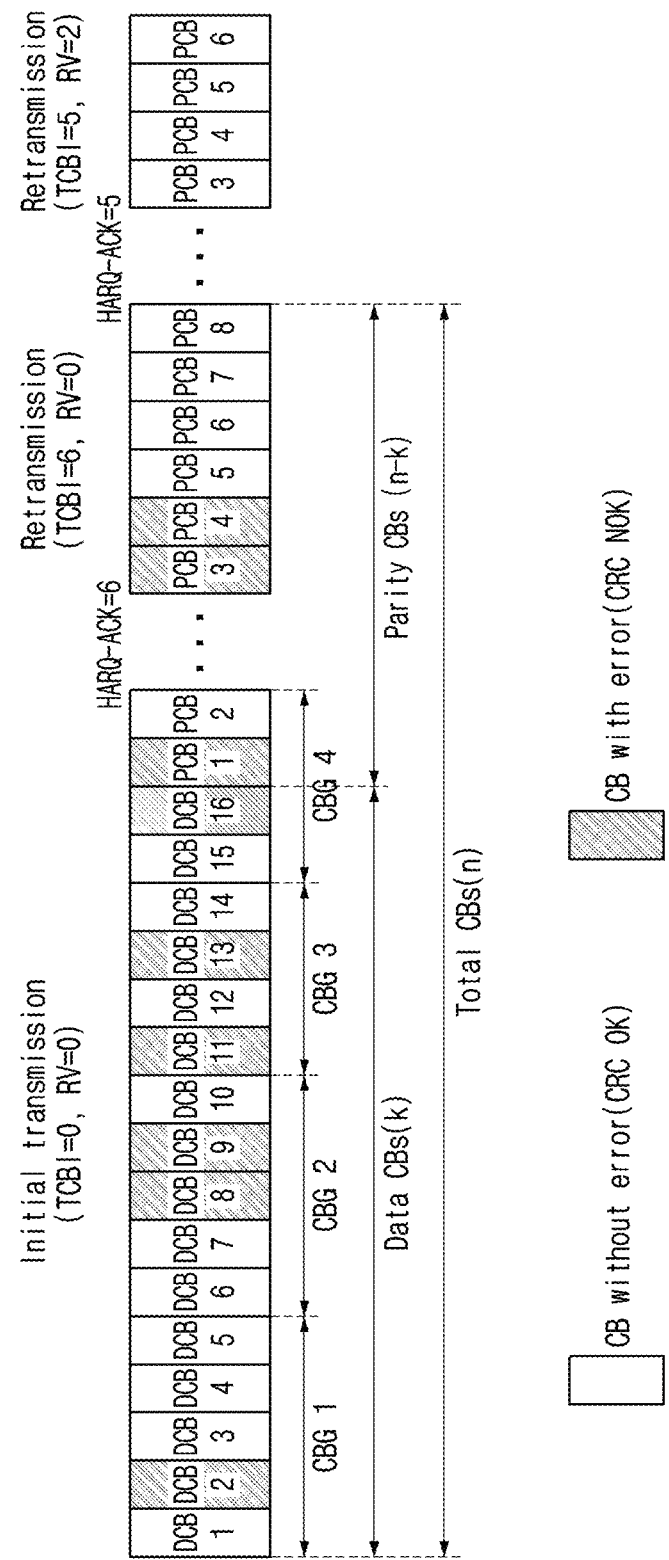
FIG. 35 illustrates an embodiment of a retransmission procedure for a recovery of a data code block in a system applicable to the present disclosure.

Hereinafter, FIGS. 33, 34 and 35 illustrate an example of performing additional HARQ-ACK feedback and retransmission since all data code blocks are not recovered by one retransmission.

FIG. 33 illustrates an embodiment of a retransmission procedure for a recovery of a data code block in a system applicable to the present disclosure.

More specifically, FIG. 33 illustrates an example where 16 error-free code blocks required to recover all data code blocks by the external erasure decoding due to an error of a parity code block 6 in a first retransmission are not secured. In this case, the receiver may feedback '4' as HARQ-ACK so as to request retransmission of a code block group 4. The transmitter receiving '4' as HARQ-ACK retransmits the code block group 4. The receiver may recover a data code block 16 and a parity code block 1, in which an error occurs in the first transmission, by the internal channel decoding and may secure 17 error-free code blocks. Subsequently, the receiver may recover all the data code blocks by the external erasure decoding.

FIG. 34 illustrates an embodiment of a retransmission procedure for a recovery of a data code block in a system applicable to the present disclosure.

More specifically, FIG. 34 illustrates an example where the receiver feedbacks '5' as HARQ-ACK under the same condition as FIG. 33 after the first retransmission. The transmitter receiving '5' as HARQ-ACK may retransmit parity code blocks 3, 4, 5, and 6 transmitting in the first retransmission. In this instance, the transmitter may transmit them using a different redundancy version (RV) from before. The receiver may recover the parity code block 6 with error by the internal channel decoding to secure 16 error-free code blocks. Subsequently, the receiver may recover all the data code blocks by the external erasure decoding.

FIG. 35 illustrates an embodiment of a retransmission procedure for a recovery of a data code block in a system applicable to the present disclosure.

More specifically, FIG. 35 illustrates an example of retransmission when six parity code blocks in which HARQ-ACK value and TCBI value are referred to as '6' include four parity code blocks in which HARQ-ACK value and TCBI value are referred to as '4'. In FIG. 35, the receiver receives only 11 code blocks without errors in the first transmission. The receiver additionally requiring 5 or more error-free code blocks may feedback '6' as HARQ-ACK so as to request transmission of the six parity code blocks. The transmitter transmits six new parity code blocks, and an error occurs in the first two parity code blocks 3 and 4 among the six new parity code blocks in the receiver. In this instance, the receiver may feedback '5' as HARQ-ACK as so as to receive retransmission of only the parity code blocks 3, 4, 5, and 6. The transmitter may transmit the parity code blocks 3, 4, 5, and 6 together with a new RV. The receiver may recover the parity code blocks 3 and 4 with error by the internal channel decoding to secure 17 error-free code blocks. Subsequently, the receiver may recover all the data code blocks by the external erasure decoding.

Figure 36:
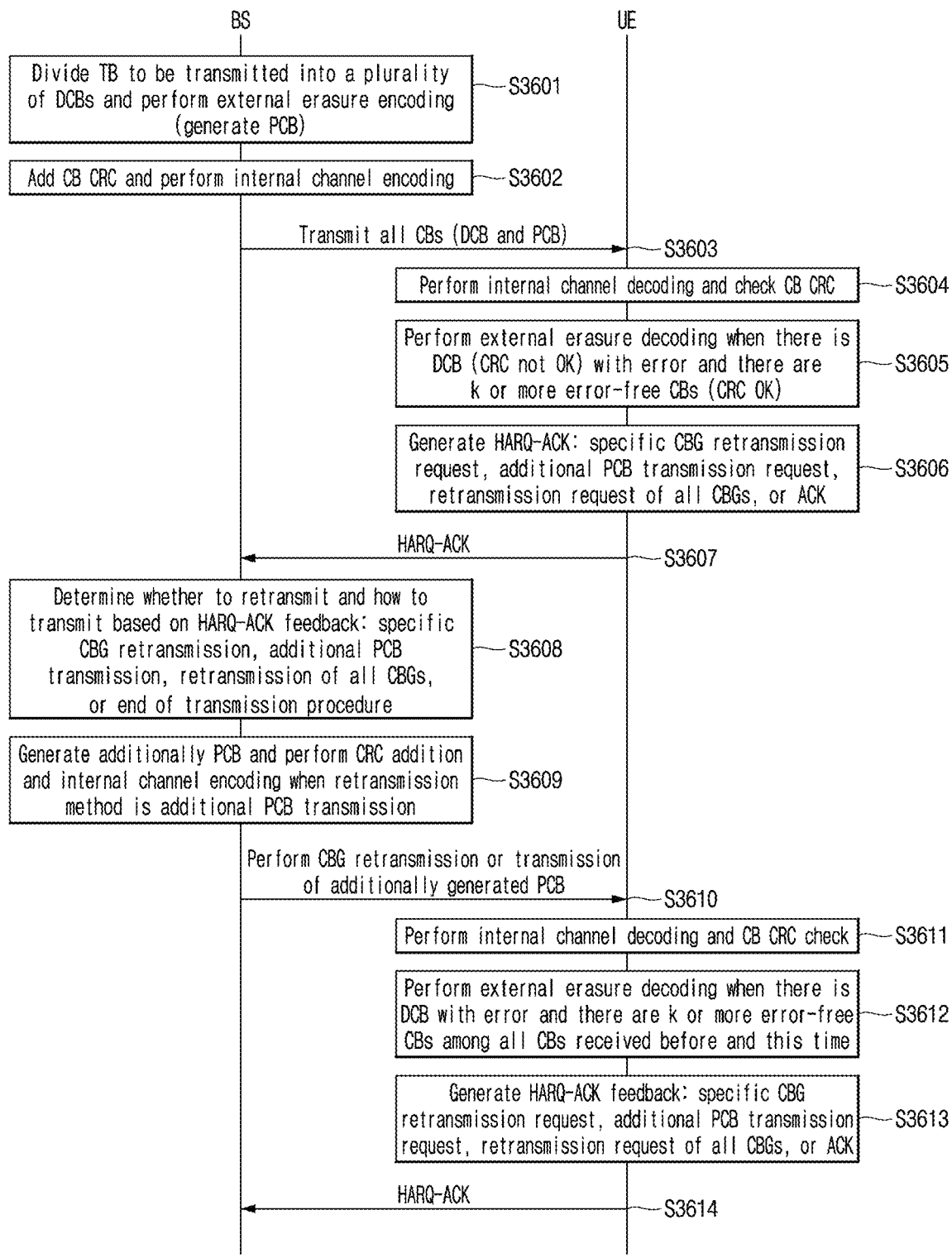
FIG. 36 illustrates an embodiment of a retransmission procedure for a recovery of a data code block in a system applicable to the present disclosure.

FIG. 36 illustrates an embodiment of a retransmission procedure for a recovery of a data code block in a system applicable to the present disclosure.

More specifically, FIG. 36 illustrates an example of a downlink data transmission and uplink HARQ-ACK feedback procedure when the transmission technology described above is applied in downlink in which a base station becomes a transmitter and a UE becomes a receiver in a wireless communication network.

Referring to FIG. 36, in step S3601, the base station divides a TB to be transmitted into a plurality of DCBs and performs external erasure encoding. The base station generates a PCB.

In step S3602, the base station adds CB CRC and performs internal channel encoding.

In step S3603, the base station transmits all CBs to the UE. All the CBs include the DCB and the PCB.

In step S3604, the UE performs internal channel decoding and checks CB CRC.

In step S3605, the UE performs external erasure decoding when there is a DCB (CRC not OK) with error and there are k or more error-free CBs (CRC OK).

In step S3606, the UE generates a first HARQ-ACK feedback. The first HARQ-ACK feedback may include information of a retransmission scheme or ACK. The retransmission scheme corresponds to one of the followings: specific CBG retransmission, additional PCB transmission, and all CBGs retransmission.

In step S3607, the UE transmits the first HARQ-ACK feedback to the base station.

In step S3608, the base station determines whether to retransmit and how to transmit based on the first HARQ-ACK feedback. Here, the retransmission scheme corresponds to one of the followings: specific CBG retransmission, additional PCB transmission, and all CBGs retransmission.

In step S3609, when the retransmission scheme is the additional PCB transmission, the base station additionally generates a PCB and performs CRC addition and internal channel encoding.

In step S3610, the base station performs CBG retransmission or transmission of the additionally generated PCB on the UE.

In step S3611, the UE performs the internal channel decoding and CB CRC check.

In step S3612, the UE performs the external erasure decoding when there is a DCB with error, and there are k or more error-free CBs among all the CBs received in steps S3603 and S3610.

In step S3613, the UE generates a second HARQ-ACK feedback. The second HARQ-ACK feedback may include information of the retransmission scheme or ACK. The retransmission scheme corresponds to one of the followings: request of specific CBG retransmission, additional PCB transmission, and request of all CBGs retransmission.

In step S3614, the UE transmits the second HARQ-ACK feedback to the base station.

Figure 37:
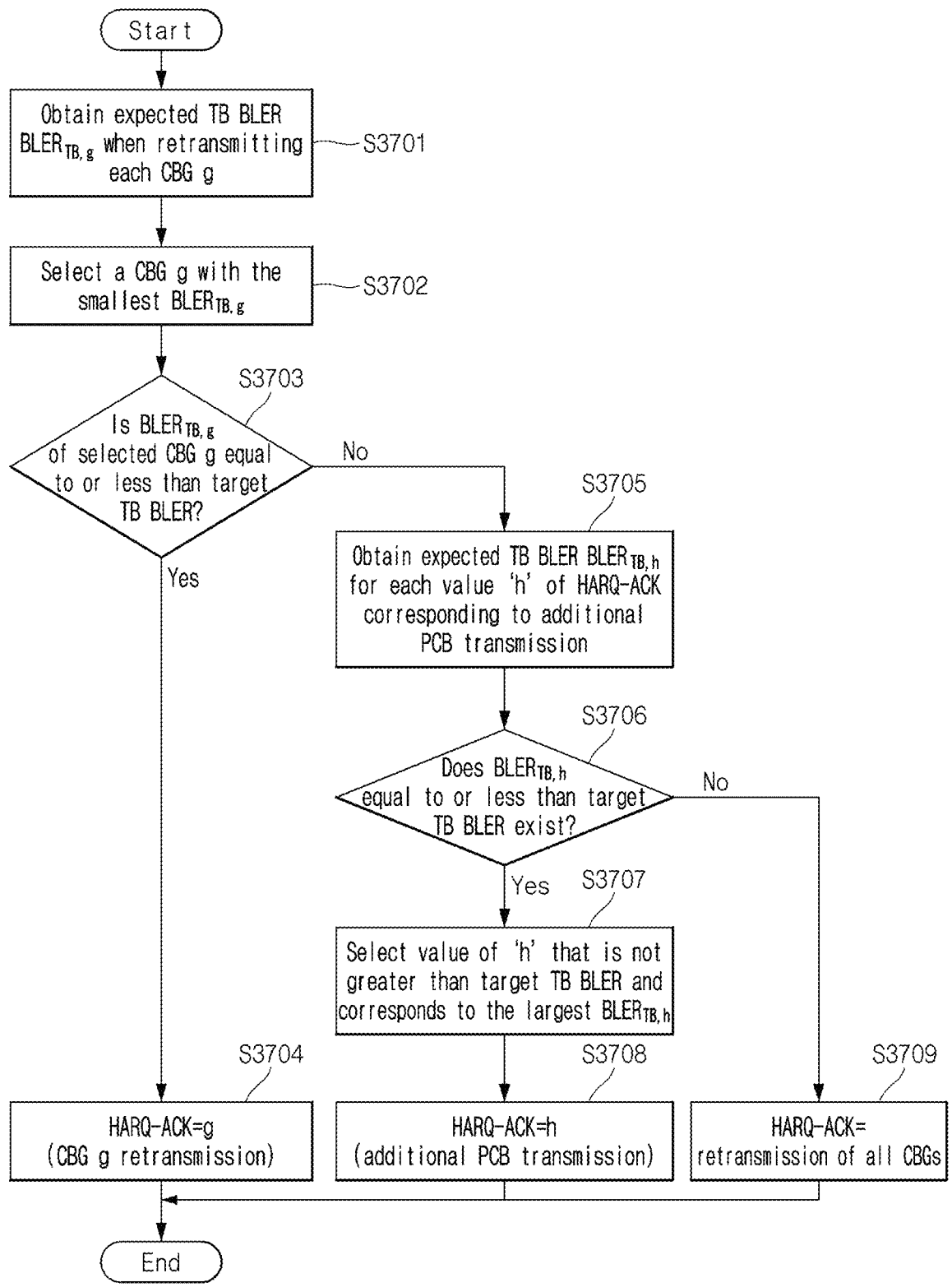
FIG. 37 illustrates an embodiment of a retransmission procedure for a recovery of a data code block in a system applicable to the present disclosure.

FIG. 37 illustrates an embodiment of a retransmission procedure for a recovery of a data code block in a system applicable to the present disclosure.

Referring to FIG. 37, in step S3701, the UE determines $BLER_{TB,g}$ that is an expected TB BLER when retransmitting each CBG g.

In step S3702, the UE selects a CBG g with the smallest $BLER_{TB,g}$.

In step S3703, the UE determines whether a $BLER_{TB,g}$ of the selected CBG g is equal to or less than a target TB BLER. When the $BLER_{TB,g}$ of the selected CBG g is equal to or less than the target TB BLER, the UE proceeds to step S3704. When the $BLER_{TB,g}$ of the selected CBG g is not equal to or less than the target TB BLER, the UE proceeds to step S3705.

In step S3704, the UE transmits, to the base station, HARQ-ACK including 'g' that is a CBG index value of a specific CBG. That is, the UE determines retransmission of the specific CBG as the retransmission scheme.

In step S3705, the UE determines $BLER_{TB,h}$ that is an expected TB BLER for each value 'h' of HARQ-ACK corresponding to additional PCB transmission.

In step S3706, the UE determines whether the $BLER_{TB,h}$ equal to or less than the target TB BLER exists. When the $BLER_{TB,h}$ equal to or less than the target TB BLER exists, the UE proceeds to step S3707. When the $BLER_{TB,h}$ equal to or less than the target TB BLER does not exist, the UE proceeds to step S3709.

In step S3707, the UE selects a value of 'h' that is not greater than the target TB BLER and corresponds to the largest $BLER_{TB,h}$.

In step S3708, the UE transmits, to the base station, HARQ-ACK including the value of 'h' corresponding to the number of additional PCBs. That is, the UE determines transmission of the additional PCBs as the retransmission scheme.

In step S3709, the UE transmits, to the base station, HARQ-ACK requesting the retransmission of all the CBGs. That is, the UE determines the retransmission of all the CBGs as the retransmission scheme.

FIG. 37 is an example of a procedure in which the UE determines the retransmission scheme. The UE may determine the retransmission scheme based on the expected BLER of the transport block after the retransmission. It is assumed that a CBG index value g is fed back if the specific CBG retransmission is used as HARQ-ACK, and the h value notifying the number of additional PCBs is fed back if the additional PCB transmission is used as HARQ-ACK. For example, if the HARQ-ACK is encoded as shown in Table 10, 'g' may have value of 1 to 4, and 'h' may have value of 5 or 6.

The UE may calculate the expected transport blocks BLERs, i.e., $BLER_{TB,g}$ based on Equation 3 assuming that each CBG g is to be retransmitted.

$$BLER_{TB} = \begin{cases} 1, & m+l < k \\ 1 - \sum_{i=0}^{m+l-k} \binom{l}{i} q^i (1-q)^{l-i}, & m+l \geq k \end{cases} \quad \text{[Equation 3]}$$

(1) m is the number of all the CBs received without error up to the time at which this procedure is performed. For example, in FIG. 31, 'm' at the time at which the first transmission is received is 13, and in FIG. 33, 'm' at the time at which the first retransmission is received is 15.

(2) l is the maximum number of error-free CBs that can be additionally secured by retransmission. For example, in FIG. 31, if CBG 2 is retransmitted at the time at which the first transmission is received, up to four error-free CBs can be secured. Therefore, 'l' is 4. As illustrated in FIG. 35, if transmission of six additional PCBs is requested at the time at which the first transmission is received, 'l' is 6.

(3) q is an expected or target BLER of the respective CBs upon the CBG retransmission or the additional PCB transmission. When retransmitting a previously transmitted CB such as CBG retransmission, q may be a value less than the target code block BLER 'p' in the first transmission. When first transmitting new additional 'c', q may be a value equal to the target code block BLER p in the first transmission.

If the smallest value among $BLER_{TB,g}$ is equal to or less than the target transport block BLER, the UE may feedback, as HARQ-ACK, CBG g corresponding to the smallest $BLER_{TB,g}$. If all the $BLER_{TB,g}$ is greater than the target transport block BLER, the UE may obtain a plurality of $BLER_{TB,h}$ that is the expected transport block BLER for each 'h' based on Equation 3 by assuming the additional PCB transmission. If there is $BLER_{TB,h}$ equal to or less than the target transport block BLER, the UE may feedback, as HARQ-ACK, 'h' corresponding to the largest $BLER_{TB,h}$ that is not greater than the target transport block BLER, If all the $BLER_{TB,h}$ is greater than the target transport block BLER, the UE may feedback a HARQ-ACK value requesting retransmission of all the CBGs.

If the Raptor code is used as the external erasure code, Equation 3 may be changed as in Equation 4

$$BLER_{TB} = \begin{cases} 1, & m+l < k \\ 1 - \sum_{i=0}^{m+l-k} \binom{l}{i} q^i (1-q)^{l-i} \left(1 - 10^{-2(m+l-k-i+1)}\right), & m+l \geq k \end{cases} \quad \text{[Equation 4]}$$

In 5G NR, the code block group based retransmission transmits as many HARQ-ACK bits as the number of code block groups using uplink control information (UCI) as uplink, and transmits as many CBGTI (Code Block Group Transmission Information) bits as the number of code block groups using downlink control information (DCI) as downlink. The present disclosure can reduce the number of bits required for HARQ-ACK feedback and the number of bits required for TCBI in the methods described above. When the maximum number of code block groups is $N_{CBG}$, the code block group based retransmission of 5G NR requires N_CBG HARQ-ACK bits and CBGTI bits, but the present disclosure requires approximately $\lceil \log_2 N_{CBG} \rceil$ or $(1+\lceil \log_2 N_{CBG} \rceil)$ bits. As illustrated in FIG. 24, when one transport block is transmitted to up to four code block groups, the code block group based retransmission requires 4 bits, but the present disclosure requires only 3 bits as shown in Table 10 and Table 12. The effect of reducing the number of bits can further increase in large-capacity data transmission in which the maximum number of code block groups may increase.

Effect of Embodiment of the Present Disclosure

Various embodiments of the present disclosure are implemented to be able to reduce transmission latency by reducing HARQ retransmission probability using an erasure code, and reduce radio resources and the number of HARQ-ACK feedback bits and DCI bits required for retransmission when retransmission is unavoidably necessary.

[Description of UE Related Claims]

Hereinafter, the above-described embodiments are described in detail from a perspective of UE behavior with reference to FIG. 38. Methods to be described below are merely distinguished for convenience of explanation. Thus, as long as the methods are not mutually exclusive, it is obvious that partial configuration of any method can be substituted or combined with partial configuration of another method.

Figure 38:
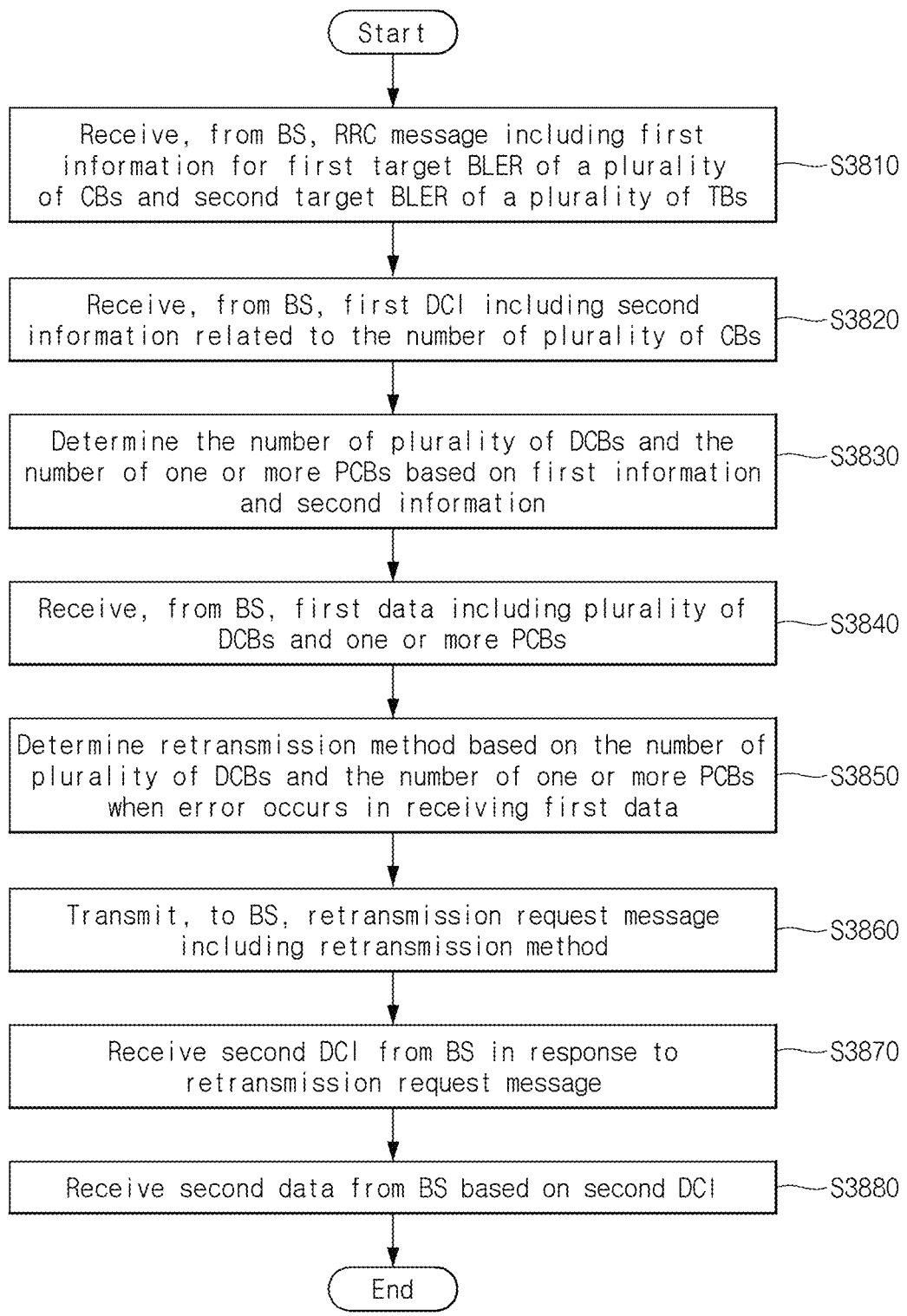
FIG. 38 illustrates an embodiment of a procedure of a UE behavior in a system applicable to the present disclosure.

FIG. 38 illustrates an embodiment of a procedure of a UE behavior in a system applicable to the present disclosure.

According to various embodiments of the present disclosure, a method performed by a user equipment (UE) in a wireless communication system is provided.

In step S3810, the UE receives, from a base station (BS), a radio resource control (RRC) message including first information for a first target block error rate (BLER) of a plurality of code blocks (CBs) and a second target BLER of a plurality of transport blocks (TBs).

In step S3820, the UE receives, from the base station, first downlink control information (DCI) including second information related to the number of the plurality of CBs.

In step S3830, the UE determines the number of a plurality of data code blocks (DCBs) and the number of one or more parity code blocks (PCBs) based on the first information and the second information.

In step S3840, the UE receives, from the base station, first data including the plurality of DCBs and the one or more PCBs. The plurality of CBs include the plurality of DCBs and the one or more PCBs.

In step S3850, when an error occurs in receiving the first data, the UE determines a retransmission scheme based on the number of the plurality of DCBs and the number of the one or more PCBs.

In step S3860, the UE transmits, to the base station, a retransmission request message including the retransmission scheme.

In step S3870, the UE receives second DCI from the base station in response to the retransmission request message.

In step S3880, the UE receives second data from the base station based on the second DCI.

According to various embodiments of the present disclosure, the plurality of CBs may be generated using an external erasure code based on the plurality of DCBs, and the number of the one or more PCBs may be based on the number of the plurality of DCBs.

According to various embodiments of the present disclosure, the number of the one or more PCBs and the number of the plurality of DCBs may be determined based on a configured equation or a configured table. The number of the one or more PCBs and the number of the plurality of DCBs may be synchronized between the UE and the base station based on the configured equation or the configured table.

According to various embodiments of the present disclosure, the first information may include a table related to the first target BLER of the plurality of CBs and the second target BLER of the plurality of TBs.

According to various embodiments of the present disclosure, the first data may include a plurality of code block groups (CBGs). According to various embodiments of the present disclosure, each of the plurality of CBGs may include some of the plurality of DCBs; or some of the plurality of DCBs and the one or more PCBs; or the one or more PCBs.

According to various embodiments of the present disclosure, the retransmission scheme may include one of a retransmission of a specific CBG including multiple specific CBs among the plurality of CBs, a transmission of first additional PCBs, or a retransmission of all the plurality of CBGs including the plurality of DCBs.

According to various embodiments of the present disclosure, when a smallest TB BLER among a plurality of TB BLERs corresponding to the plurality of CBGs is equal to or less than the second target BLER, the retransmission scheme may be determined as the retransmission of the specific CBG corresponding to the smallest TB BLER.

According to various embodiments of the present disclosure, when all the plurality of TB BLERs are greater than the second target BLER, expected TB BLERs that assumes a transmission of a specific number of the first additional PCBs may be determined. When there are one or more expected TB BLERs that are equal to or less than the second target BLER among the expected TB BLERs, the retransmission scheme may be determined as the transmission of the first additional PCBs whose number corresponds to the largest expected TB BLER among the one or more expected TB BLER that are equal to or less than the second target BLER.

According to various embodiments of the present disclosure, when there is no the assumed TB BLER that is equal to or less than the second target BLER, the retransmission scheme may be determined as the retransmission of all the plurality of CBGs According to various embodiments of the present disclosure, when the number of DCBs with error among remaining DCBs excluding multiple DCBs included in the specific CBG from the plurality of DCBs is equal to or less than the number of error-free PCBs, or when the number of DCBs with error that are included in a CBG not including the one or more PCBs is equal to or less than the number of the one or more PCBs included in a CBG including the one or more PCBs, the retransmission scheme may be determined as the retransmission of the specific CBG.

According to various embodiments of the present disclosure, when the number of DCBs with error among remaining DCBs excluding the multiple DCBs included in the specific CBG from the plurality of DCBs is greater than the number of error-free PCBs, and a difference between the number of DCBs with error among the plurality of DCBs and the number of error-free PCBs is equal to or less than the number of DCBs per CBG, the retransmission scheme may be determined as the transmission of the at least one additional PCB.

According to various embodiments of the present disclosure, when the number of DCBs with error among remaining DCBs excluding the multiple DCBs included in the specific CBG from the plurality of DCBs is greater than the number of error-free PCBs, and a difference between the number of DCBs with error among the plurality of DCBs and the number of error-free PCBs is greater than the number of DCBs per CBG, the retransmission scheme may be determined as the retransmission of all the plurality of CBGs including the plurality of DCBs.

According to various embodiments of the present disclosure, when the retransmission scheme is the transmission of the first additional PCBs whose number corresponds to the largest expected TB BLER among the one or more expected TB BLER that are equal to or less than the second target BLER, the second data may include the first additional PCBs.

According to various embodiments of the present disclosure, the embodiment of FIG. 38 may further include, when an error occurs in a reception of one or more first additional PCBs among receptions of the first additional PCBs, transmitting a second retransmission request message for multiple second additional PCBs; and receiving, from the base station, third data for the multiple second additional PCBs.

According to various embodiments of the present disclosure, the number of the multiple second additional PCBs may be equal to or less than the number of the first additional PCBs, and the multiple second additional PCBs may be a part of the first additional PCBs.

According to various embodiments of the present disclosure, a user equipment (UE) is provided in a wireless communication system. The UE includes a transceiver and at least one processor, and the at least one processor may be configured to perform an operation method of the UE according to FIG. 38.

According to various embodiments of the present disclosure, a device controlling a user equipment (UE) is provided in a wireless communication system. The device includes at least one processor and at least one memory operably connected to the at least one processor. The at least one memory may be configured to store instructions performing an operation method of the UE according to FIG. 38 based on being executed by the at least one processor.

According to various embodiments of the present disclosure, one or more non-transitory computer readable mediums storing one or more instructions are provided. The one or more instructions perform operations based on being executed by one or more processors, and the operations may include an operation method of the UE according to FIG. 38.

[Description of BS Related Claims]

Hereinafter, the above-described embodiments are described in detail from a perspective of BS behavior with reference to FIG. 39. Methods to be described below are merely distinguished for convenience of explanation. Thus, as long as the methods are not mutually exclusive, it is obvious that partial configuration of any method can be substituted or combined with partial configuration of another method.

Figure 39:
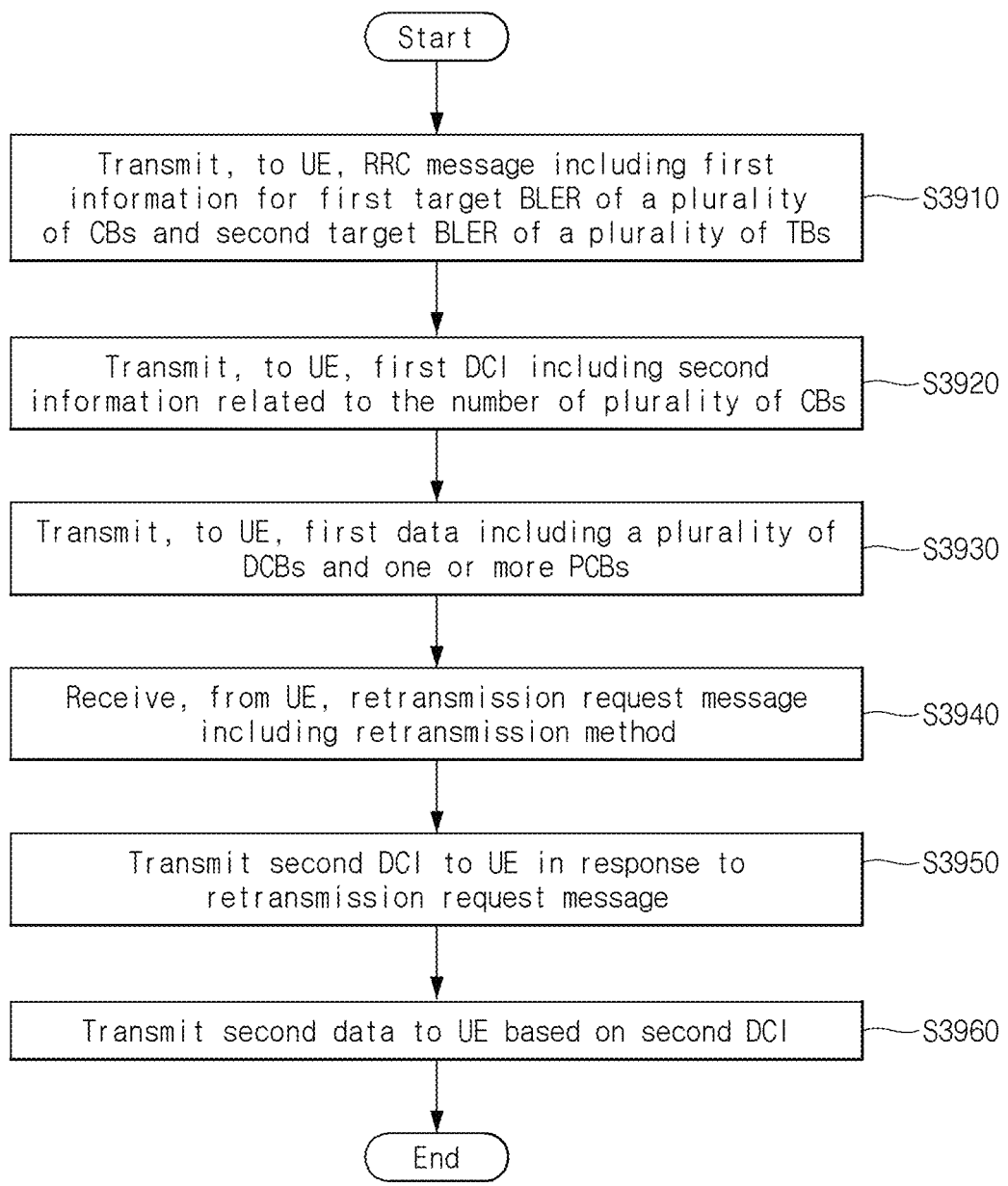
FIG. 39 illustrates an embodiment of a procedure of a base station behavior in a system applicable to the present disclosure.

FIG. 39 illustrates an embodiment of a procedure of a base station behavior in a system applicable to the present disclosure.

According to various embodiments of the present disclosure, a method performed by a base station (BS) in a wireless communication system is provided.

In step S3910, the base station transmits, to a US, a radio resource control (RRC) message including first information for a first target block error rate (BLER) of a plurality of code blocks (CBs) and a second target BLER of a plurality of transport blocks (TBs).

In step S3920, the base station transmits, to the UE, first downlink control information (DCI) including second information related to the number of the plurality of CBs.

In step S3930, the base station transmits, to the UE, first data including a plurality of data code blocks (DCBs) and one or more parity code blocks (PCBs). The plurality of CBs include the plurality of DCBs and the one or more PCBs.

In step S3940, the base station receives, from the UE, a retransmission request message including a retransmission scheme.

In step S3950, the base station transmits second DCI to the UE in response to the retransmission request message.

In step S3960, the base station transmits second data to the UE based on the second DCI.

According to various embodiments of the present disclosure, the number of the plurality of DCBs and the number of the one or more PCBs are determined based on the first information and the second information.

According to various embodiments of the present disclosure, when an error occurs in transmitting the first data, the retransmission scheme is determined based on the number of the plurality of DCBs and the number of the one or more PCBs.

According to various embodiments of the present disclosure, the plurality of CBs may be generated using an external erasure code based on the plurality of DCBs, and the number of the one or more PCBs may be based on the number of the plurality of DCBs.

According to various embodiments of the present disclosure, the number of the one or more PCBs and the number of the plurality of DCBs may be determined based on a configured equation or a configured table. The number of the one or more PCBs and the number of the plurality of DCBs may be synchronized between the UE and the base station based on the configured equation or the configured table.

According to various embodiments of the present disclosure, the first information may include a table related to the first target BLER of the plurality of CBs and the second target BLER of the plurality of TBs.

According to various embodiments of the present disclosure, the first data may include a plurality of code block groups (CBGs). According to various embodiments of the present disclosure, each of the plurality of CBGs may include some of the plurality of DCBs; or some of the plurality of DCBs and the one or more PCBs; or the one or more PCBs.

According to various embodiments of the present disclosure, the retransmission scheme may include one of a retransmission of a specific CBG including multiple specific CBs among the plurality of CBs, a transmission of first additional PCBs, or a retransmission of all the plurality of CBGs including the plurality of DCBs.

According to various embodiments of the present disclosure, when a smallest TB BLER among a plurality of TB BLERs corresponding to the plurality of CBGs is equal to or less than the second target BLER, the retransmission scheme may be determined as the retransmission of the specific CBG corresponding to the smallest TB BLER.

According to various embodiments of the present disclosure, when all the plurality of TB BLERs are greater than the second target BLER, expected TB BLERs that assumes a transmission of a specific number of the first additional PCBs may be determined. When there are one or more expected TB BLERs that are equal to or less than the second target BLER among the expected TB BLERs, the retransmission scheme may be determined as the transmission of the first additional PCBs whose number corresponds to the largest expected TB BLER among the one or more expected TB BLER that are equal to or less than the second target BLER.

According to various embodiments of the present disclosure, when there is no the assumed TB BLER that is equal to or less than the second target BLER, the retransmission scheme may be determined as the retransmission of all the plurality of CBGs According to various embodiments of the present disclosure, when the number of DCBs with error among remaining DCBs excluding multiple DCBs included in the specific CBG from the plurality of DCBs is equal to or less than the number of error-free PCBs, or when the number of DCBs with error that are included in a CBG not including the one or more PCBs is equal to or less than the number of the one or more PCBs included in a CBG including the one or more PCBs, the retransmission scheme may be determined as the retransmission of the specific CBG.

According to various embodiments of the present disclosure, when the number of DCBs with error among remaining DCBs excluding the multiple DCBs included in the specific CBG from the plurality of DCBs is greater than the number of error-free PCBs, and a difference between the number of DCBs with error among the plurality of DCBs and the number of error-free PCBs is equal to or less than the number of DCBs per CBG, the retransmission scheme may be determined as the transmission of the at least one additional PCB.

According to various embodiments of the present disclosure, when the number of DCBs with error among remaining DCBs excluding the multiple DCBs included in the specific CBG from the plurality of DCBs is greater than the number of error-free PCBs, and a difference between the number of DCBs with error among the plurality of DCBs and the number of error-free PCBs is greater than the number of DCBs per CBG, the retransmission scheme may be determined as the retransmission of all the plurality of CBGs including the plurality of DCBs.

According to various embodiments of the present disclosure, when the retransmission scheme is the transmission of the first additional PCBs whose number corresponds to the largest expected TB BLER among the one or more expected TB BLER that are equal to or less than the second target BLER, the second data may include the first additional PCBs.

According to various embodiments of the present disclosure, the embodiment of FIG. 39 may further include, when an error occurs in a transmission of one or more first additional PCBs among transmissions of the first additional PCBs, receiving a second retransmission request message for multiple second additional PCBs; and transmitting, to the UE, third data for the multiple second additional PCBs.

According to various embodiments of the present disclosure, the number of the multiple second additional PCBs may be equal to or less than the number of the first additional PCBs, and the multiple second additional PCBs may be a part of the first additional PCBs.

According to various embodiments of the present disclosure, a base station (BS) is provided in a wireless communication system. The base station includes a transceiver and at least one processor, and the at least one processor may be configured to perform an operation method of the base station according to FIG. 39.

According to various embodiments of the present disclosure, a device controlling a base station (BS) is provided in a wireless communication system. The device includes at least one processor and at least one memory operably connected to the at least one processor. The at least one memory may be configured to store instructions performing an operation method of the base station according to FIG. 39 based on being executed by the at least one processor.

According to various embodiments of the present disclosure, one or more non-transitory computer readable mediums storing one or more instructions are provided. The one or more instructions perform operations based on being executed by one or more processors, and the operations may include an operation method of the base station according to FIG. 39.

Since examples of the above-described proposal methods can also be included as one of the implementation methods of the present disclosure, it is obvious that the examples can be considered as a type of proposal methods. Further, the above-described proposal methods may be independently implemented, but may be implemented in the form of a combination (or merge) of some proposal methods. A rule may be defined so that the base station informs the UE of information about whether to apply the proposal methods (or information on rules of the proposal methods) via pre-defined signaling (e.g., physical layer signaling or upper layer signaling).

The present disclosure can be embodied in other specific forms without departing from the technical idea and essential features described in the present disclosure. Accordingly, the detailed description should not be construed as limiting in all aspects and should be considered as illustrative. The scope of the present disclosure should be determined by a reasonable interpretation of the appended claims, and all modifications within the equivalent scope of the present disclosure are included in the scope of the present disclosure. It is apparent that some claims referring to specific claims can be combined with another claims referring to the claims other than the specific claims to constitute an embodiment or add new claims by means of amendment after the application is filed.

Embodiments of the present disclosure can be applied to various wireless access systems. Examples of the various wireless access systems include 3rd generation partnership project (3GPP), or 3GPP2 system, etc.

Embodiments of the present disclosure can be applied to all the technical fields to which the various wireless access systems are applied, in addition to the various wireless access systems. Furthermore, the proposed methods can be applied to mmWave, THz communication system, etc. using an ultra-high frequency band.

In addition, embodiments of the present disclosure can be applied to various applications such as an autonomous vehicle and a drone.

What is claimed is:

1. A method performed by a user equipment (UE) in a wireless communication system, the method comprising:
    receiving, from a base station (BS), a radio resource control (RRC) message including first information for a first target block error rate (BLER) of a plurality of code blocks (CBs) and a second target BLER of a plurality of transport blocks (TBs);
    receiving, from the base station, first downlink control information (DCI) including second information related to a number of the plurality of CBs;
    determining a number of a plurality of data code blocks (DCBs) and a number of one or more parity code blocks (PCBs) based on the first information and the second information;
    receiving, from the base station, first data including the plurality of DCBs and the one or more PCBs, wherein the plurality of CBs includes the plurality of DCBs and the one or more PCBs;
    based on an error occurring in receiving the first data, determining a retransmission scheme based on the number of the plurality of DCBs and the number of the one or more PCBs;
    transmitting, to the base station, a retransmission request message including the retransmission scheme;
    receiving, from the base station, second DCI in response to the retransmission request message; and
    receiving, from the base station, second data based on the second DCI.

2. The method of claim 1, wherein the plurality of CBs are generated using an external erasure code based on the plurality of DCBs, and
    wherein the number of the one or more PCBs is based on the number of the plurality of DCBs.

3. The method of claim 1, wherein the number of the one or more PCBs and the number of the plurality of DCBs are determined based on a configured equation or a configured table, and
    wherein the number of the one or more PCBs and the number of the plurality of DCBs are synchronized between the UE and the base station based on the configured equation or the configured table.

4. The method of claim 1, wherein the first information includes a table related to the first target BLER of the plurality of CBs and the second target BLER of the plurality of TBs.

5. The method of claim 1, wherein the first data includes a plurality of code block groups (CBGs),
- wherein each of the plurality of CBGs includes some of the plurality of DCBs; or some of the plurality of DCBs and the one or more PCBs; or the one or more PCBs, and
- wherein the retransmission scheme includes one of a retransmission of a specific CBG including multiple specific CBs among the plurality of CBs, a transmission of first additional PCBs, or a retransmission of all the plurality of CBGs including the plurality of DCBs.

6. The method of claim 5, wherein, based on a smallest TB BLER among a plurality of TB BLERs corresponding to the plurality of CBGs being equal to or less than the second target BLER, the retransmission scheme is determined as the retransmission of the specific CBG corresponding to the smallest TB BLER,
- wherein, based on all the plurality of TB BLERs being greater than the second target BLER, expected TB BLERs that assumes a transmission of a specific number of the first additional PCBs are determined, and based on there being one or more expected TB BLERs that are equal to or less than the second target BLER among the expected TB BLERs, the retransmission scheme is determined as the transmission of the first additional PCBs whose number corresponds to a largest expected TB BLER among the one or more expected TB BLER that are equal to or less than the second target BLER, and
- wherein, based on the assumed TB BLER that is equal to or less than the second target BLER being not present, the retransmission scheme is determined as the retransmission of all the plurality of CBGs.

7. The method of claim 5, wherein, based on the retransmission scheme being the transmission of the first additional PCBs whose number corresponds to a largest expected TB BLER that is equal to or less than the second target BLER, the second data includes the first additional PCBs,
- wherein the method further comprises: based on an error occurring in a reception of one or more first additional PCBs among receptions of the first additional PCBs,
- transmitting a second retransmission request message for multiple second additional PCBs; and
- receiving, from the base station, third data for the multiple second additional PCBs.

8. The method of claim 7, wherein a number of the multiple second additional PCBs is equal to or less than a number of the first additional PCBs, and
- wherein the multiple second additional PCBs are a part of the first additional PCBs.

9. A method performed by a base station (BS) in a wireless communication system, the method comprising:
- transmitting, to a user equipment (UE), a radio resource control (RRC) message including first information for a first target block error rate (BLER) of a plurality of code blocks (CBs) and a second target BLER of a plurality of transport blocks (TBs);
- transmitting, to the UE, first downlink control information (DCI) including second information related to a number of the plurality of CBs;
- transmitting, to the UE, first data including a plurality of data code blocks (DCBs) and one or more parity code blocks (PCBs), wherein the plurality of CBs includes the plurality of DCBs and the one or more PCBs;
- receiving, from the UE, a retransmission request message including a retransmission scheme;
- transmitting, to the UE, second DCI in response to the retransmission request message; and
- transmitting, to the UE, second data based on the second DCI,
- wherein a number of the plurality of DCBs and a number of the one or more PCBs are determined based on the first information and the second information, and
- wherein, based on an error occurring in transmitting the first data, the retransmission scheme is determined based on the number of the plurality of DCBs and the number of the one or more PCBs.

10. The method of claim 9, wherein the plurality of CBs are generated using an external erasure code based on the plurality of DCBs, and
- wherein the number of the one or more PCBs is based on the number of the plurality of DCBs.

11. The method of claim 9, wherein the number of the one or more PCBs and the number of the plurality of DCBs are determined based on a configured equation or a configured table, and
- wherein the number of the one or more PCBs and the number of the plurality of DCBs are synchronized between the UE and the base station based on the configured equation or the configured table.

12. The method of claim 9, wherein the first information includes a table related to the first target BLER of the plurality of CBs and the second target BLER of the plurality of TBs.

13. The method of claim 9, wherein the first data includes a plurality of code block groups (CBGs),
- wherein each of the plurality of CBGs includes some of the plurality of DCBs; or some of the plurality of DCBs and the one or more PCBs; or the one or more PCBs, and
- wherein the retransmission scheme includes one of a retransmission of a specific CBG including multiple specific CBs among the plurality of CBs, a transmission of first additional PCBs, or a retransmission of all the plurality of CBGs including the plurality of DCBs.

14. The method of claim 13, wherein, based on a smallest TB BLER among a plurality of TB BLERs corresponding to the plurality of CBGs being equal to or less than the second target BLER, the retransmission scheme is determined as the retransmission of the specific CBG corresponding to the smallest TB BLER,
- wherein, based on all the plurality of TB BLERs being greater than the second target BLER, expected TB BLERs that assumes a transmission of a specific number of the first additional PCBs are determined, and based on there being one or more expected TB BLERs that are equal to or less than the second target BLER among the expected TB BLERs, the retransmission scheme is determined as the transmission of the first additional PCBs whose number corresponds to a largest expected TB BLER among the one or more expected TB BLER that are equal to or less than the second target BLER, and
- wherein, based on the assumed TB BLER that is equal to or less than the second target BLER being not present, the retransmission scheme is determined as the retransmission of all the plurality of CBGs.

15. The method of claim 14, wherein, based on the retransmission scheme being the transmission of the first additional PCBs whose number corresponds to the largest expected TB BLER that is equal to or less than the second target BLER, the second data includes the first additional PCBs, wherein the method further comprises: based on an error occurring in a transmission of one or more first additional PCBs among transmissions of the first additional PCBs,
receiving a second retransmission request message for multiple second additional PCBs; and
transmitting, to the UE, third data for the multiple second additional PCBs.

16. The method of claim 15, wherein a number of the multiple second additional PCBs is equal to or less than a number of the first additional PCBs, and
wherein the multiple second additional PCBs are a part of the first additional PCBs.

17. A user equipment (UE) in a wireless communication system, the UE comprising:
a transceiver; and
at least one processor,
wherein the at least one processor is configured to:
receive, from a base station (BS), a radio resource control (RRC) message including first information for a first target block error rate (BLER) of a plurality of code blocks (CBs) and a second target BLER of a plurality of transport blocks (TBs);
receive, from the base station, first downlink control information (DCI) including second information related to a number of the plurality of CBs;
determine a number of a plurality of data code blocks (DCBs) and a number of one or more parity code blocks (PCBs) based on the first information and the second information;
receive, from the base station, first data including the plurality of DCBs and the one or more PCBs, wherein the plurality of CBs includes the plurality of DCBs and the one or more PCBs;
based on an error occurring in receiving the first data, determine a retransmission scheme based on the number of the plurality of DCBs and the number of the one or more PCBs;
transmit, to the base station, a retransmission request message including the retransmission scheme;
receive, from the base station, second DCI in response to the retransmission request message; and
receive, from the base station, second data based on the second DCI.

18. The UE of claim 17, wherein the plurality of CBs are generated using an external erasure code based on the plurality of DCBs, and
wherein the number of the one or more PCBs is based on the number of the plurality of DCBs.

19. The UE of claim 17, wherein the number of the one or more PCBs and the number of the plurality of DCBs are determined based on a configured equation or a configured table, and
wherein the number of the one or more PCBs and the number of the plurality of DCBs are synchronized between the UE and the base station based on the configured equation or the configured table.

20. The UE of claim 17, wherein the first information includes a table related to the first target BLER of the plurality of CBs and the second target BLER of the plurality of TBs.

* * * * *